United States Patent
Nakao et al.

(10) Patent No.: US 8,000,189 B2
(45) Date of Patent: Aug. 16, 2011

(54) OPTICAL PICKUP AND OPTICAL DISK DEVICE

(75) Inventors: Takashi Nakao, Tokyo (JP); Fumiaki Nakano, Tokyo (JP); Noriaki Nishi, Kanagawa (JP); Nobuhiko Ando, Tokyo (JP); Hiroaki Nakagawa, Tokyo (JP); Yutaka Tentaku, Tokyo (JP)

(73) Assignee: Sony Corporation, Tokyo (JP)

( * ) Notice: Subject to any disclaimer, the term of this patent is extended or adjusted under 35 U.S.C. 154(b) by 136 days.

(21) Appl. No.: 12/501,834

(22) Filed: Jul. 13, 2009

(65) Prior Publication Data

US 2010/0014410 A1 Jan. 21, 2010

(30) Foreign Application Priority Data

Jul. 15, 2008 (JP) ................................. 2008-184061
Feb. 24, 2009 (JP) ................................. 2009-041055

(51) Int. Cl.
G11B 7/00 (2006.01)
(52) U.S. Cl. .................. 369/44.41; 369/94; 369/112.12; 369/112.15; 369/120
(58) Field of Classification Search .................. None
See application file for complete search history.

(56) References Cited

U.S. PATENT DOCUMENTS

2007/0291602 A1* 12/2007 Nakao .................. 369/44.29
2008/0084797 A1* 4/2008 Sano et al. .................. 369/44.23

FOREIGN PATENT DOCUMENTS

| JP | 2005-353252 A | 12/2005 |
| JP | 2007-213754 | 8/2007 |
| WO | 2008/053548 A1 | 5/2008 |

* cited by examiner

Primary Examiner — Paul Huber
(74) Attorney, Agent, or Firm — Wolf, Greenfield & Sacks, P.C.

(57) ABSTRACT

An optical pickup includes: a light source that emits a light beam; an object lens that condenses the light beam on a target recording layer of an optical disk; a lens moving unit; a condensing lens; a hologram element that diffracts, in diffracting a reflected light beam and separating it into reflected zeroth-order and first-order light beams, parts of the reflected first-order light beam in a first direction and sets them as first and second beams, diffracts parts of the reflected first-order light beam in a second direction and sets them as third and fourth beams; and a photodetector that receives the first and second beams and the third and fourth beams and generates light reception signals, and receives interlayer stray light of a part of the light beam reflected by the other recording layers other than the target recording layer and generates a stray light reception signal.

20 Claims, 41 Drawing Sheets

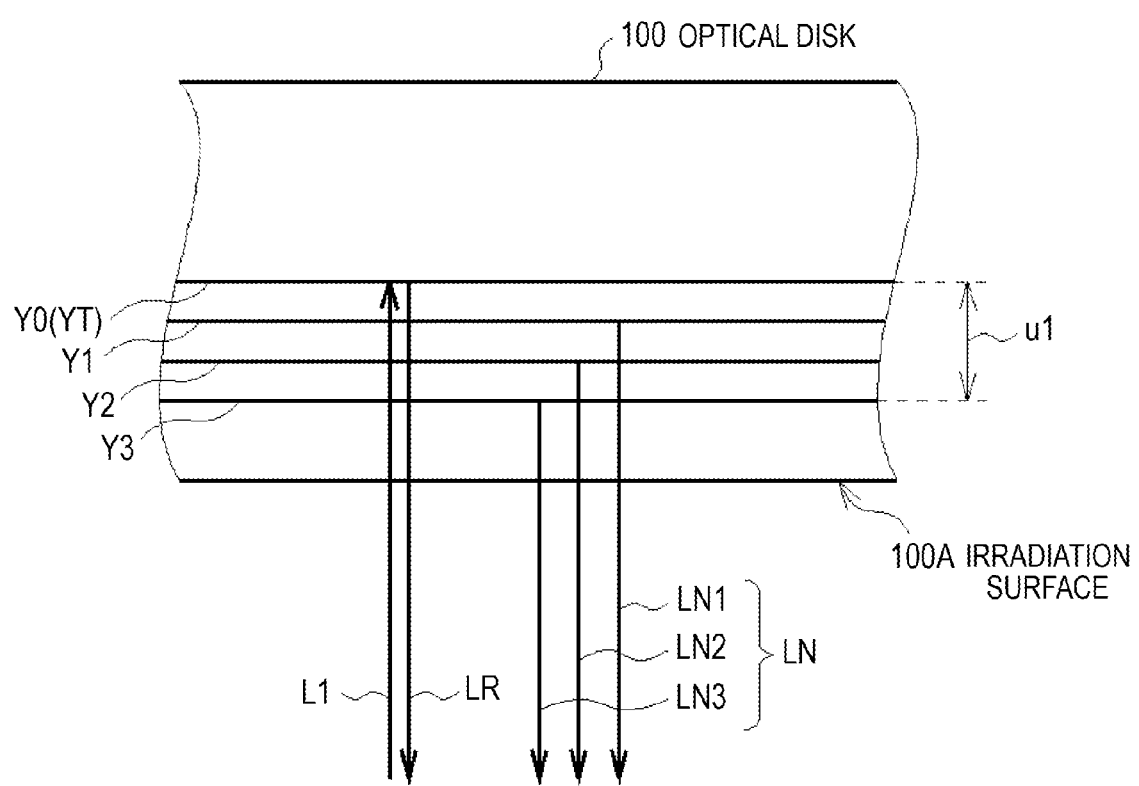

LAYER GAP IS LARGE

LAYER GAP IS SMALL

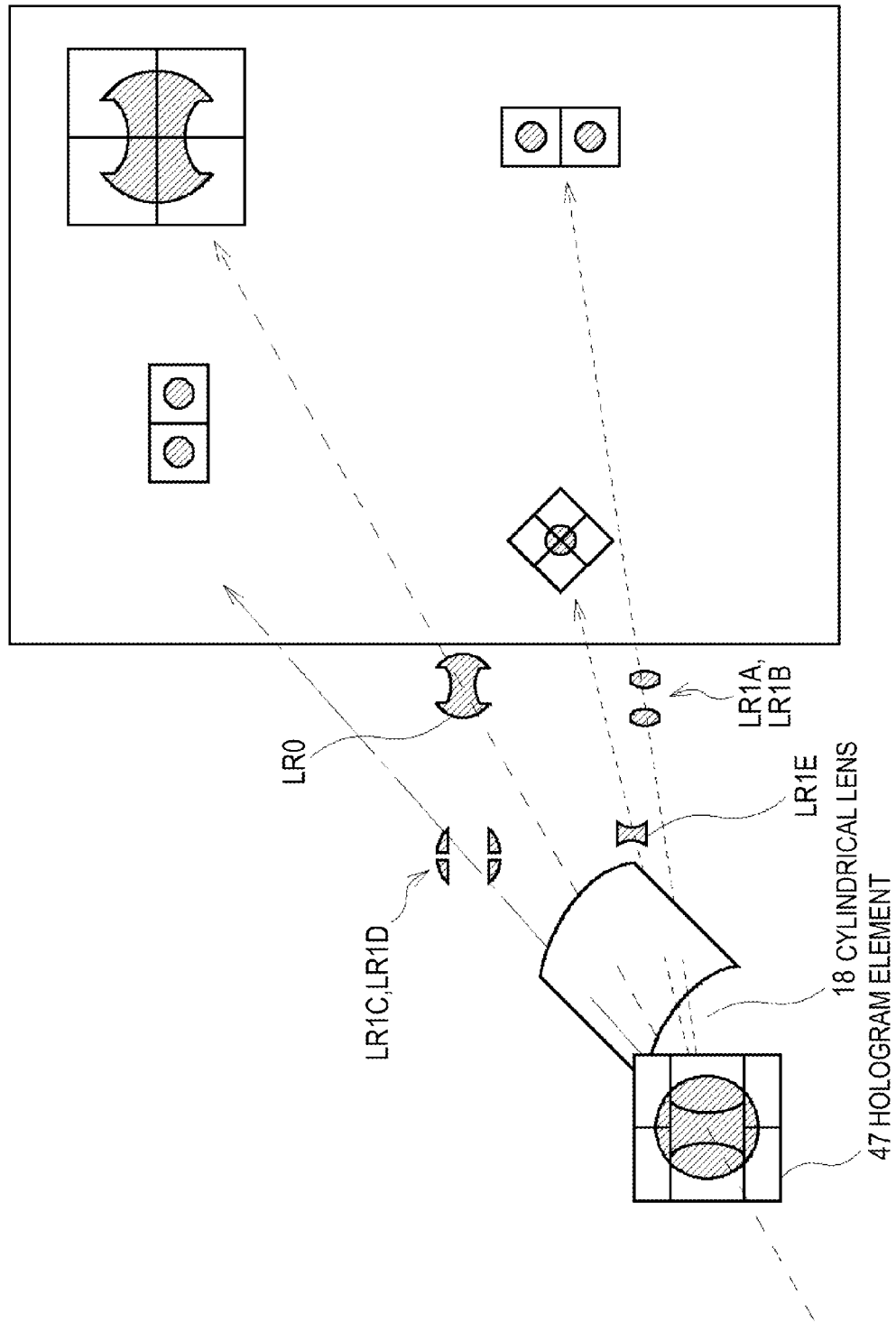

67C

LRs

↔ POLARIZATION DIRECTION

67C

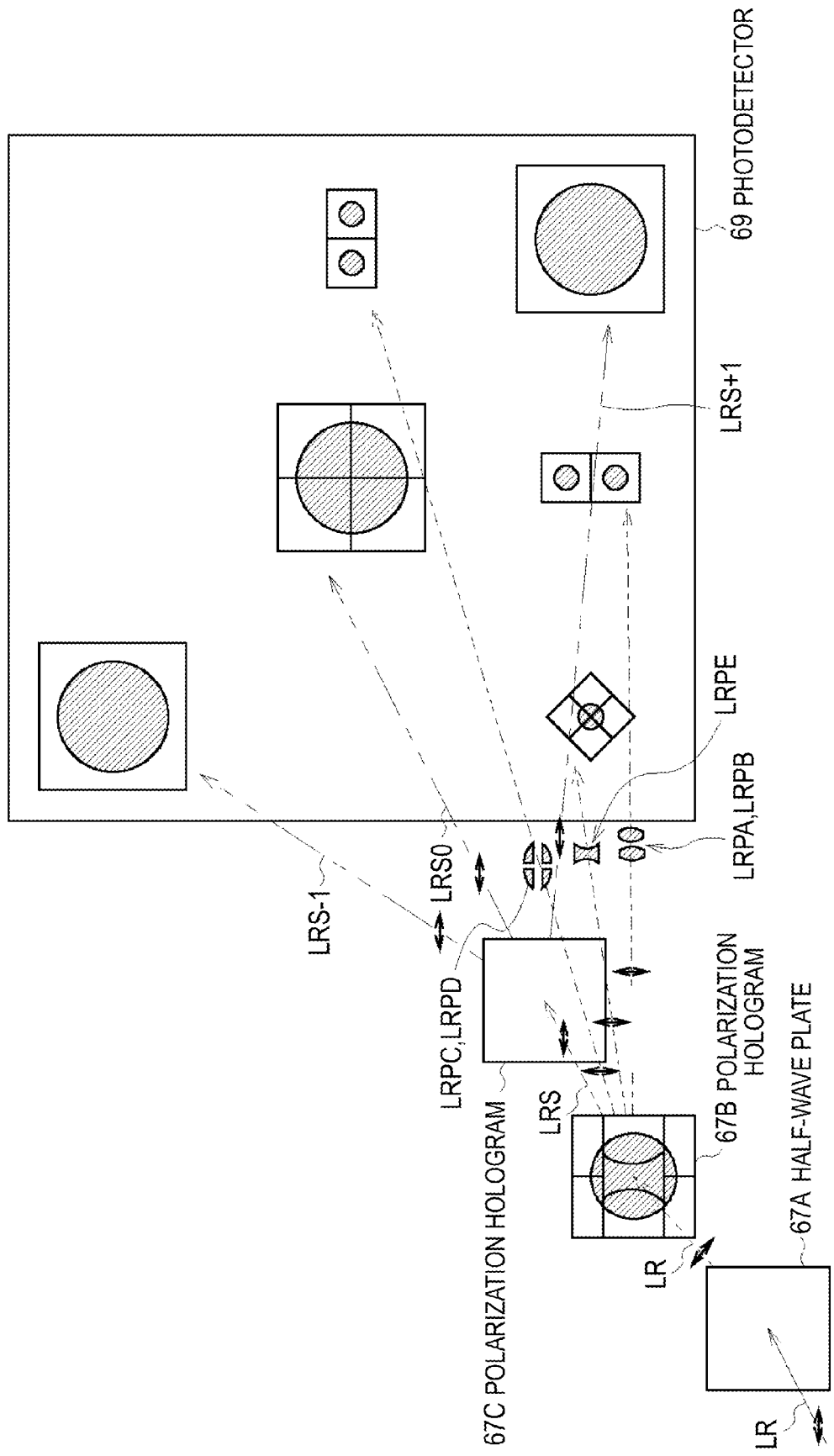

87C
LRH
POLARIZATION DIRECTION

87C

OPTICAL PICKUP AND OPTICAL DISK DEVICE

BACKGROUND OF THE INVENTION

1. Field of the Invention

The present invention relates to an optical pickup and an optical disk device and is suitably applied to, for example, an optical disk device corresponding to an optical disk having plural recording layers.

2. Description of the Related Art

In the past, an optical disk device widely used in the market is adapted to irradiate a light beam on optical disks such as a CD (Compact Disc), a DVD (Digital Versatile Disc), and a Blu-ray Disc (registered trademark, hereinafter referred to as BD) and read reflected light of the light beam to thereby reproduce information.

In the optical disks, information that should be recorded is encoded and modulated and is then recorded in spirally or concentrically formed tracks as a pit or the like.

The optical disk device is adapted to condense a light beam with an object lens and, in reproducing the information from the optical disk, focus the light beam on the tracks spirally or concentrically formed in a recording layer of the optical disk.

In the optical disk device, for example, a light receiving region of a predetermined shape is provided in a photodetector to receive the reflected light. The optical disk device calculates, on the basis of a result of the light reception, a focus error signal and a tracking error signal representing a shift amount with respect to a focus direction and a tracking direction between a track on which the light beam should be irradiated (hereinafter referred to as target track) and the focus of the light beam.

Subsequently, the optical disk device moves the object lens in the focus direction on the basis of the focus error signal and moves the object lens in the tracking direction on the basis of the tracking error signal to thereby focus the light beam on the target track.

As a method of calculating such a tracking error signal, various methods such as the push-pull method and the three-beam method are known. A method called one-beam push-pull method is also proposed (see, for example, JP-A-2007-213754 (FIG. 15)).

SUMMARY OF THE INVENTION

Among optical disks, there is an optical disk that has two recording layers and reflects a light beam in the recording layers at predetermined reflectances, respectively.

The optical disk device is adapted to, for an optical disk having plural recording layers in this way, control a light beam to be focused on a desired recording layer and detect reflected light of the light beam.

However, because of a physical characteristic of the optical disk, the optical disk typically reflects the light beam at the predetermined reflectances in the respective recording layers regardless of which recording layer is the desired recording layer.

Therefore, in the optical disk device, the light beam reflected in the other recording layers different from the desired recording layer (so-called interlayer stray light) may be irradiated on the light receiving region of the photodetector. In such a case, it is likely that an error is caused in the tracking error signal by the interlayer stray light and the optical disk device may be unable to correctly perform tracking control.

In the optical disk device, an irradiation state of the interlayer stray light is different depending on which recording layer is set as the desired recording layer.

Therefore, in the optical disk device disclosed in JP-A-2007-213754, for example, an arrangement pattern of the light receiving region, a separation pattern in separating the reflected light for each of regions, and the like are taken into account. Consequently, such an optical disk device is adapted such that, regardless of which recording layer is set as the desired recording layer, the interlayer stray light is not irradiated or, even when the interlayer stray light is irradiated, an error is not caused in the tracking error signal and the like.

It is conceivable that, in order to increase a recording capacity, for example, four or six recording layers are provided in the optical disk. In this case, the optical disk also typically reflects the light beam in the respective recording layers at the predetermined reflectances regardless of which recording layer is the desired recording layer.

In the optical disk device, regardless of which recording layer is set as the desired recording layer, the interlayer stray light typically occurs from the other recording layers. In the optical disk, depending on which recording layer is set as the desired recording layer, an interlayer distance between the desired recording layer and the other recording layers is different. An irradiation state of the interlayer stray light is different depending on the interlayer distance.

Therefore, the optical disk device having the configuration explained above may not be able to prevent interlayer stray lights that occur in an optical disk having a large number recording layers such as four or six recording layers from being irradiated on the light receiving region. In such a case, since an error occurs in the tracking error signal, it is likely that the optical disk device may not able to appropriately perform the tracking control.

Therefore, it is desirable to propose an optical pickup that can generate a light reception signal necessary for tracking control without being affected by interlayer stray light and an optical disk device that can perform the tracking control without being affected by the interlayer stray light.

According to an embodiment of the present invention, there is provided an optical pickup including: a light source that emits a light beam; an object lens that condenses the light beam on a target recording layer set as a target among plural recording layers provided in an optical disk; a lens moving unit that moves an object lens in a tracking direction substantially orthogonal to track grooves spirally or concentrically formed in the target recording layer; a condensing lens that condenses a reflected light beam of the light beam reflected by the optical disk; a hologram element that diffracts, in diffracting the reflected light beam and separating the reflected light beam into a reflected zeroth-order light beam and a reflected first-order light beam, a part of the reflected first-order light beam in a predetermined first direction with a first region, which corresponds to a portion including + first-order light diffracted by the track grooves in the reflected first-order light beam, and sets the part of the reflected first-order light beam as a first beam, diffracts a part of the reflected first-order light beam in the first direction with a second region, which corresponds to a portion including − first-order light diffracted by the track grooves in the reflected first-order light beam, and sets the part of the reflected first-order light beam as a second beam, diffracts a part of the reflected first-order light beam in a second direction different from the first direction with a third region, which corresponds to a portion not including the + first-order light and the − first-order light diffracted by the track grooves in the reflected first-order light beam and equivalent to an inner circumferential side of the optical disk, and sets the part of the reflected first-order light beam as a third beam, and diffracts a part of the reflected first-order light beam in the second direction with a fourth region, which corresponds to a portion not including the + first-order light and the − first-order light diffracted by the track grooves in the reflected first-order light beam and equivalent to an outer circumferential side of the optical disk, and sets the part of the reflected first-order light beam as a fourth beam; and a photodetector that receives the first beam and the second beam and generates light reception signals respectively with a first light receiving region and a second light receiving region provided on a first direction side in an irradiation position of the reflected zeroth-order light beam, receives the third beam and the fourth beam and generates a light reception signals respectively with a third light receiving region and a fourth light receiving region provided on a second direction side in an irradiation position of the reflected zeroth-order light beam, and receives interlayer stray light of a part of the light beam reflected by the other recording layers other than the target recording layer in the optical disk and generates a stray light reception signal with a stray light receiving region. The optical pickup causes a predetermined signal processing unit to generate, on the basis of the light reception signals respectively generated by the first light receiving region, the second light receiving region, the third light receiving region, and the fourth light receiving region and the stray light reception signal generated by the stray light receiving region, a tracking error signal representing a shift amount between a focus of the light beam and a center line of the track grooves with respect to the tracking direction. The optical pickup causes a predetermined servo control unit to move the object lens in the tracking direction via a lens moving unit on the basis of the tracking error signal.

In the optical pickup, interlayer stray light caused by a push-pull region including the + first-order light and the − first-order light of the light beam diffracted by the track grooves in the reflected light beam can be moved away from the third light receiving region and the fourth light receiving region. Interlayer stray light caused by a lens shift region not including the + first-order light and the − first-order light can be moved away from the first light receiving region and the second light receiving region. The optical pickup can receive, with the stray light receiving region of the photodetector, interlayer stray light of the light beam reflected in the other recording layers other than the target recording layer.

According to another embodiment of the present invention, there is provided an optical disk device including: a light source that emits a light beam; an object lens that condenses the light beam on a target recording layer set as a target among plural recording layers provided in an optical disk; a lens moving unit that moves an object lens in a tracking direction substantially orthogonal to track grooves spirally or concentrically formed in the target recording layer; a condensing lens that condenses a reflected light beam of the light beam reflected by the optical disk; a hologram element that diffracts, in diffracting the reflected light beam and separating the reflected light beam into a reflected zeroth-order light beam and a reflected first-order light beam, a part of the reflected first-order light beam in a predetermined first direction with a first region, which corresponds to a portion including + first-order light diffracted by the track grooves in the reflected first-order light beam, and sets the part of the reflected first-order light beam as a first beam, diffracts a part of the reflected first-order light beam in the first direction with a second region, which corresponds to a portion including − first-order light diffracted by the track grooves in the reflected first-order light beam, and sets the part of the reflected first-order light beam as a second beam, diffracts a part of the reflected first-order light beam in a second direction different from the first direction with a third region, which corresponds to a portion not including the + first-order light and the − first-order light diffracted by the track grooves in the reflected first-order light beam and equivalent to an inner circumferential side of the optical disk, and sets the part of the reflected first-order light beam as a third beam, and diffracts a part of the reflected first-order light beam in the second direction with a fourth region, which corresponds to a portion not including the + first-order light and the − first-order light diffracted by the track grooves in the reflected first-order light beam and equivalent to an outer circumferential side of the optical disk, and sets the part of the reflected first-order light beam as a fourth beam; a photodetector that receives the first beam and the second beam and generates light reception signals respectively with a first light receiving region and a second light receiving region provided on a first direction side in an irradiation position of the reflected zeroth-order light beam, receives the third beam and the fourth beam and generates light reception signals respectively with a third light receiving region and a fourth light receiving region provided on a second direction side in an irradiation position of the reflected zeroth-order light beam, and receives interlayer stray light of a part of the light beam reflected by the other recording layers other than the target recording layer in the optical disk and generates a stray light reception signal with a stray light receiving region; a signal processing unit that generates, on the basis of the light reception signals respectively generated by the first light receiving region, the second light receiving region, the third light receiving region, and the fourth light receiving region and the stray light reception signal generated by the stray light receiving region, a tracking error signal representing a shift amount between a focus of the light beam and a center line of the track grooves with respect to the tracking direction; and a servo control unit that moves the object lens in the tracking direction via a lens moving unit on the basis of the tracking error signal.

In the optical disk device, interlayer stray light caused by a push-pull region including the + first-order light and the − first-order light of the light beam diffracted by the track grooves in the reflected light beam can be moved away from the third light receiving region and the fourth light receiving region. Interlayer stray light caused by a lens shift region not including the + first-order light and the − first-order light can be moved away from the first light receiving region and the second light receiving region. The optical disk device receives, with the stray light receiving region of the photodetector, interlayer stray light of the light beam reflected in the other recording layers other than the target recording layer and generates a stray light reception signal with which the influence of the interlayer stray light can be corrected. Consequently, the optical disk device can generate a tracking error signal from which the influence of a interlayer stray light beam is eliminated.

According to the embodiments, interlayer stray light caused by a push-pull region including the + first-order light and the − first-order light of the light beam diffracted by the track grooves in the reflected light beam can be moved away from the third light receiving region and the fourth light receiving region. Interlayer stray light caused by a lens shift region not including the + first-order light and the − first-order light can be moved away from the first light receiving region and the second light receiving region. Interlayer stray light of the light beam reflected in the other recording layers other than the target recording layer can be received by the stray light receiving region of the photodetector. Therefore, according to the embodiments, it is possible to realize an optical pickup that can generate a stray light reception signal with which the influence of the interlayer stray light can be corrected.

According to the embodiments, interlayer stray light caused by a push-pull region including the + first-order light and the − first-order light of the light beam diffracted by the track grooves in the reflected light beam can be moved away from the third light receiving region and the fourth light receiving region. Interlayer stray light caused by a lens shift region not including the + first-order light and the − first-order light can be moved away from the first light receiving region and the second light receiving region. Interlayer stray light of the light beam reflected in the other recording layers other than the target recording layer is received by the stray light receiving region of the photodetector and a stray light reception signal with which the influence of the interlayer stray light can be corrected is generated. Consequently, a tracking error signal from which the influence of the interlayer stray light is eliminated can be generated. Therefore, according to the embodiments, it is possible to realize an optical disk device that can perform tracking control without being affected by the interlayer stray light.

BRIEF DESCRIPTION OF THE DRAWINGS

FIG. 3 is a schematic diagram for explaining reflection of a light beam by recording layers of an optical disk;

FIG. 10 is a schematic perspective view of a state of separation of a light beam according to the second embodiment;

FIG. 16 is a schematic perspective view of a state of separation of a light beam according to the third embodiment;

DESCRIPTION OF THE PREFERRED EMBODIMENTS

Embodiments of the present invention are explained in detail below with reference to the accompanying drawings. The explanation is made according to the following order:

1. First embodiment (an example in which a region-divided binary hologram is used)
2. Second embodiment (an example in which a region-divided hologram partially formed in a blazed type is used)
3. Third embodiment (an example in which a region-divided blazed polarization hologram and a binary polarization hologram entirely formed of a uniform diffraction grating are used)
4. Fourth embodiment (an example in which a region-divided binary polarization hologram and a blazed polarization hologram entirely formed of a uniform diffraction grating are used)
5. Fifth embodiment (an example in which a Rochon prism and a region-divided binary polarization hologram are used)
6. Sixth embodiment (an example in which a region-divided binary hologram having wavelength selectivity is used)
7. Seventh embodiment (an example in which stray light is irradiated on a stray light receiving region when a stray light layer gap is small)
8. Other embodiments

1. First Embodiment

1-1. Configuration of an Optical Disk Device

Figure 1:
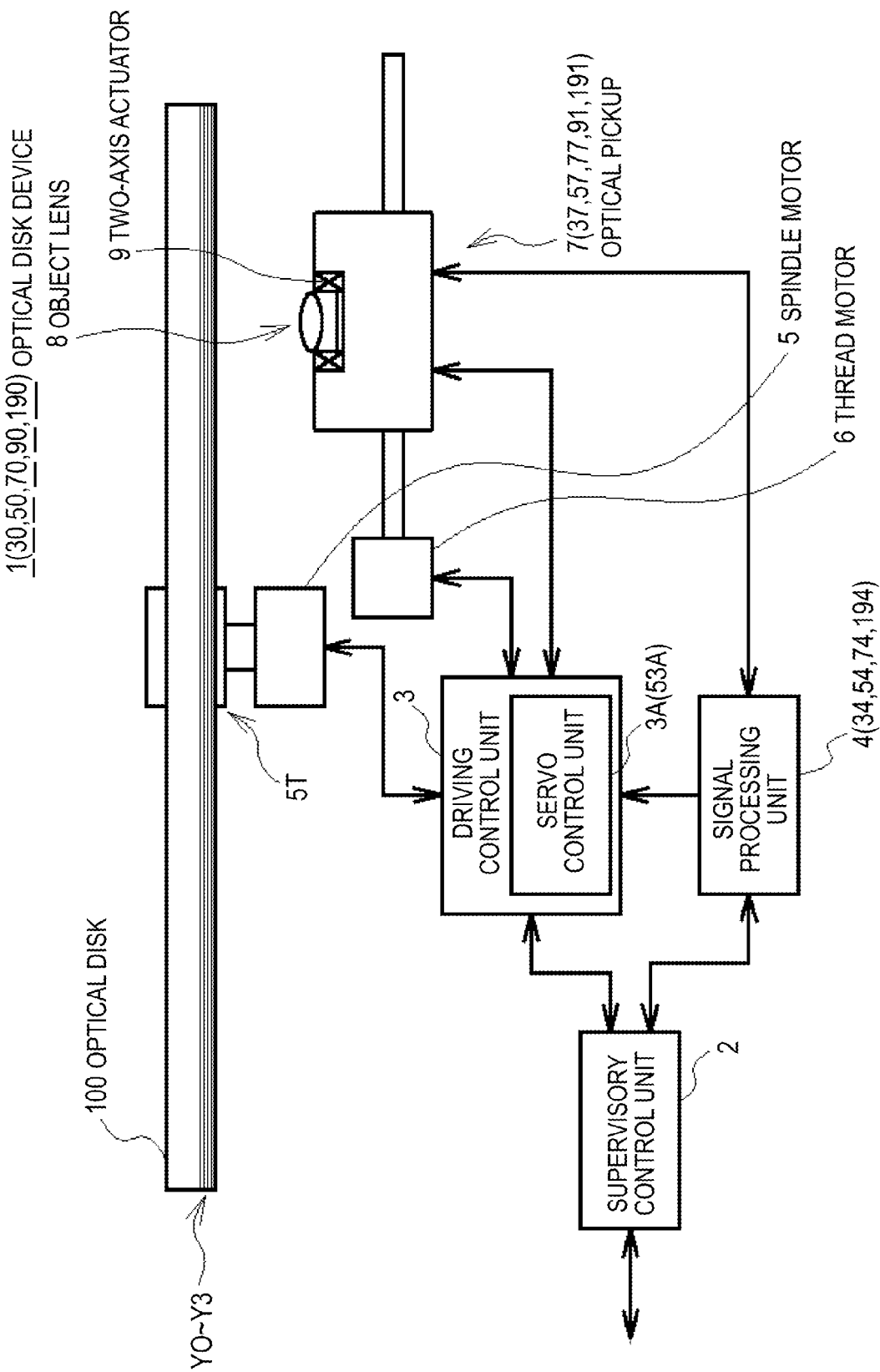
FIG. 1 is a schematic diagram of a configuration of an optical disk device according to a first embodiment of the present invention.

As shown in FIG. 1, an optical disk device 1 includes a supervisory control unit 2 as a central component. The optical disk device 1 is adapted to be capable of recording information on an optical disk 100 and reproducing the information from the optical disk 100.

In the optical disk 100, spiral or concentric track grooves are formed in recording layers Y. Information is recorded along the track grooves. The optical disk 100 includes, for example, four recording layers Y0, Y1, Y2, and Y3 (hereinafter collectively referred to as recording layer Y).

The supervisory control unit 2 includes a not-shown CPU (Central Processing Unit), a ROM (Read Only Memory) in which various programs and the like are stored, and a RAM (Random Access Memory) used as a work memory for the CPU.

When information is reproduced from the optical disk 100, the supervisory control unit 2 drives to rotate a spindle motor 5 via a driving control unit 3 and rotates the optical disk 100 placed on a turntable 5T at desired speed.

The supervisory control unit 2 is adapted to drive a thread motor 6 via the driving control unit 3 to thereby largely move an optical pickup 7 along a moving axis in a tracking direction, i.e., a direction toward an inner circumferential side or an outer circumferential side of the optical disk 100.

Plural components such as an object lens 8 and a two-axis actuator 9 are attached to the optical pickup 7. The optical pickup 7 is adapted to irradiate a light beam on the optical disk 100 on the basis of the control by the supervisory control unit 2.

When the light beam is irradiated on the optical disk 100, the supervisory control unit 2 is adapted to select, as a target recording layer YT, the recording layer Y from which information is read out among the recording layers Y0 to Y3, i.e., the recording layer Y on which the light beam should be focused.

The optical pickup 7 is adapted to receive a reflected light beam of the light beam reflected on the optical disk 100, generate a light reception signal corresponding to a result of the light reception, and supply the light reception signal to a signal processing unit 4.

The signal processing unit 4 performs predetermined arithmetic processing using the supplied light reception signal to thereby generate a focus error signal and a tracking error signal and supplies the focus error signal and the tracking error signal to the driving control unit 3.

A servo control unit 3A of the driving control unit 3 generates, on the basis of the focus error signal and the tracking error signal supplied to the driving control unit 3, a driving signal for driving the object lens 8 and supplies the driving signal to the two-axis actuator 9 of the optical pickup 7.

The two-axis actuator 9 of the optical pickup 7 is adapted to perform focus control and tracking control for the object lens 8 on the basis of the driving signal and adjust a focus position of the light beam condensed by the object lens 8 (explained in detail later).

The driving control unit 3 is adapted to receive notification of the target recording layer YT from the supervisory control unit 2 and perform focus control to focus the light beam on the target recording layer YT.

The signal processing unit 4 is adapted to be capable of reproducing information recorded on the optical disk 100 by applying predetermined arithmetic processing, demodulation processing, decoding processing, and the like to the light reception signal.

When information is recorded on the optical disk 100, the supervisory control unit 2 receives information that should be recorded from a not-shown external apparatus or the like and supplies the information to the signal processing unit 4. The signal processing unit 4 applies predetermined encoding processing, modulation processing, and the like to the information to thereby generate a recording signal and supplies the recording signal to the optical pickup 7.

The optical pickup 7 sets the light beam to intensity for recording and modulates the light beam according to the recording signal to thereby form a recording mark corresponding to the recording signal. For example, when the optical disk 100 adopts a recording system same as BD-RE (Blu-ray Disc-Rewritable), the optical pickup 7 locally phase-changes a material forming the recording layers to thereby form the recording mark.

In this way, the optical disk device 1 is adapted to be capable of performing information reproduction processing and information recording processing while causing the optical pickup 7 to irradiate a light beam on the optical disk 100 and performing focus control and tracking control on the basis of reflected light of the light beam.

1-2. Configuration of the Optical Pickup

Figure 2:
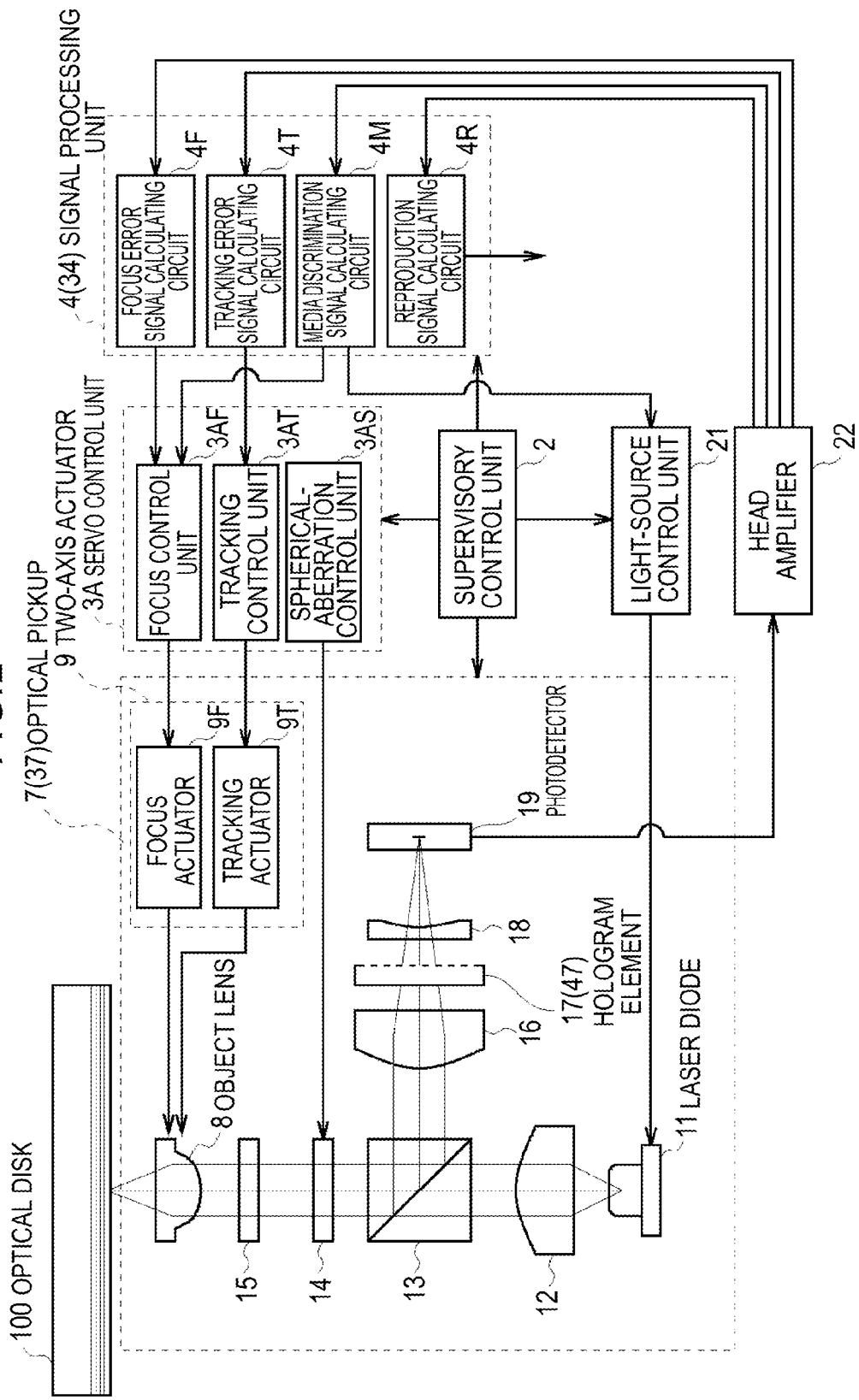
FIG. 2 is a schematic diagram of a configuration of an optical pickup according to the first embodiment.

As shown in FIG. 2, the optical pickup 7 is adapted to irradiate a light beam L1 on the optical disk 100 and receive a reflected light beam LR of the light beam L1 reflected by the optical disk 100.

A laser diode 11 is adapted to be capable of emitting, as diverging light, the light beam L1 including blue-purple laser light having a wavelength of about 405 nm under the control by a light-source control unit 21. An attachment angle and the like of the laser diode 11 are adjusted such that the light beam L1 changes to P polarized light.

In practice, the supervisory control unit 2 controls the light-source control unit 21 to thereby cause the laser diode 11 to emit a light beam L and make the light beam L incident on a collimator lens 12. The collimator lens 12 converts the light beam L from the diverging light into parallel light and makes the light beam L incident on a polarization beam splitter 13.

The polarization beam splitter 13 has a reflecting and transmitting surface 13S, transmittance of which varies according to a polarization direction of a light beam. The polarization beam splitter 13 is adapted to transmit a light beam of P polarized light at a rate of about 100% and reflects a light beam of S polarized light at a rate of about 100%.

In practice, the polarization beam splitter 13 transmits the light beam L1 through the reflecting and transmitting surface 13S at a rate of about 100% and makes the light beam L1 incident on a spherical-aberration correcting unit 14.

The spherical-aberration correcting unit 14 is made of, for example, a liquid crystal element and is adapted to change spherical aberration of the light beam L1 and make the light beam L1 incident on a quarter-wave plate 15. The spherical-aberration correcting unit 14 is also adapted to be capable of adjusting a degree of change in spherical aberration by the liquid crystal element with a spherical-aberration control unit 3AS of the serve control unit 3A.

In practice, the spherical-aberration correcting unit 14 imparts to the light beam L1 in advance, on the basis of the control by the supervisory control unit 2 and the spherical-aberration control unit 3AS, spherical aberration having a characteristic opposite to that of spherical aberration that occurs when the light beam L1 is condensed and reaches the target recording layer YT of the optical disk 100. Consequently, the spherical-aberration correcting unit 14 is adapted to correct and obtain spherical aberration at the time when the light beam L1 reaches the target recording layer YT.

The quarter-wave plate 15 is adapted to be capable of converting a light beam between linearly polarized light and circularly polarized light. For example, the quarter-wave plate 15 converts the light beam L1 formed by P polarized light into left circularly polarized light and makes the light beam L1 incident on the object lens 8.

The object lens 8 condenses the light beam L1. The supervisory control unit 2 adjusts, via a focus control unit 3AF, a position of the object lens 8 with respect to the focus direction with a focus actuator 9F. Therefore, the object lens 8 irradiates the light beam L1 to generally set a focus F1 of the light beam L1 on the target recording layer YT of the optical disk 100.

The light beam L1 is reflected on the target recording layer YT to be changed to a reflected light beam LR and is made incident on the object lens 8. The reflected light beam LR changes to right circularly polarized light because a rotating direction in circularly polarized light is reversed during reflection.

For example, when the recording layer Y0 is the target recording layer YT, as shown in FIG. 3, the light beam L1 is reflected on the recording layer Y0 to thereby change to the reflected light beam LR.

Thereafter, the reflected light beam LR is converted from the diverging light into parallel light by the object lens 8, converted from the right circularly polarized light into S polarized light (linearly polarized light) by the quarter-wave plate 15, and made incident on the spherical-aberration correcting unit 14.

The spherical-aberration correcting unit 14 corrects spherical aberration that occurs until the reflected light beam LR passes through the object lens 8 after being reflected by the target recording layer YT and makes the reflected light beam LR incident on the polarization beam splitter 13.

The polarization beam splitter 13 reflects the reflected light beam LR formed by S polarized light on the reflecting and transmitting surface 13S and makes the reflected light beam LR incident on a condensing lens 16. The condensing lens 16 converts the reflected light beam LR into converging light and makes the reflected light beam LR incident on a hologram element 17.

The hologram element 17 diffracts, with a characteristic of a diffractive element, the reflected light beam LR and separates the reflected light beam LR into at least zeroth-order light and first-order light, causes a reflected light beam LR0 formed by the zeroth-order light to travel substantially straight, causes a reflected light beam LR1 formed by the first-order light to travel in a direction different from that of the zeroth-order light, and makes the reflected light beams incident on a cylindrical lens 18.

Figure 4A:
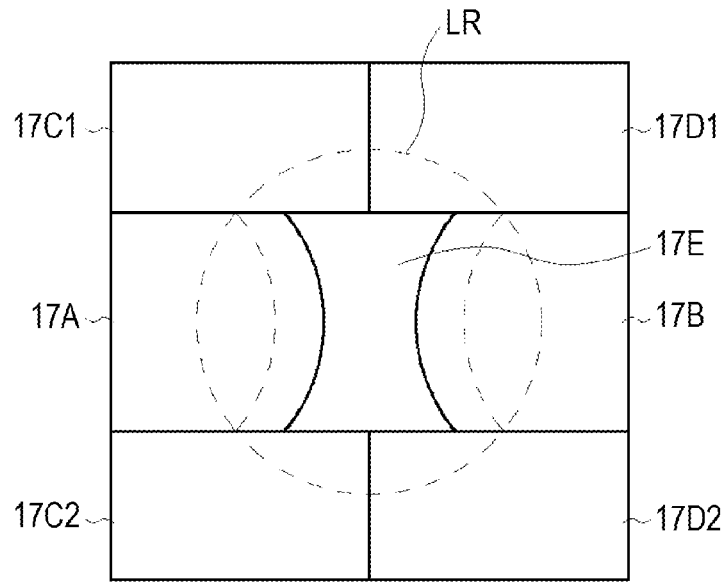
FIGS. 4A and 4B are schematic diagrams of a configuration of a hologram element according to the first embodiment.
Figure 4B:
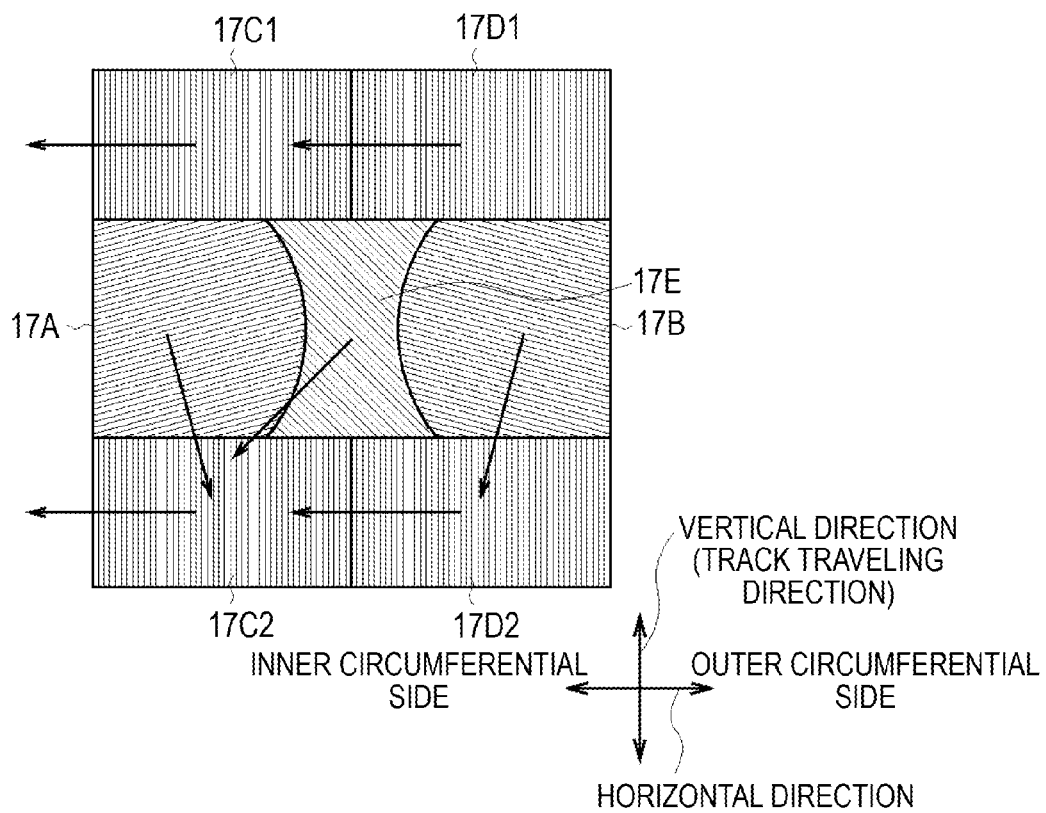

As shown in FIG. 4A, in the hologram element 17, a portion where the reflected light beam LR passes is divided into plural regions 17A to 17E. As shown in FIG. 4B, a diffracting direction of the reflected light beam LR is set for each of the regions.

The region 17A sets, as a reflected light beam LR1A, a portion in the reflected light beam LR1 including first-order diffracted light (i.e., + first-order light or − first-order light) diffracted by tracks of the optical disk 100 and equivalent to an inner circumferential side portion of the optical disk 100. The region 17A diffracts the reflected light beam LR1A in a direction generally along a traveling direction of the tracks (for convenience, this direction is hereinafter referred to as vertical direction).

The region 17B sets, as a reflected light beam LR1B, a portion in the reflected light beam LR1 including the first-order diffracted light (i.e., − first-order light or + first-order light) diffracted by the tracks of the optical disk 100 and equivalent to an outer circumferential side portion of the optical disk 100. The region 17B diffracts the reflected light beam LR1B generally in the vertical direction slightly more largely than the reflected light beam LR1A.

The regions 17C1 and 17C2 set (hereinafter collectively referred to as region 17C), as a reflected light beam LR1C, a portion in the reflected light beam LR1 hardly including the first-order diffracted light diffracted by the tracks of the optical disk 100 and equivalent to the inner circumferential side portion of the optical disk 100 of the region excluding a center portion of the reflected light beam LR1. The region 17C diffracts the reflected light beam LR1C in a direction substantially orthogonal to the traveling direction of the tracks (for convenience, this direction is hereinafter referred to as horizontal direction).

The regions 17D1 and 17D2 set (hereinafter collectively referred to as region 17D), as a reflected light beam LR1D, a portion in the reflected light beam LR1 hardly including the first-order diffracted light diffracted by the tracks of the optical disk 100 and equivalent to the outer circumferential side portion of the optical disk 100 in a region excluding the center portion of the reflected light beam LR1. The region 17D diffracts the reflected light beam LR1D generally in the horizontal direction slightly smaller than the reflected light beam LR1C.

The region 17E sets the center portion of the reflected light beam LR1 as a reflected light beam LR1E. The region 17E diffracts the reflected light beam LR1E in an oblique direction substantially in the middle of the vertical direction and the horizontal direction, i.e., a left downward direction in the figure.

In this way, the hologram element 17 is adapted to set, as the reflected light beams LR1A and LR1B, portions in the reflected light beam LR1 formed by first-order light including a push-pull component (i.e., a component, a light amount of which fluctuates when the focus F1 of the light beam L1 is displaced to an inner circumferential side or an outer circumferential side with respect to a desired track) and diffract the reflected light beams LR1A and LR1B in the vertical direction.

The hologram element 17 is adapted to set, as the reflected light beams LR1C and LR1D, portions in the reflected light beam LR1 hardly including the push-pull component and present in the front and rear in the traveling direction of the tracks and diffract the reflected light beams LR1C and LR1D in the horizontal direction.

In the hologram element 17, a so-called binary hologram is formed in the regions 17A to 17E. Therefore, actually, + first-order light and − first-order light are generated by a diffracting action. However, the optical pickup 7 is adapted to use only one of the + first-order light and the − first-order light as first-order diffracted light and not use the other.

As explained above, the hologram element 17 is adapted to diffract the reflected light beam LR1 in the direction set for each of the regions to thereby divide the reflected light beam LR1 into the plural reflected light beams LR1A to LR1E.

The cylindrical lens 18 imparts astigmatism to the reflected light beam LR0 formed by the zeroth-order light and irradiates the reflected light beam LR0 on the photodetector 19.

The cylindrical lens 18 also imparts, because of an optical characteristic thereof, astigmatism to the reflected light beams LR1A, LR1B, LR1C, LR1D, and LR1E formed by the first-order light. However, aberration for offsetting the astigmatism is imparted to the reflected light beams LR1A to LR1E in advance by a diffraction grating formed in the hologram element 17. Consequently, the reflected light beams LR1A to LR1E are adapted not to have aberration at a point when the reflected light beams LR1A to LR1E are emitted from the cylindrical lens 18.

Figure 5:
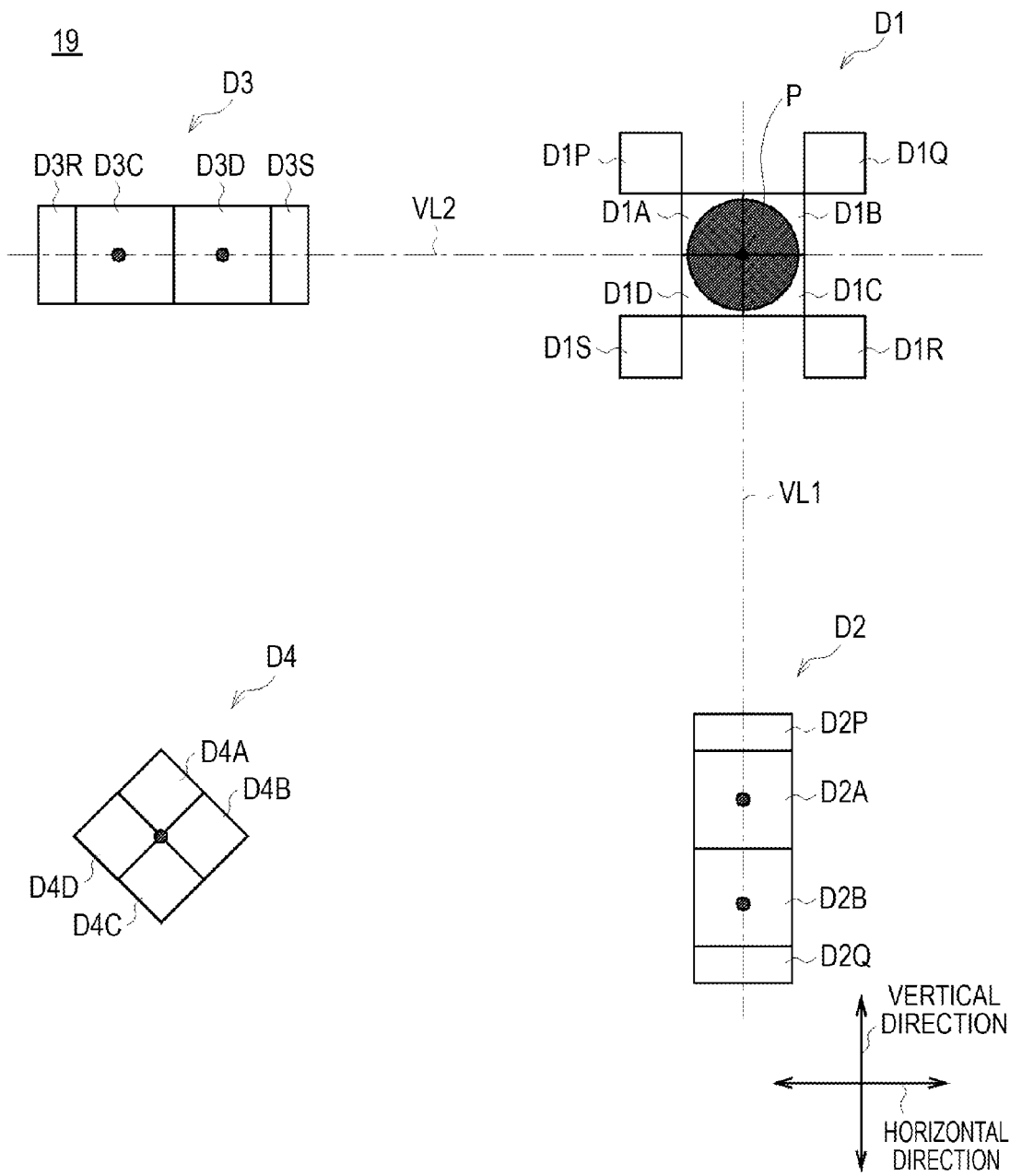
FIG. 5 is a schematic diagram of a configuration of a photodetector according to the first embodiment.

In the photodetector 19, as shown in FIG. 5, plural light receiving units D1 to D4 are formed. Further, plural light receiving regions are formed in each of the light receiving units D1 to D4.

The light receiving unit D1 is adapted to receive the reflected light beam LR0 formed by the zeroth-order light with light receiving regions D1A, D1B, D1C, and D1D obtained by dividing the light receiving unit D1 into two in each of the vertical and horizontal directions, i.e., dividing the light receiving unit D1 into four in a lattice shape around a reference point P corresponding to an optical axis of the reflected light beam LR0. All the light receiving regions D1A to D1D are formed in a substantially regular square formed in substantially the same sizes.

The light receiving regions D1A, D1B, D1C, and D1D are adapted to generate light reception signals S1A, S1B, S1C, and S1D corresponding to light reception amounts thereof, respectively, and send the light reception signals S1A, S1B, S1C, and S1D to a head amplifier 22 (FIG. 2).

Stray light receiving regions D1P, D1Q, D1R, and D1S for detecting stray light (explained in detail later) are provided around the light receiving regions D1A, D1B, D1C, and D1D. The stray light receiving regions D1P, D1Q, D1R, and D1S are adapted to generate light reception signals S1P, S1Q, S1R, and S1S corresponding to light reception amounts thereof, respectively, and send the light reception signals S1P, S1Q, S1R, and S1S to the head amplifier 22 (FIG. 2).

In the light receiving unit D2, light receiving regions D2A and D2B are provided in places separated from the reference point P in the vertical direction and are arranged side by side in the vertical direction, i.e., along an imaginary straight line VL1 extended from the reference point P in the vertical direction. Both the light receiving regions D2A and D2B are formed in a substantially regular square formed in substantially the same sizes.

The light receiving regions D2A and D2B are adapted to receive the reflected light beams LR1A and LR1B, respectively, generate light reception signals S2A and S2B corresponding to light reception amounts thereof, respectively, and send the light reception signals S2A and S2B to the head amplifier 22 (FIG. 2).

Further, in the light receiving unit D2, stray light receiving regions D2P and D2Q for detecting stray light are provided along the vertical direction to be adjacent to the light receiving regions D2A and D2B, respectively. The stray light receiving regions D2P and D2Q are adapted to generate light reception signals S2P and S2Q corresponding to light reception amounts thereof, respectively, and send the light reception signals S2P and S2Q to the head amplifier 22 (FIG. 2).

In the light receiving unit D3, light receiving regions D3C and D3D are provided in places separated from the reference point P in the horizontal direction and are arranged side by side in the horizontal direction, i.e., along an imaginary straight line VL2 extended from the reference point P in the horizontal direction. Both the light receiving regions D3C and D3D are formed in a substantially regular square in substantially the same sizes.

The light receiving regions D3C and D3D receive the reflected light beams LR1C and LR1D, respectively, generate light reception signals S3C and S3D corresponding to light reception amounts thereof, respectively, and send the light reception signals S3C and S3D to the head amplifier 22 (FIG. 2).

Further, in the light receiving unit D3, stray light receiving regions D3R and D3Q for detecting stray light are provided along the horizontal direction to be adjacent to the light receiving regions D3C and D3D, respectively. The stray light receiving regions D3R and D3S are adapted to generate light reception signals S3R and S3S corresponding to light reception amounts thereof, respectively, and send the light reception signals S3R and S3S to the head amplifier 22 (FIG. 2).

The light receiving unit D4 is adapted to receive the reflected light beam LR1E with light reception regions D4A, D4B, D4C, and D4D provided in places separated from the reference point P in oblique directions (i.e., directions substantially in the middle of the vertical direction and the horizontal direction) and obtained by dividing the light receiving unit D4 into four in a lattice shape. Dividing directions for the light receiving regions in the light receiving unit D4 are set at about 45 degrees with respect to the dividing directions in the light receiving unit D1. All the light receiving regions D4A to D4D are formed in a substantially regular square in substantially the same sizes.

The light receiving regions D4A, D4B, D4C, and D4D are adapted to generate light reception signals S4A, S4B, S4C, and S4D corresponding to light reception amounts thereof, respectively, and send the light reception signals S4A, S4B, S4C, and S4D to the head amplifier 22 (FIG. 2).

Figure 6:
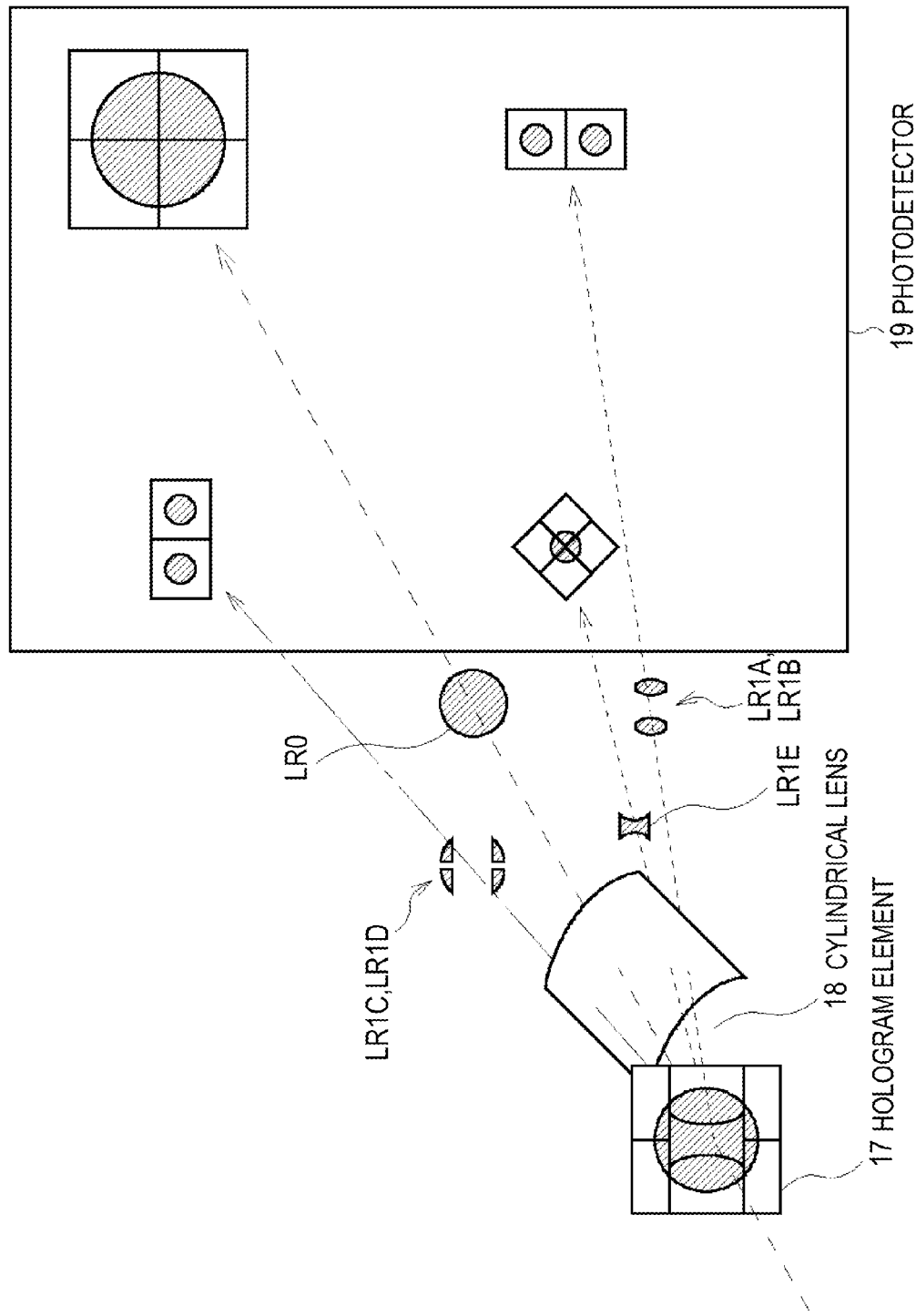
FIG. 6 is a schematic perspective view of a state of separation of a light beam according to the first embodiment.

A state in which the reflected light beam LR1 is diffracted by the hologram element 17, divided into plural beams, and irradiated on the photodetector 19 in the optical pickup 7 can be stereoscopically represented as schematically shown in FIG. 6.

In this way, the photodetector 19 is adapted to receive the reflected light beams LR0 and LR1A to LR1E with the light receiving regions of the light receiving units D1 to D4, respectively, generate light reception signals corresponding to light reception amounts thereof, respectively, and supply the light reception signals to the head amplifier 22.

The optical pickup 7 is adapted such that the reflected light beams LR1A, LR1B, LR1C, LR1D, and LR1E are focused on the photodetector 19 according to the design and the like of the condensing lens 16 and the hologram element 17. Therefore, beam spots formed in the light receiving units D2, D3, and D4 of the photodetector 19, respectively, converge generally in a dot shape.

1-3. Irradiation of Stray Light and Arrangement of Light Receiving Regions

The optical disk 100 is adapted to typically reflect a light beam at predetermined reflectance in the recording layers Y1 to Y3 and transmit the remaining light beam and reflect the light beam transmitted through the recording layer Y1 on the recording layer Y0.

Therefore, as shown in FIG. 3, even if, for example, the recording layer Y0 is selected as the target recording layer YT by the optical disk device 1, the light beam L1 is typically reflected by the other recording layers Y1 to Y3. A light beam as a part of the light beam L1 reflected by the other recording layers Y1 to Y3 is referred to as an interlayer stray light beam LN.

The interlayer stray light beam LN is diffracted by the hologram element 17 through an optical path same as that of the reflected light beam LR and then finally irradiated on the photodetector 19.

However, optical path length until the interlayer stray light beam LN reaches the photodetector 19 after being emitted from the object lens 8 as the light beam L1 is different from that of the reflected light beam LR.

In the optical pickup 7, the arrangement, optical characteristics, and the like of the various optical components are set such that the photodetector 19 is a confocal point of the target recording layer YT concerning the reflected light beam LR. Therefore, the interlayer stray light beam LN is divided by a division pattern same as that for the reflected light beam LR and irradiated on the photodetector 19 in an off-focus state, a so-called defocused state.

Further, the optical disk 100 includes the plural (three in this case) other recording layers Y1 to Y3. The defocus state on the photodetector 19 is different in the interlayer stray light beam LN depending on which of the other recording layers Y1 to Y3 reflects a light beam.

Figure 7A:
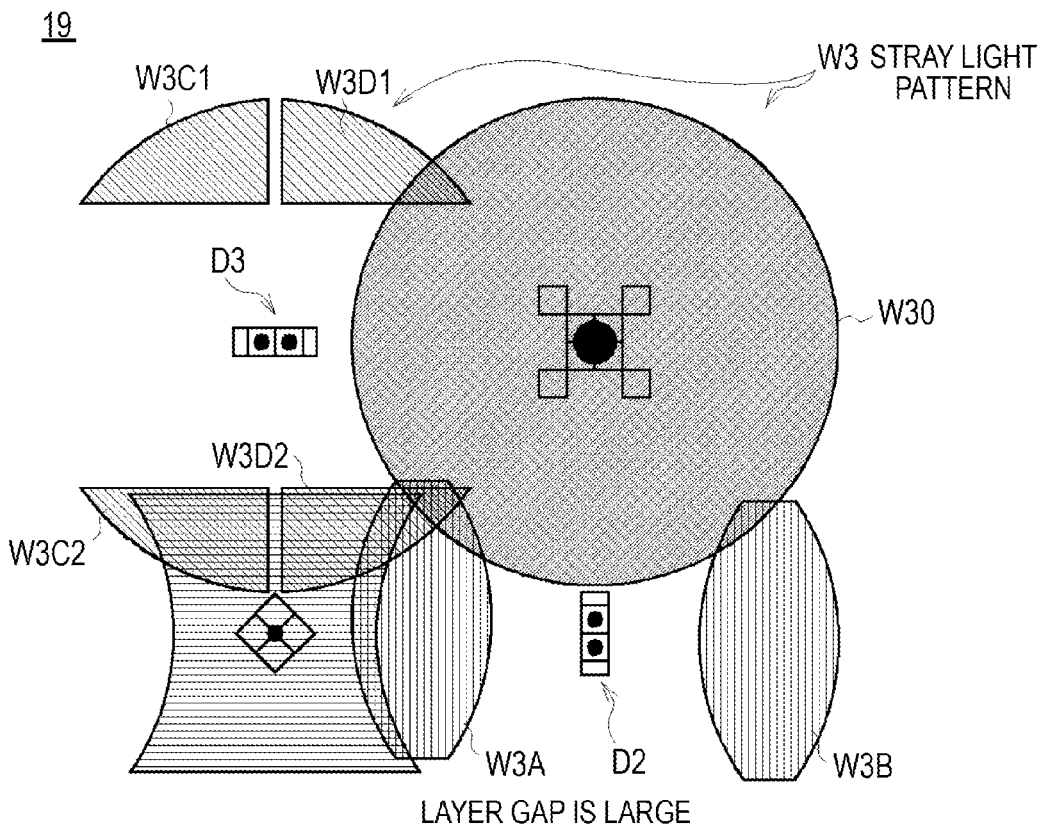
FIGS. 7A and 7B are schematic diagrams of formation of a stray light pattern (1)

The interlayer stray light beam LN reflected by, for example, another recording layer Y3, i.e., the recording layer Y most distant from the recording layer Y0 as the target recording layer YT (hereinafter referred to as interlayer stray light beam LN3) forms, as shown in FIG. 7A, stray light patterns W3 that spread relatively large on the photodetector 19.

As the stray light patterns W3, a stray light pattern W30 of the zeroth-order light is formed by the hologram element 17, stray light patterns W3A and W3B are formed by the regions 17A and 17B in the first-order light, and stray light patterns W3C1, W3C2, W3D1, and W3D2 are formed by the regions 17C1, 17C2, 17D1, and 17D2, respectively.

As shown in FIG. 7A, concerning the stray light pattern W3 having a largest irradiation range, the light receiving units D2 and D3 of the photodetector 19 are arranged such that the stray light pattern W30, the stray light patterns W3A and W3B, and the stray light patterns W3C1, W3C2, W3D1, and W3D2 do not lie over the light receiving units D2 and D3.

Figure 7B:
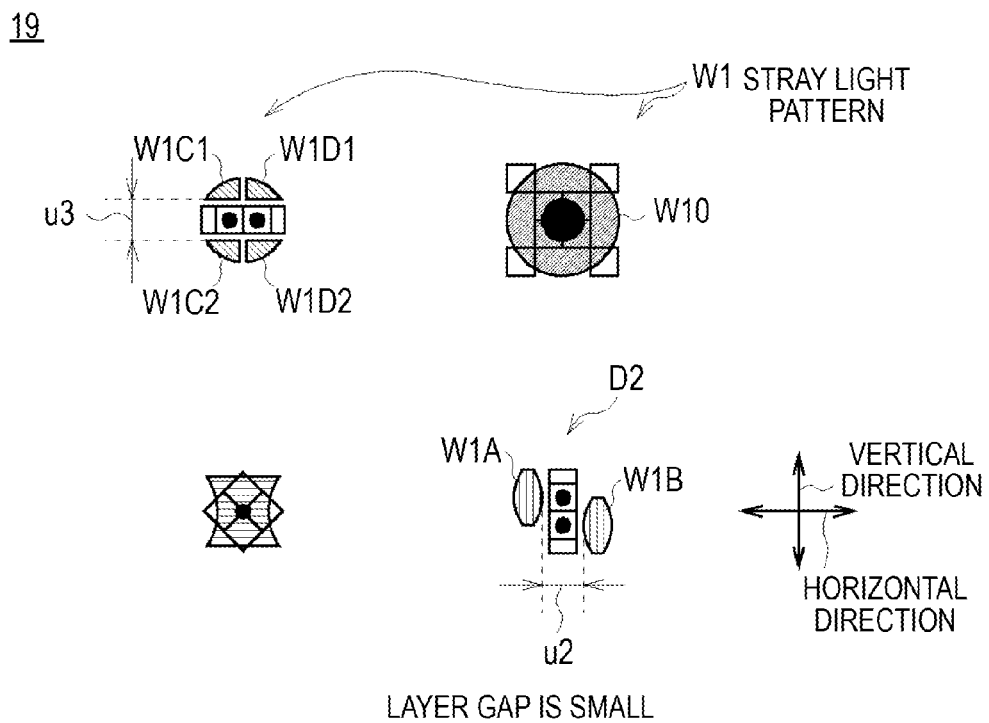

On the other hand, the interlayer-stray light beam LN reflected by another recording layer Y1, i.e., the recording layer Y near the recording layer Y0 as the target recording layer YT (hereinafter referred to as interlayer stray light beam LN1) forms, as shown in FIG. 7B, stray light patterns W1 that shrink in a relatively small range on the photodetector 19.

The stray light patterns W1 correspond to the stray light patterns W3. As the stray light patterns W1, a stray light pattern W10 of the zeroth-order light is formed by the hologram element 17, stray light patterns W1A and W1B are formed by the regions 17A and 17B in the first-order light, and stray light patterns W1C1, W1C2, W1D1, and W1D2 are formed by the regions 17C1, 17C2, 17D1, and 17D2, respectively.

As shown in FIG. 7B, in the case of the stray light pattern W1 having a smallest irradiation range, the light receiving unit D2 of the photodetector 19 is arranged such that the stray light patterns W1A and W1B formed by the regions 17A and 17B of the hologram element 17 do not lie over the light receiving unit D2.

A gap u2 between the stray light patterns W1A and W1B is relatively small as shown in FIG. 7B. When another recording layer Y is present further on an inner side than the target recording layer YT, the stray light patterns W1A and W1B move to positions reversed with respect to an imaginary straight line VL1 (FIG. 5). Therefore, in the photodetector 19, the light receiving regions D2A and D2B are arranged in the vertical direction rather than the horizontal direction and the width in the horizontal direction is set smaller than the gap u2.

In the case of the stray light patterns W1, the light receiving unit D3 of the photodetector 19 is arranged such that the stray light patterns W3C1, W3C2, W3D1, and W3D2 formed by the regions 17C1, 17C2, 17D1, and 17D2 of the hologram element 17 do not lie over the light receiving unit D3.

A gap u3 between the stray light patterns W1C1 and W1C2 is relatively small as shown in FIG. 7B. Therefore, in the photodetector 19, the light receiving regions D3C and D3D are arranged in the horizontal direction rather than the vertical direction and the width in the vertical direction is set smaller than the gap u3.

Figure 8:
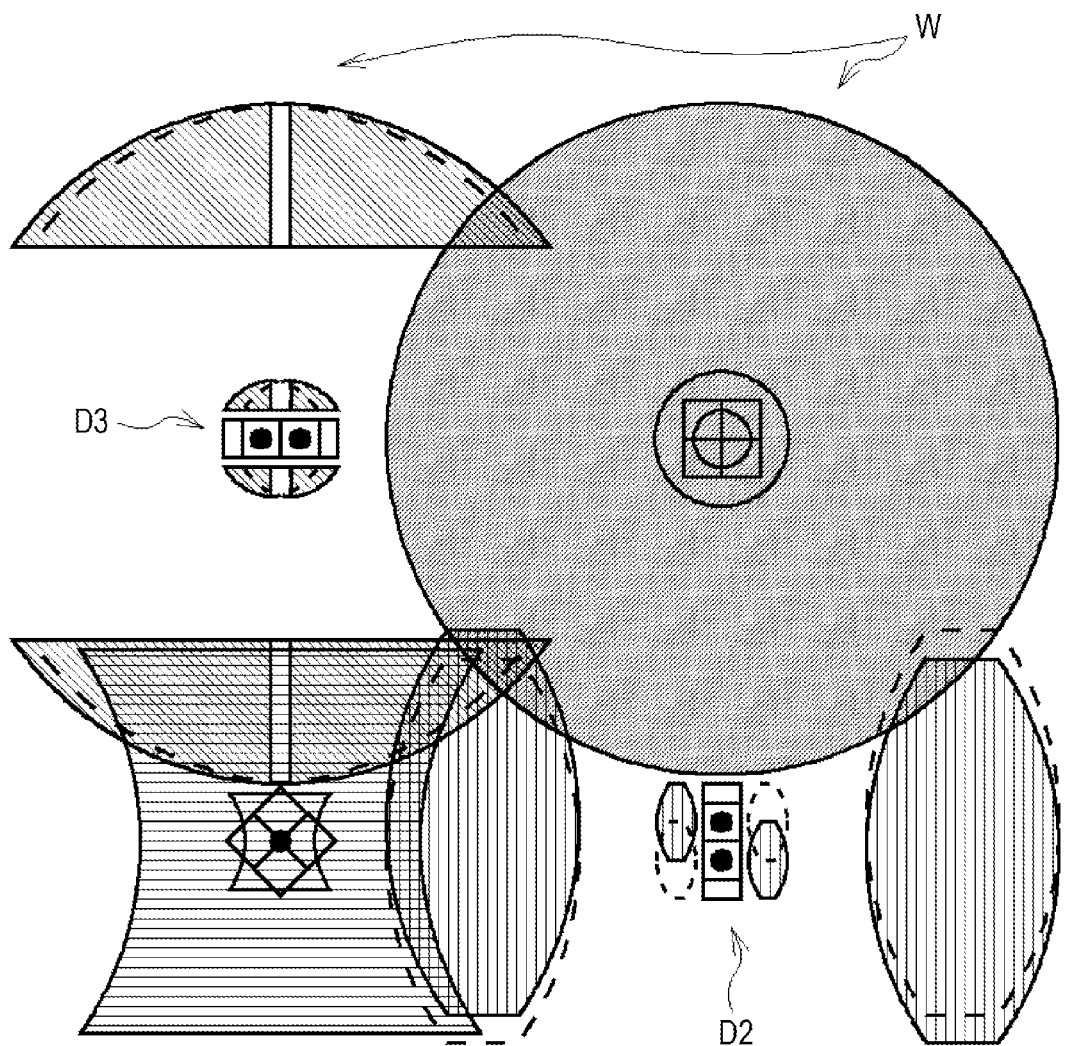
FIG. 8 is a schematic diagram of formation of a stray light pattern (2)

The stray light pattern W formed on the photodetector 19 when, for example, an interlayer gap between the target recording layer YT and the recording layer Y3 is 45 μm and the stray light pattern W formed on the photodetector 19 when an interlayer gap between the target recording layer YT and the recording layer Y1 is 10 μm are shown in FIG. 8 in an overlapped state.

In FIG. 8, the stray light pattern W formed when another recording layer Y is present further on a front side than the target recording layer YT viewed from an irradiation surface 100A side of the optical disk 100 is indicated by a solid line. The stray light pattern W formed when another recording layer Y is present further on an inner side than the target recording layer YT is indicated by a broken line.

In this way, the light receiving regions of the photodetector 19 are arranged such that, even when stray light patterns W of various sizes are formed by the various interlayer stray light beams LN reflected by the other recording layers Y having different distances from the target recording layer YT, the stray light patterns do not lie over the light receiving units D2 and D3.

In the optical pickup 7, when an attachment position of the photodetector 19 is adjusted, a detection result in the light receiving unit D4 is used.

Specifically, in an assembly process or the like of the optical pickup 7, after the optical disk 100 for adjustment is inserted therein, the optical pickup 7 irradiates the light beam L1 on the optical disk 100 on the basis of control of the supervisory control unit 2.

According to the irradiation of the light beam L1, the reflected light beam LR0 formed by the zeroth-order light is irradiated on the light receiving unit D1 of the photodetector 19 in a state in which the reflected light beam LR0 has astigmatism.

In this assembly process, an attachment position of the photodetector 19 with respect to a direction along the optical axis of the reflected light beam LR0 and an attachment position thereof on a plane orthogonal to the optical axis are finely adjusted such that a focus error signal SFE1 explained later has a value "0".

Consequently, the attachment position of the photodetector 19 with respect to the direction along the optical axis of the reflected light beam LR0 is optimized. An attachment position thereof with respect to the vertical direction and the horizontal direction is also optimized.

An attachment angle of the photodetector 19 around the reference point P is adjusted such that a sum of the light reception signals S4A and S4D and a sum of the light reception signals S4B and S4C are at substantially the same signal levels. Consequently, an attachment angle of the photodetector 19 with respect to the rotating direction around the reference point P is also optimized.

Further, a position of the hologram element 17 with respect to the direction along the optical axis of the reflected light beam LR0 is adjusted such that a sum of the light reception signals S4A and S4B and a sum of the light reception signals S4C and S4D are at substantially the same signal levels. Consequently, an attachment position of the hologram element 17 with respect to the direction along the optical axis of the reflected light beam LR0 is also optimized.

In this way, in the photodetector 19, the light receiving regions D2A and D2B of the light receiving unit D2 and the light receiving regions D3C and D3D of the light receiving unit D3 are arranged such that the light receiving regions can avoid the interlayer stray light beams LN from the recording layers Y.

1-4. Focus Control and Tracking Control

The head amplifier 22 (FIG. 2) of the optical disk device 1 amplifies the light reception signals S1A, S1B, S1C, and S1D, S2A and S2B, S3C and S3D, and S4A, S4B, S4C, and S4D and supplies the light reception signals to the signal processing unit 4.

The head amplifier 22 also amplifies the stray light reception signals S1P, S1Q, S1R and S1S, S2P and S2Q, and S3R and S3S and supplies the stray light reception signals to the signal processing unit 4.

The signal processing unit 4 performs an arithmetic operation indicated by the following Formula 1 with a focus error signal calculating circuit 4F to thereby calculate the focus error signal SFE1 by the astigmatism method and supplies the focus error signal SFE1 to the focus control unit 3AF of the servo control unit 3A.

$$SFE1=(S1A+S1C)-(S1B+S1D)-k\{(S1P+S1R)-(S1Q+S1S)\} \quad \text{Formula 1:}$$

The focus error signal SFE1 represents a shift amount between the focus F1 of the light beam L1 and the target recording layer YT in the optical disk 100.

In Formula 1, the coefficient "k" represents a predetermined coefficient. The term $k\{(S1P+S1R)-(S1Q+S1S)\}$ is provided to correct, when nonuniformity occurs in light reception signals because of stray light, the nonuniformity.

The signal processing unit 4 is adapted to use, for generation of a tracking error signal, the phase difference method such as the DPD (Differential Phase Detection) method or the one-beam push-pull method.

Specifically, the signal processing unit 4 uses, according to a type of the optical disk 100, the phase difference method when the optical disk 100 is a BD-ROM (Read Only Memory) in which pit rows are formed in advance in the recording layers Y. The signal processing unit 4 uses the one-beam push-pull method when the optical disk 100 is a recordable BD-R (Recordable) or BD-RE (Rewritable).

When the one-beam push-pull method is used, the signal processing unit 4 performs an arithmetic operation indicated by the following Formula 2 with a tracking error signal calculating circuit 4T to thereby calculate a tracking error signal STE1. Further, the signal processing unit 4 supplies the tracking error signal STE1 to the tracking control unit 3AT of the servo control unit 3A.

$$STE1=(S2A-S2B)-\alpha(S3C-S3D)-j\{(S2P-S2Q)-\alpha(S3R-S3S)\} \quad \text{Formula 2:}$$

The tracking error signal STE1 represents a shift amount between the focus F1 of the light beam L1 and a desired track in the target recording layer YT in the optical disk 100.

In Formula 2, the coefficient "$\alpha$" and "j" represent predetermined coefficients. The term (S2A−S2B) is equivalent to a value obtained by adding a lens shift component (i.e., displacement in the tracking direction of the object lens 8) to a push-pull component (i.e., relative displacement between the focus F1 of the light beam L1 and the desired track). Further, the term $\alpha$(S3C−S3D) is equivalent to a value of the lens shift component.

Specifically, in the former half of Formula 2, the push-pull component is calculated by subtracting only the lens shift component from the value of the push-pull component added with the lens shift component.

Further, as in the case of the focus error signal SFE1, the term $j\{(S2P-S2Q)-\alpha(S3R-S3S)\}$ in the latter half of Formula 2 is provided to correct, when nonuniformity occurs in reception signals because of stray light, the nonuniformity.

On the other hand, when the phase difference method is used, the signal processing unit 4 performs arithmetic processing indicated by the following Formula 3 on the basis of the light reception signals S1A, S1B, S1C, and S1D to thereby generate the tracking error signal STE1 and supplies the tracking error signal STE1 to the tracking control unit 3AT of the servo control unit 3A.

$$STE1=\phi(S1A+S1C)-\phi(S1B+S1D) \quad \text{Formula 3:}$$

In Formula 3, the operator $\phi$ represents a signal phase. The formula as a whole calculates a phase difference.

The focus control unit 3AF (FIG. 2) of the servo control unit 3A generates a focus driving signal SFD1 on the basis of the focus error signal SFE1 and supplies the focus driving signal SFD1 to the focus actuator 9F. The focus actuator 9F drives the object lens 8 in the focus direction on the basis of the focus driving signal SFD1 (hereinafter referred to as focus control).

The optical disk device 1 repeatedly performs the focus control (i.e., performs feedback control) to thereby cause a shift amount with respect to the focus direction between the focus F1 of the light beam L1 and the target recording layer YT to converge to an arbitrary target value.

The tracking control unit 3AT (FIG. 2) of the servo control unit 3A generates a tracking driving signal STD1 on the basis of the tracking error signal STE1 and supplies the tracking driving signal STD1 to a tracking actuator 9T. The tracking actuator 9T drives the object lens 8 in the tracking direction on the basis of the tracking driving signal STD1 (hereinafter referred to as tracking control).

The optical disk device 1 also repeatedly performs the tracking control (i.e., performs feedback control) to thereby cause a shift amount with respect to the tracking direction between the focus F1 of the light beam L1 and the desired track in the target recording layer YT to converge to an arbitrary target value.

In this way, the optical disk device 1 is adapted to perform the focus control and the tracking control to thereby set the focus F1 of the light beam L1 on the desired track in the target recording layer YT.

The optical disk device 1 is adapted to add up the light reception signals S1A to S1D according to the following Formula 4 in a reproduction signal calculating circuit 4R of the signal processing unit 4 to thereby calculate a reproduction RF signal SRF.

$$SRF=S1A+S1B+S1C+S1D \quad \text{Formula 4:}$$

The reproduction RF signal SRF is equivalent to a light amount of the entire reflected light beam LR0 formed by the zeroth-order light and represents a signal recorded on the optical disk 100. The reproduction signal calculating circuit 4R is adapted to thereafter apply predetermined demodulation processing, decoding processing, and the like to the reproduction RF signal SRF to thereby reproduce information recorded on the optical disk 100.

1-5. Discrimination of a Type of an Optical Disk

As shown in FIGS. 7A and 7B, an irradiation range of the stray light pattern W formed in the photodetector 19 changes according to a gap between the recording layer Y on which the interlayer stray light beam LN is reflected and the target recording layer YT.

Specifically, in the photodetector 19, when the gap between the recording layer Y and the target recording layer YT is large, the irradiation range of the stray light pattern W increases. On the contrary, when the gap is small, the irradiation range of the stray light pattern W decreases.

In other words, immediately after the optical disk 100 is inserted, when the number of recording layers Y formed in the optical disk 100 is unknown, the number of recording layers Y in the optical disk 100 can be discriminated to some extent on the basis of a formation range of the stray light pattern W.

In particular, in the photodetector 19, as shown in FIGS. 7A and 7B, both the stray light patterns W10 and W30 are irradiated to lie over the stray light receiving regions D1P, D1Q, D1R, and D1S of the light receiving unit D1.

On the other hand, in the photodetector 19, when the optical disk 100 has only one recording layer Y, since the interlayer stray light beam LN is not generated in principle, stray light patterns do not lie over the stray light receiving regions D1P, D1Q, D1R, and D1S of the light receiving unit D1.

Therefore, a media discrimination signal calculating circuit 4M of the signal processing unit 4 discriminates whether the light reception signals S1P, S1Q, S1R, and S1S generated by the stray light receiving regions D1P, D1Q, D1R, and D1S of the light receiving unit D1 are equal to or larger than a predetermined threshold.

When the light reception signals S1P, S1Q, S1R, and S1S are equal to or larger than the threshold, the media discrimination signal calculating circuit 4M discriminates that the stray light patterns W are formed in the stray light receiving regions D1P, D1Q, D1R, and D1S and the optical disk 100 includes two or more recording layers Y.

On the other hand, when the light reception signals S1P, S1Q, S1R, and S1S are smaller than the threshold, the media discrimination signal calculating circuit 4M discriminates that the stray light patterns W are not formed in the stray light receiving regions D1P, D1Q, D1R, and D1S and the optical disk 100 includes only one recording layer Y.

In this way, the signal processing unit 4 of the optical disk device 1 is adapted to discriminate presence or absence of the stray light patterns W on the basis of the light reception signals S1P, S1Q, S1R, and S1S and discriminate, from a result of the discrimination, whether the optical disk 100 includes one recording layer Y or two or more recording layers Y.

1-6. Operation and Effect

In the configuration explained above, the optical pickup 7 of the optical disk device 1 irradiates the light beam L1 on the optical disk 100 and separates the reflected light beam LR reflected by the optical disk 100 with the hologram element 17.

The hologram element 17 causes the reflected light beam LR0 formed by the zeroth-order light to travel substantially straight and diffracts the reflected light beam LR1 formed by the first-order light in each of the regions 17A to 17E (FIG. 4A).

The hologram element 17 diffracts the reflected light beams LR1A and LR1B in the vertical direction, diffracts the reflected light beams LR1C and LR1D in the horizontal direction, and diffracts the reflected light beam LR1E in an oblique direction.

According to the diffraction of the reflected light beams, the photodetector 19 receives the reflected light beam LR0 and generates the light reception signals S1A to S1D with the light receiving regions D1A to D1D of the light receiving unit D1. The photodetector 19 receives the reflected light beams LR1A and LR1B and generates the light reception signals S2A and S2B respectively with the light receiving regions D2A and D2B of the light receiving unit D2. Further, the photodetector 19 receives the reflected light beams LR1C and LR1D and generates the light reception signals S3C and S3D respectively with the light receiving regions D3C and D3D of the light receiving unit D3.

The signal processing unit 4 calculates, on the basis of the light reception signals amplified by the head amplifier 22, the focus error signal SFE1 with the focus error signal calculating circuit 4F according to Formula 1. The signal processing unit 4 calculates the tracking error signal STE1 with the tracking error signal calculating circuit 4T according to Formula 2 and supplies the focus error signal SFE1 and the tracking error signal STE1 to the servo control unit 3A.

The servo control unit 3A generates the focus driving signal SFD1 with the focus control unit 3AF on the basis of the focus error signal SFE1 and supplies the focus driving signal SFD1 to the focus actuator 9F to thereby perform the focus control.

The servo control unit 3A generates the tracking driving signal STD1 with the tracking control unit 3AT on the basis of the tracking error signal STE1 and supplies the tracking driving signal STD1 to the tracking actuator 9T to thereby perform the tracking control.

Therefore, the optical disk device 1 can receive the reflected light beams LR1A, LR1B, LR1C, and LR1D with the light receiving units D2 and D3 of the photodetector 19 and can perform the tracking control on the basis of the tracking error signal STE1 generated by using the light reception signals S2A, S2B, S3C, and S3D, which are a result of the light reception.

In the one-beam push-pull method, in general, in order to increase a signal level of the reproduction RF signal SRF, light intensity of the reflected light beam LR0 formed by the zeroth-order light is set higher than light intensity of the reflected light beam LR1 formed by the first-order light according to a diffracting action of the hologram element 17.

According to the increase in the light intensity, in the photodetector 19, irradiation intensity of reflected light beams LR1A, LR1B, LR1C1, LR1C2, LR1D1, and LR1D2 formed by the first-order light becomes relatively low and an S/N (Signal/Noise) ratio and the like of the light reception signal S1A and the like also become relatively low.

Therefore, in the optical disk device 1, when the stray light patterns W lie over the light receiving regions D2A, D2B, D3C, and D3D for receiving the first-order light in the photodetector 19, it is likely that accuracy of the tracking error signal STE1 substantially falls.

On the other hand, the hologram element 17 diffracts the reflected light beams LR1A and LR1B including a large number of push-pull components and the reflected light beams LR1C and LR1D including a large number of lens shift components in directions different from each other. Consequently, the photodetector 19 can prevent stray light patterns formed by the regions 17A and 17B from being irradiated on the light receiving unit D3 and prevent stray light patterns formed by the regions 17C and 17D from being irradiated on the light receiving unit D2.

Therefore, in the photodetector 19, the light receiving unit D2 only has to be designed to avoid the stray light patterns W caused by the zeroth-order light and the regions 17A and 17B. The light receiving unit D3 only has to be designed to avoid the stray light patterns W caused by the zeroth-order light and the regions 17C and 17D. Therefore, it is possible to ease the difficulty in design.

Further, in the photodetector 19, the light receiving unit D2 is arranged in the vertical direction viewed from the reference point P. The light receiving regions D2A and D2B are arranged side by side in the vertical direction such that the light receiving regions D2A and D2B are set within the gap u2 (FIG. 7B) with respect to the horizontal direction.

Therefore, as shown in FIGS. 7A and 7B, in the photodetector 19, the stray light patterns W formed by diffracting the interlayer stray light beam LN with the regions 17A and 17B of the hologram element 17 do not lie over the light receiving regions D2A and D2B. The stray light patterns W are the stray light patterns W3A and W3B (FIG. 7A) and the stray light patterns W1A and W1B (FIG. 7B).

In particular, in the photodetector 19, even if a diffraction angle deviates from a design value because of factors such as an error in a grating pitch in the hologram element 17 and a shift of wavelength in the light beam L1, the stray light patterns W do not lie over the light receiving regions D2A and D2B.

Specifically, in the photodetector 19, basically, the influence of the interlayer stray light beam LN does not appear in the light reception signals S2A and S2B.

In the photodetector 19, the light receiving unit D3 is arranged in the horizontal direction viewed from the reference point P. The light receiving regions D3C and D3D are arranged side by side in the horizontal direction such that the light receiving regions D3C and D3D are set within the gap u3 (FIG. 7B) with respect to the vertical direction.

Therefore, in the photodetector 19, as shown in FIGS. 7A and 7B, the stray light patterns W formed by diffracting the interlayer stray light beam LN with the regions 17C1, 17C2, 17D1, and 17D2 of the hologram element 17 do not lie over the light receiving regions D3C and D3D. The stray light patterns W are the stray light patterns W3C1, W3C2, W3D1, and W3D2 (FIG. 7A) and the stray light patterns W1C1, W1C2, W1D1, and W1D2 (FIG. 7B).

In particular, in the photodetector 19, even if a diffraction angle deviates from a design value because of factors such as an error in a grating pitch in the hologram element 17 and a shift of wavelength in the light beam L1, the stray light patterns W do not lie over the light receiving regions D3C and D3D.

Specifically, in the photodetector 19, basically, the influence of the interlayer stray light beam LN does not appear in the light reception signals S3C and S3D either.

Therefore, it can be said that the influence of the interlayer stray light beam LN hardly appears in the tracking error signal STE1 calculated by using the light reception signals S2A, S2B, S3C, and S3D.

In this way, in the photodetector 19, the light receiving regions D2A, D2B, D3C, and D3D are arranged such that the various stray light patterns W caused by the plural recording layers Y having different interlayer distances from the target recording layer YT in the optical disk 100 can be effectively avoided. Therefore, in the optical disk device 1, accuracy of the tracking error signal STE1 is hardly deteriorated.

Further, the stray light receiving regions D2P and D2Q for stray light detection are provided in the light receiving unit D2 of the photodetector 19. The stray light receiving regions D3R and D3S for stray light detection are provided in the light receiving unit D3.

According to the provision of the stray light receiving regions, in the tracking error signal calculating circuit 4T of the signal processing unit 4, the term $\alpha\{(S2P-S2Q)-j(S3R-S3S)\}$ is provided in the latter half of Formula 2.

Therefore, in the signal processing unit 4, even when the stray light patterns W lie over the light receiving regions D2A and D2B or D3C and D3D because of some factor and the influence of the interlayer stray light beam LN is included in the light reception signals S2A, S2B, S3C, or S3D, the influence can be effectively eliminated.

Further, the optical pickup 7 condenses the reflected light beam LR1A and the like, which are irradiated on the light receiving units D2, D3, and D4 of the photodetector 19, to be dot-like beam spots according to the design of the condensing lens 16 and the hologram element 17. Therefore, the optical pickup 7 can hold down areas of the light receiving regions in the photodetector 19 and also hold down movement amounts of the beam spots when lens shift of the object lens 8 occurs.

The optical pickup 7 condenses the stray light patterns W as small as possible. Therefore, it is possible to reduce the irradiation range of the stray light patterns W.

According to the configuration explained above, the optical pickup 7 of the optical disk device 1 diffracts the reflected light beam LR with the hologram element 17, causes the reflected light beam LR0 formed by the zeroth-order light to travel substantially straight, and detects the reflected light beam LR0 with the light receiving unit D1 of the photodetector 19 to generate the light reception signals S1A to S1D. The optical pickup 7 diffracts the reflected light beams LR1A and LR1B having a longitudinally long shape in the first-order light in the vertical direction, receives the reflected light beams LR1A and LR1B, and generates the light reception signals S2A and S2B respectively with the light receiving regions D2A and D2B of the light receiving unit D2. Further, the optical pickup 7 diffracts the reflected light beams LR1C and LR1D having a laterally long shape in the first-order light in the horizontal direction. The optical pickup 7 receives the reflected light beams LR1C and LR1D and generates the light reception signals S3C and S3D respectively with the light receiving regions D3C and D3D of the light receiving unit D3. Consequently, the optical disk device 1 can generate the tracking error signal STE1 in which the influence of the stray light patterns W formed by the interlayer stray light beams LN from the plural recording layers Y, respectively, is eliminated and can accurately perform the tracking control.

2. Second Embodiment

An optical disk device 30 according to a second embodiment of the present invention is different from the optical disk device 1 according to the first embodiment in that the optical disk device 30 includes a signal processing unit 34, an optical pickup 37, a hologram element 47, and a photodetector 49 instead of the signal processing unit 4, the optical pickup 7, the hologram element 17, and the photodetector 19.

The signal processing unit 34 performs predetermined arithmetic processing to thereby generate a focus error signal and a tracking error signal and supplies the focus error signal and the tracking error signal to the driving control unit 3 in the same manner as the signal processing unit 4. However, a part of details of the arithmetic processing is different from that of the signal processing unit 4 (explained in detail later).

Figure 9A:
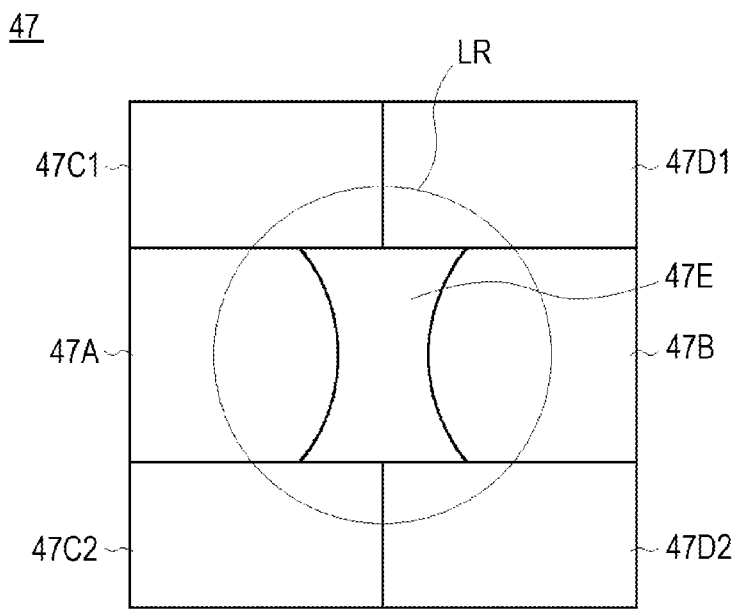
FIGS. 9A and 9B are schematic diagrams of a configuration of a hologram element according to a second embodiment of the present invention.
Figure 9B:
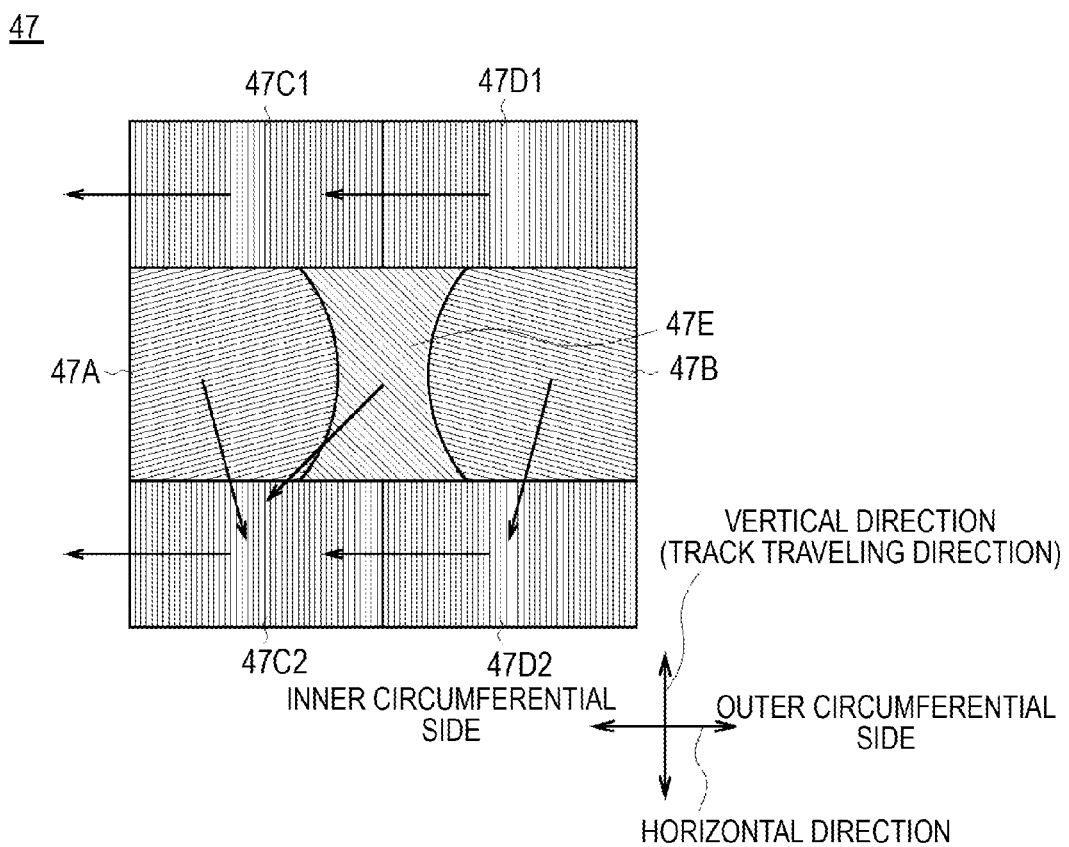

As shown in FIGS. 9A and 9B corresponding to FIGS. 4A and 4B, the hologram element 47 of the optical pickup 37 is different from the hologram element 17 of the optical pickup 7 in types of diffraction elements formed in regions 47A and 47B.

Specifically, the regions 47A and 47B are formed of blazed holograms and are adapted to diffract substantially entire portions of the reflected light beam LR lying over the regions 47A and 47B as first-order light and form the portions as the reflected light beams LR1A and LR1B.

The regions 47C1, 47C2, 47D1, and 47D2 are designed such that diffraction angles of the reflected light beams LR1C1, LR1C2, LR1D1, and LR1D2 formed by the first-order light are small compared with those in the first embodiment. A state of irradiation of the reflected light beams LR1A to LR1D is schematically shown in FIG. 10.

Figure 11:
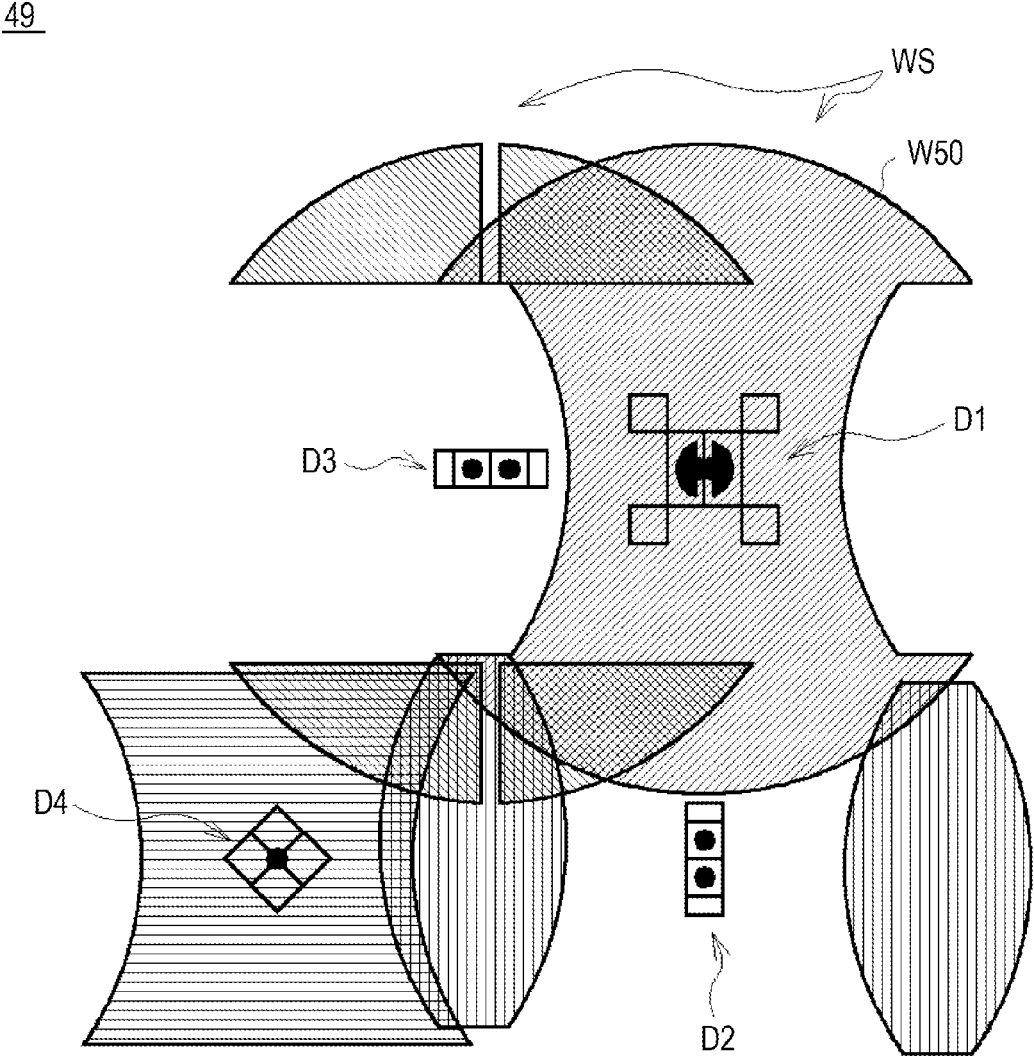
FIG. 11 is a schematic diagram of a configuration of a photodetector according to the second embodiment and formation of a stray light pattern.

As shown in FIG. 11 corresponding to FIG. 7A, the photodetector 49 is different from the photodetector 19 in that the light receiving unit D3 is provided in a place near the light receiving unit D1.

In practice, when, for example, the interlayer stray light beam LN3 is irradiated on the photodetector 9, stray light patterns W5 corresponding to the stray light patterns W3 shown in FIG. 7A are formed.

When the stray light patterns W5 are compared with the stray light patterns W3 (FIG. 7A), the stray light pattern W50 formed by the zeroth-order light has a shape formed by deleting portions equivalent to the regions 47A and 47B of the hologram element 47 from the stray light pattern W30 corresponding to the stray light pattern W50. This is because the zeroth-order light is hardly generated in the regions 47A and 47B.

The stray light pattern W50 has a shape less extended in the horizontal direction compared with the stray light pattern W30. Therefore, in the photodetector 49, although the light receiving unit D3 is near the light receiving unit D1, the stray light pattern W50 is prevented from lying over the light receiving unit D3.

On the other hand, the signal processing unit 34 calculates the reproduction RF signal SRF according to the following Formula 5 instead of Formula 4 by using a predetermined coefficient "γ".

$$SRF = S1A + S1B + S1C + S1D + \gamma(S2A + S2B) \quad \text{Formula 5:}$$

In the second embodiment, substantially most of so-called push-pull components of the reflected light beam LR are irradiated on the light receiving regions D2A and D2B of the light receiving unit D2 as the reflected light beams LR1A and LR1B formed by the first-order light.

Therefore, in Formula 5, compared with Formula 4, the term γ(S2A+S2B) is added.

Otherwise, the optical disk device 30 is configured substantially the same as the optical disk device 1 according to the first embodiment.

In the configuration explained above, the optical pickup 37 of the optical disk device 30 according to the second embodiment irradiates the light beam L1 on the optical disk 100 and separates the reflected light beam LR reflected by the optical disk 100 with the hologram element 47.

The hologram element 47 causes the reflected light beam LR0 formed by the zeroth-order light to travel substantially straight in portions other than the regions 47A and 47B (FIG. 9A) and diffracts the reflected light beam LR1 formed by the first-order light in each of the regions 47A to 47E.

The hologram element 47 diffracts the reflected light beams LR1A and LR1B in the vertical direction, diffracts the reflected light beams LR1C and LR1D in the horizontal direction, and diffracts the reflected light beam LR1E in an oblique direction.

According to the diffraction of the reflected light beams, the photodetector 49 receives the reflected light beam LR0 and generates the light reception signals S1A to S1D with the light receiving regions D1A to D1D of the light receiving unit D1. The photodetector 49 receives the reflected light beams LR1A and LR1B and generates the light reception signals S2A and S2B respectively with the light receiving regions D2A and D2B of the light receiving unit D2. Further, the photodetector 49 receives the reflected light beams LR1C and LR1D and generates the light reception signals S3C and S3D respectively with the light receiving regions D3C and D3D of the light receiving unit D3.

The signal processing unit 34 calculates the focus error signal SFE1 with the focus error signal calculating circuit 4F according to Formula 1. The signal processing unit 34 calculates the tracking error signal STE1 with the tracking error signal calculating circuit 4T according to Formula 2 and supplies the focus error signal SFE1 and the tracking error signal STE1 to the servo control unit 3A.

As in the first embodiment, the servo control unit 3A performs the focus control and the tracking control.

Therefore, the optical disk device 30 can receive the reflected light beams LR1A, LR1B, LR1C, and LR1D with the light receiving units D2 and D3 of the photodetector 49 and can perform the tracking control on the basis of the tracking error signal STE1 generated by using the light reception signals S2A, S2B, S3C, and S3D, which are a result of the light reception.

In the photodetector 49, although the light receiving unit D3 is arranged near the light receiving unit D1, portions of the stray light pattern W50 caused by the zeroth-order light equivalent to the regions 47A and 47B of the hologram element 47 are deleted. Therefore, the stray light pattern W50 does not lie over the light receiving unit D3.

Specifically, the regions 47C1, 47C2, 47D1, and 47D2 of the hologram element 47 can set a diffraction angle of the first-order light small compared with the regions 17C1, 17C2, 17D1, and 17D2 of the hologram element 17 in the first embodiment.

In general, in a hologram element, when a diffraction angle is set large, a pitch of a grating needs to be set fine. This is likely to be limitation in design or manufacturing. On the other hand, in the hologram element 47 according to the second embodiment, a pitch of a grating can be set rough for the regions 47C1, 47C2, 47D1, and 47D2. Therefore, it is possible to reduce limitation in design or manufacturing.

Further, the optical disk device 30 can receive the reflected light beam LR0, in which almost no push-pull component is included, with the light receiving regions D1A to D1D of the light receiving unit D1. The optical disk device 30 can execute, on the basis of the focus error signal SFE1 generated by using the light reception signal S1A to S1D, which are a result of the light reception, stable focus control with disturbance caused by push-pull components (so-called leakage of a tracking error signal into a focus error signal) suppressed. Otherwise, the optical disk device 30 can realize actions and effects same as those in the first embodiment.

According to the configuration explained above, the optical pickup 37 of the optical disk device 30 diffracts the reflected light beam LR with the hologram element 47, causes the reflected light beam LR0 formed by the zeroth-order light excluding the portions equivalent to the regions 47A and 47B to travel substantially straight, and generates the light reception signals S1A to S1D detected by the light receiving unit D1 of the photodetector 49. The optical pickup 37 diffracts the reflected light beams LR1A and LR1B of the first-order light in the vertical direction, receives the reflected light beams LR1A and LR1B, and generates the light reception signals S2A and S2B with the light receiving regions D2A and D2B of the light receiving unit D2. Further, the optical pickup 37 diffracts the reflected light beams LR1C and LR1D of the first-order light in the horizontal direction, receives the reflected light beams LR1C and LR1D, and generates the light reception signals S3C and S3D with the light receiving regions D3C and D3D of the light receiving unit D3. Consequently, as in the first embodiment, the optical disk device 30 can generate the tracking error signal STE1 in which the influence of the stray light patterns W formed by the interlayer stray light beams LN from the plural recording layers Y, respectively, is eliminated and can accurately perform the tracking control.

3. Third Embodiment

3-1. Configuration of an Optical Disk Device

An optical disk device 50 (FIG. 1) according to a third embodiment of the present invention is different from the optical disk device 1 according to the first embodiment in that a servo control unit 53A, a signal processing unit 54, and an optical pickup 57 are provided instead of the servo control unit 3A, the signal processing unit 4, and the optical pickup 7.

Figure 12:
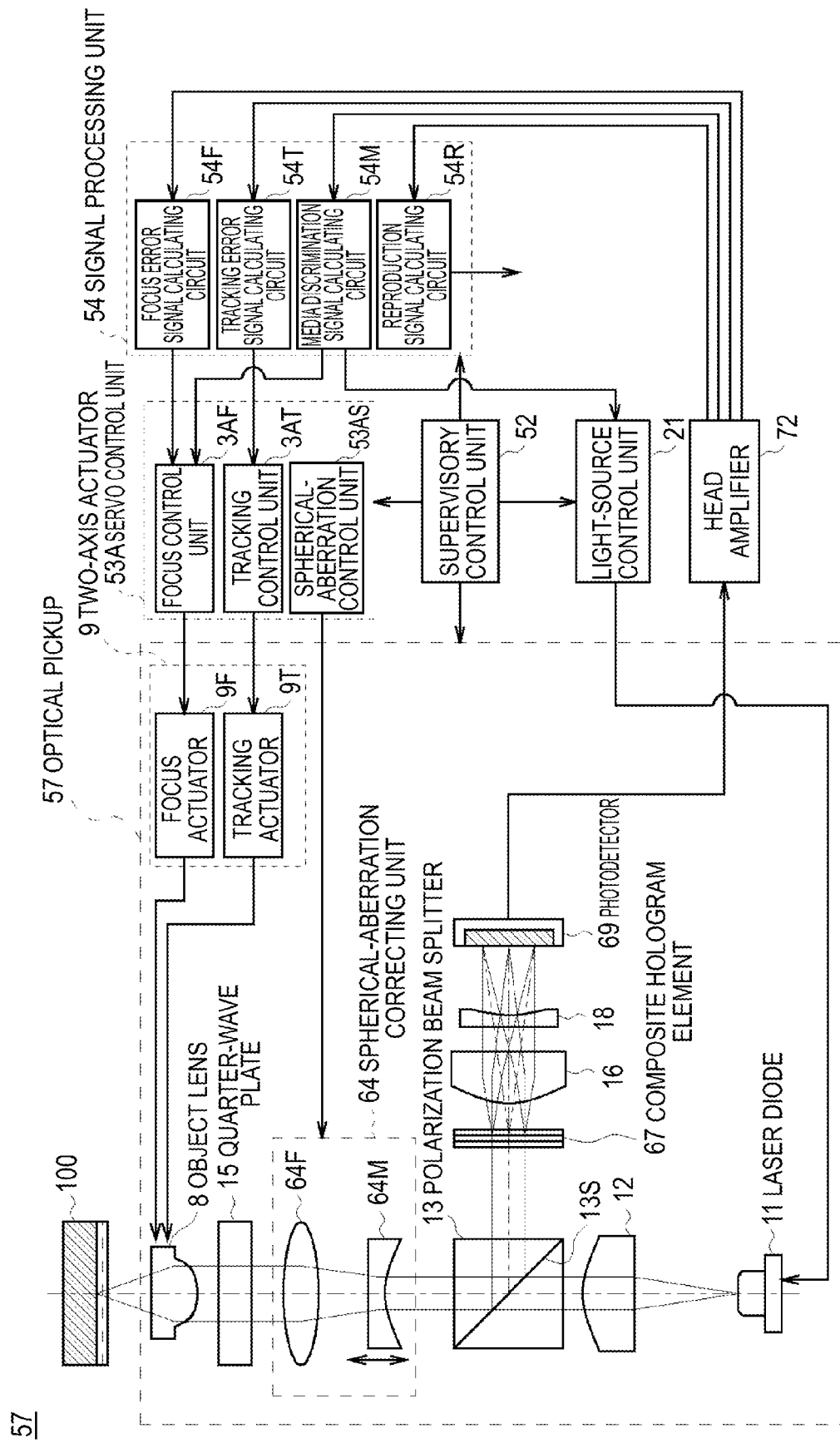
FIG. 12 is a schematic diagram of a configuration of an optical pickup according to a third embodiment of the present invention.

As shown in FIG. 12, the servo control unit 53A is different from the servo control unit 3A (FIG. 2) according to the first embodiment in that a spherical-aberration control unit 53AS is provided instead of the spherical-aberration control unit 3AS. Otherwise, the servo control unit 53A is the same as the servo control unit 3A.

The signal processing unit 54 includes arithmetic circuits corresponding to the arithmetic circuits of the signal processing unit 4. However, arithmetic processing in the signal processing unit 54 is partially different from the arithmetic processing in the signal processing unit 4 (explained in detail later).

3-2. Configuration of the Optical Pickup

The optical pickup 57 is different from the optical pickup 7 (FIG. 2) in that a spherical-aberration correcting unit 64, a composite hologram element 67, and a photodetector 69 are provided instead of the spherical-aberration correcting unit 14, the hologram element 17, and the photodetector 19.

The spherical-aberration correcting unit 64 is configured as a so-called Galileo-type beam expander by a fixed lens 64F that is formed by a convex lens and located in a fixed position and a movable lens 64M that is formed by a concave lens and can move in a direction along the optical axis of the light beam L1. The movable lens 64M is adapted to move on the basis of control from the spherical-aberration control unit 53AS of the servo control unit 53A.

In practice, the spherical-aberration correcting unit 64 diffuses the light beam L1 once with the movable lens 64M and subsequently condenses the light beam L1 with the fixed lens 64F.

Consequently, like the spherical-aberration correcting unit 14 in the first embodiment, the spherical-aberration correction unit 64 is adapted to impart in advance, to the light beam L1, spherical aberration having a characteristic opposite to that of spherical aberration that occurs when the light beam L1 is condensed and reaches the target recording layer YT of the optical disk 100.

The composite hologram element 67 is provided instead of the hologram element 17 in the optical pickup 7 (FIG. 2) and is arranged in the front of the condensing lens 16 viewed from the polarization beam splitter 13.

Figure 13:
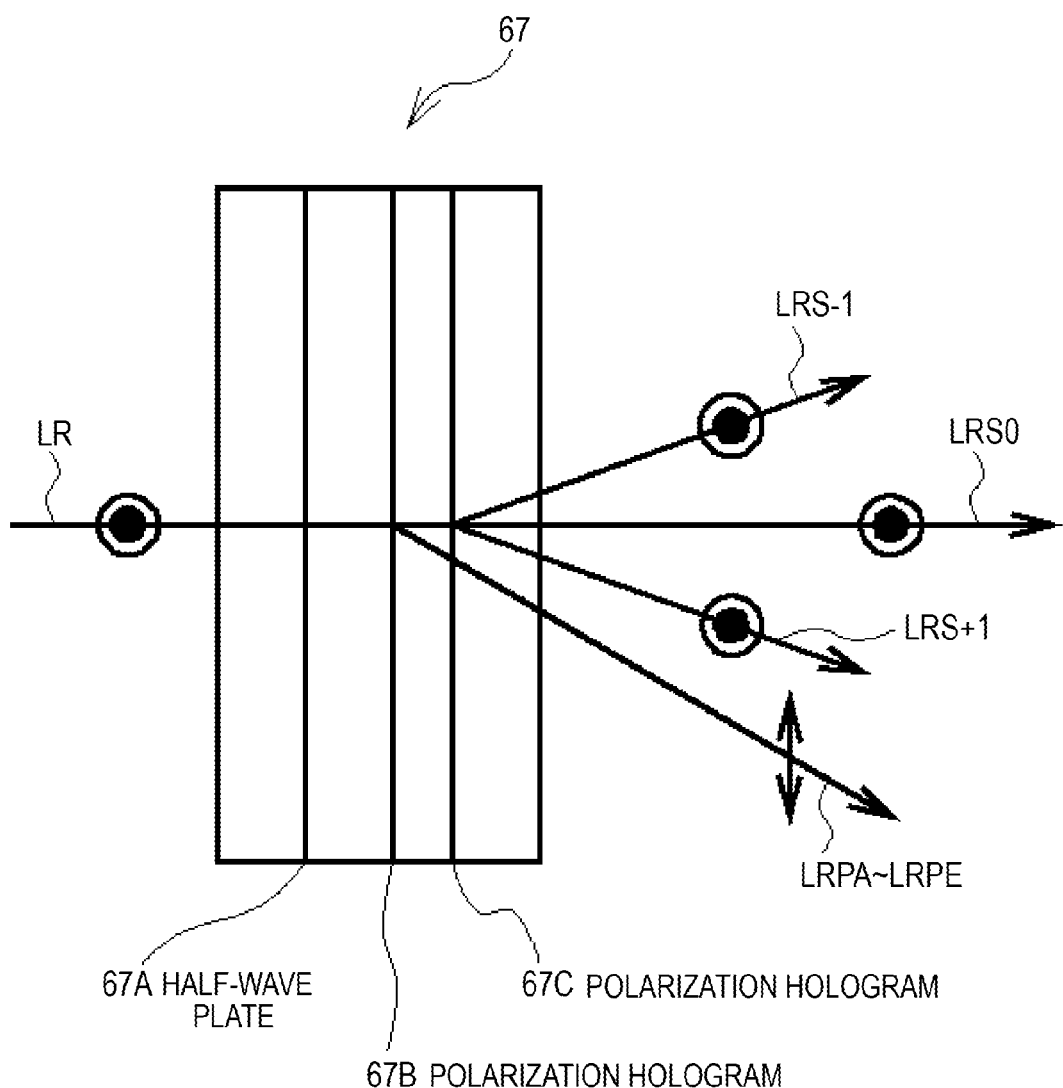
FIG. 13 is a schematic diagram of a configuration of a composite hologram element according to the third embodiment.

As shown in a schematic sectional view of FIG. 13, the composite hologram element 67 has an integrated configuration in which a half-wave plate 67A, a polarization hologram 67B, and a polarization hologram 67C are stacked.

In practice, the reflected light beam LR is made incident from the polarization beam splitter 13 as a light beam of S polarized light. In FIG. 13, a polarization direction of the reflected light beam LR formed by the S polarized light is represented as a direction perpendicular to the paper surface.

The half-wave plate 67A rotates the polarization direction of the reflected light beam LR by a predetermined angle to thereby reduce S polarized light components to a predetermined ratio and makes the remaining S polarized light components incident on the polarization hologram 67B as P polarized light components.

The polarization hologram 67B is adapted to exercise a diffracting action on specific polarization direction components of a light beam. In practice, the polarization hologram 67B is adapted to exercise the diffracting action on only the P polarized light components of the reflected light beam LR and transmit the S polarized light components without acting thereon.

Figure 14A:
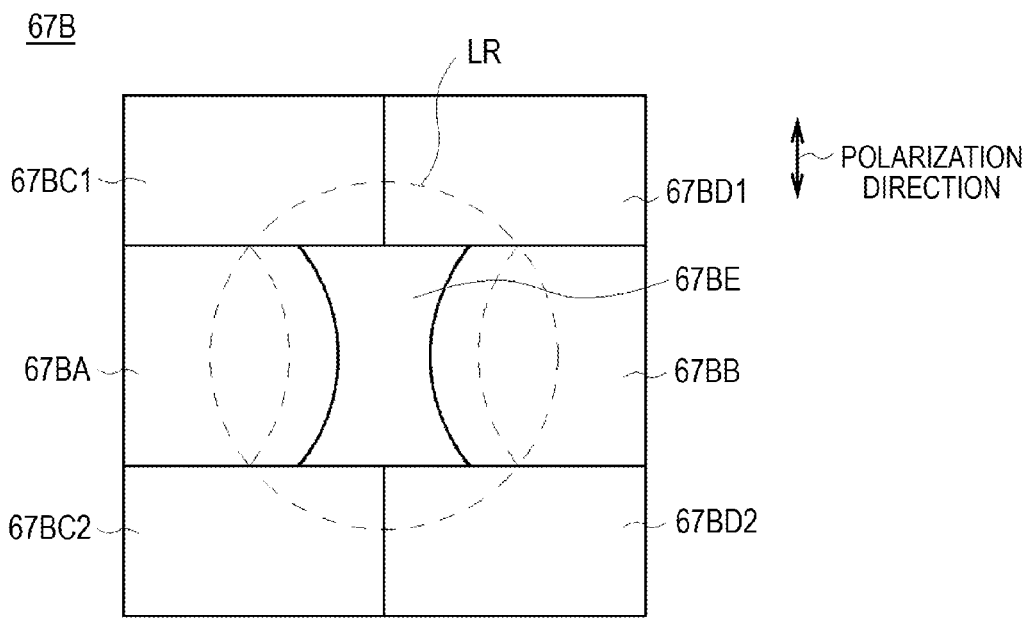
FIGS. 14A and 14B are schematic diagrams of a configuration of a polarization hologram (1)

As shown in FIG. 14A corresponding to FIG. 4A, the polarization hologram 67B is divided into regions 67BA, 67BB, 67BC1, 67BC2, 67BD1, 67BD2, and 67BE according to a division pattern same as that for the hologram element 17.

Figure 14B:
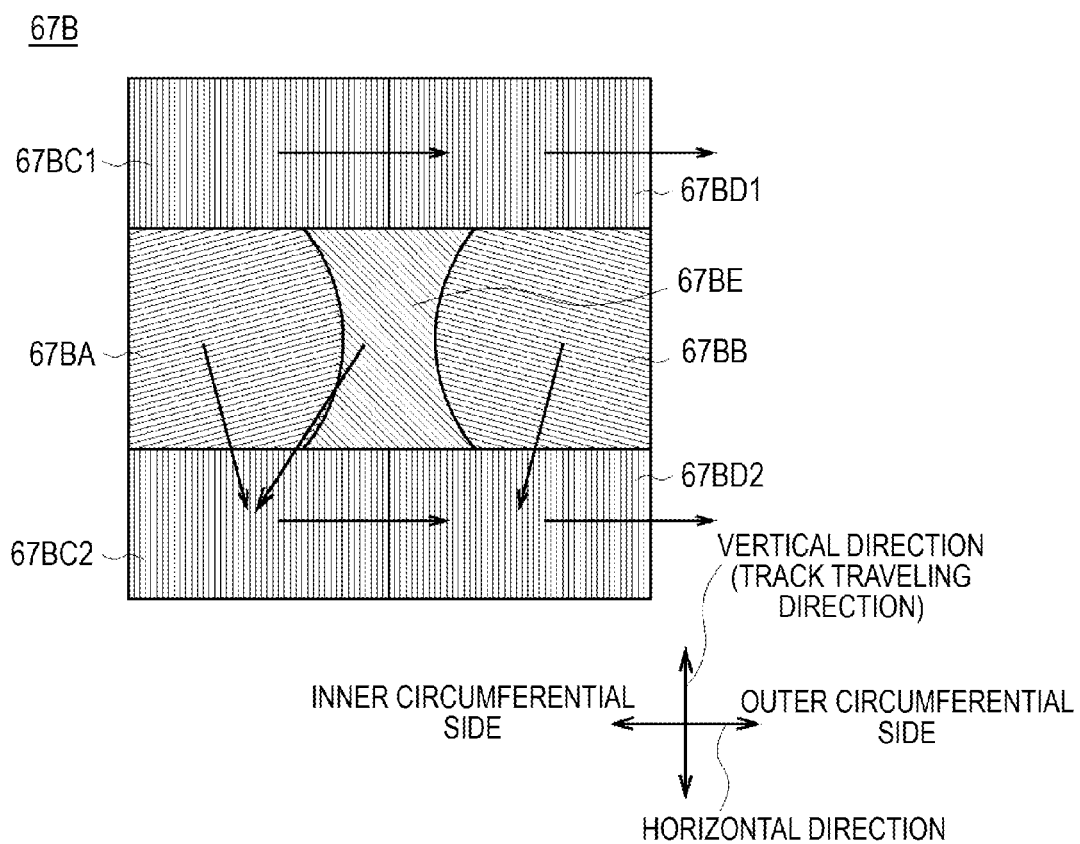

In the regions 67BA to 67BE, as shown in FIG. 14B corresponding to FIG. 4B, diffraction gratings are formed and diffracting directions thereof are set. The diffracting directions of the first-order light in the regions 67BA, 67BB, and 67BE are set the same as those in the regions 17A, 17B, and 17E. The diffracting directions of the first-order light in the regions 67BC1, 67BC2, 67BD1, and 67BD2 are reversed from those in the regions 17C1, 17C2, 17D1, and 17D2.

Specifically, the polarization hologram 67B is formed by a blazed hologram that diffracts the reflected light beam LR into substantially only the first-order light. The polarization hologram 67B is adapted to directly transmit the S polarized light component of the reflected light beam LR and diffract the P polarized light component in each of the regions.

The polarization hologram 67C is adapted to exercise the diffracting action on polarization direction components different from those of the polarization hologram 67B, exercise the diffracting action on only the S polarized light components of the reflected light beam LR, and transmit the P polarized light components without acting thereon.

Figure 15A:
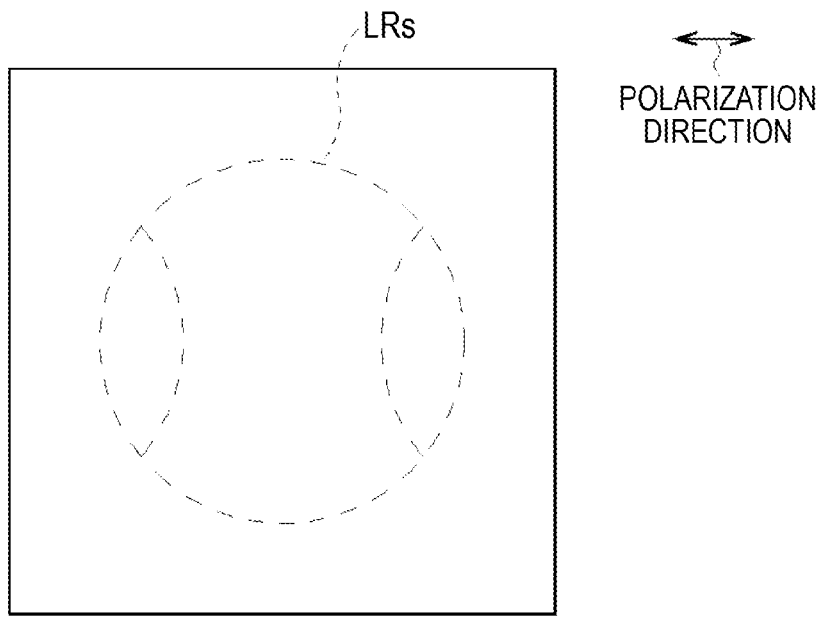
FIGS. 15A and 15B are schematic diagrams of a configuration of a polarization hologram (2)
Figure 15B:
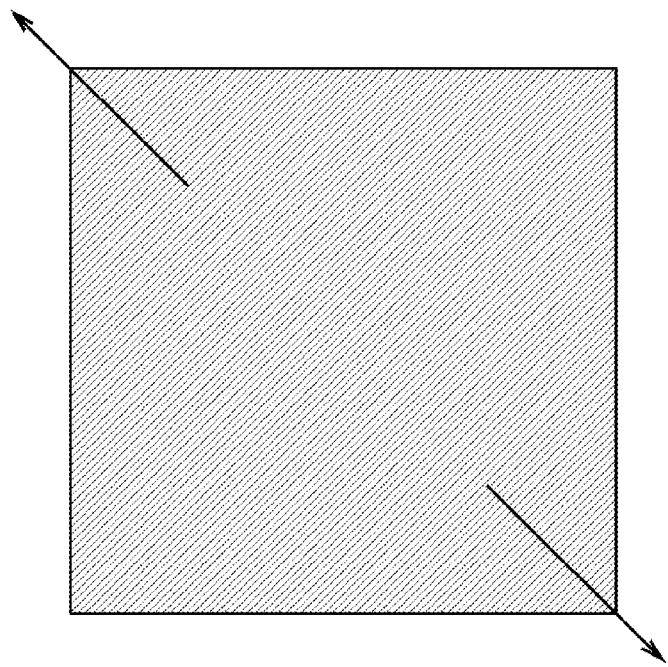

As shown in FIG. 15A, the entire polarization hologram 67C is configured as a uniform diffraction grating. As shown in FIG. 15B, the polarization hologram 67C is adapted to diffract the first-order light in an oblique direction, i.e., a direction orthogonal to the region 67BE of the polarization hologram 67B. The polarization hologram 67C is formed by a so-called binary hologram and is adapted to separate a light beam into zeroth-order light and + first-order light.

In practice, as shown in FIG. 16, the polarization hologram 67C exercises the diffracting action on S polarized light components (hereinafter referred to as reflected light beam LRS) transmitted through the polarization hologram 67B in the reflected light beam LR.

The polarization hologram 67C causes a reflected light beam LRS0 formed by the zeroth-order light to travel straight and diffracts a reflected light beam LRS+1 formed by the + first-order light and a reflected light beam LRS−1 formed by the − first-order light in oblique directions, i.e., directions different from both the vertical direction and the horizontal direction, respectively.

The polarization hologram 67C directly transmits the P polarized light components of the reflected light beam LR, i.e., reflected light beams LRPA to LRPE diffracted in each of the regions by the polarization hologram 67B without exercising the diffracting action thereon.

The condensing lens 16 condenses the reflected light beams LRPA to LRPE, LRS0, and LRS+1 and LRS−1 emitted from the composite hologram element 67 and makes the reflected light beams incident on the cylindrical lens 18.

As in the first embodiment, the cylindrical lens 18 imparts astigmatism to the reflected light beam LRS0 formed by the zeroth-order light, the reflected light beam LRS+ formed by the + first-order light, and the reflected light beam LRS−1 formed by the − first-order light and irradiates the reflected light beams on the photodetector 69.

The cylindrical lens 18 also imparts, according to an optical characteristic thereof, astigmatism to the reflected light beams LRPA to LRPE formed by the first-order light. However, when the reflected light beams LRPA to LRPE are diffracted in the polarization hologram 67B, aberration for offsetting the astigmatism is imparted to the reflected light beams in advance.

Therefore, the reflected light beams LRPA to LRPE do not have aberration at a point when the reflected light beams LRPA to LRPE are emitted from the cylindrical lens 18.

Figure 17:
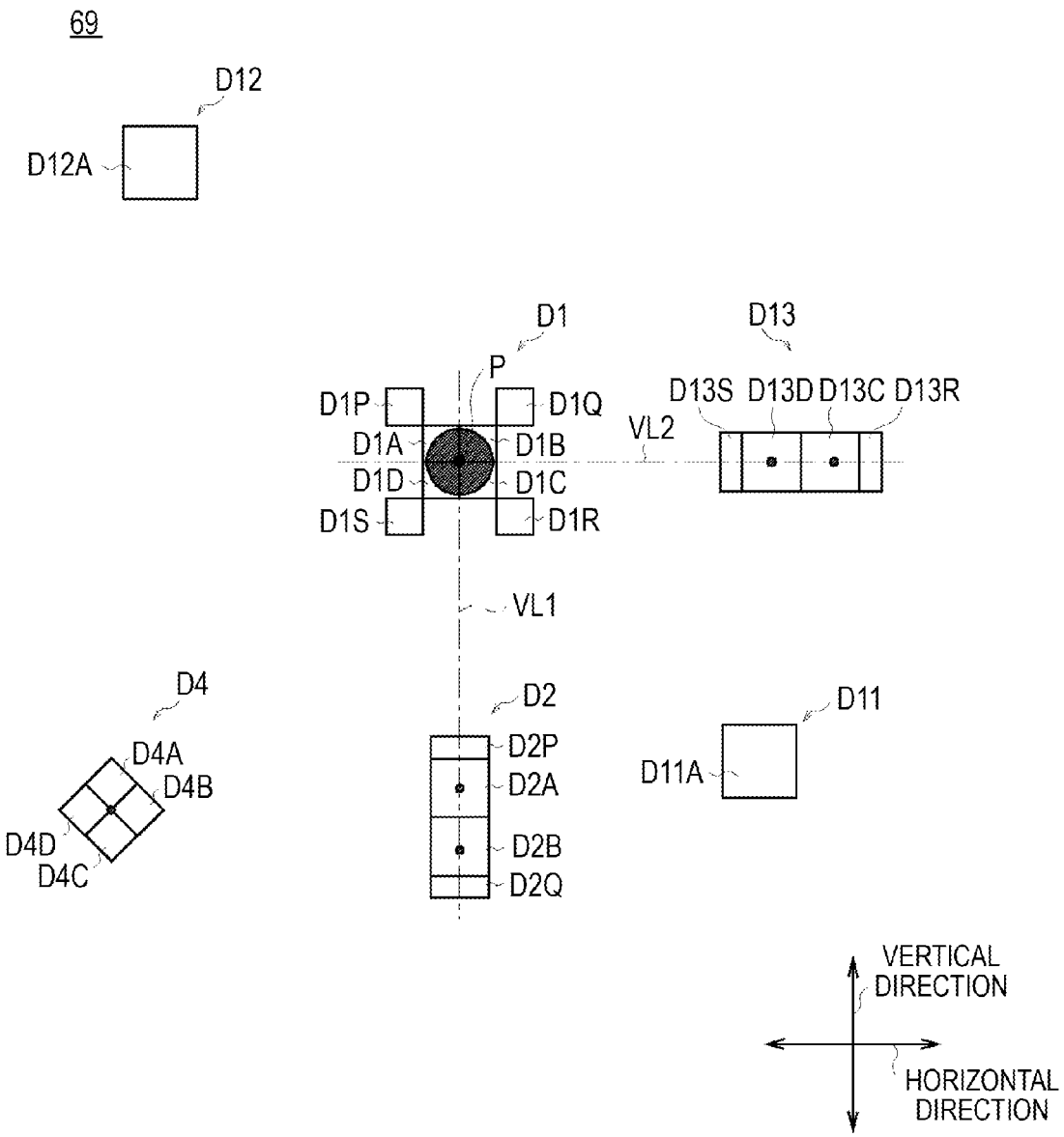
FIG. 17 is a schematic diagram of a configuration of a photodetector according to the third embodiment.

As shown in FIG. 17, the photodetector 69 has a configuration partially similar to the photodetector 19 (FIGS. 7A and 7B). The light receiving units D1, D2, and D4 same as those of the photodetector 19 are provided in the photodetector 69.

Specifically, the photodetector 69 receives the reflected light beam LRS0 with the light receiving regions D1A to D1D of the light receiving unit D1 and receives the reflected light beams LRPA and LRPB with the light receiving regions D2A and D2B of the light receiving unit D2, respectively. Further, the photodetector 69 receives the reflected light beam LRPE with the light receiving regions D4A to D4D of the light receiving unit D4.

In the photodetector 69, a light receiving unit D13 is provided instead of the light receiving unit D3 of the photodetector 19. Like the light receiving unit D3, the light receiving unit D13 is arranged in the horizontal direction of the reference point P. However, the light receiving unit D13 is arranged in a position symmetrical to the light receiving unit D3 with the imaginary straight line VL1 set as a symmetry center.

In the light receiving unit D13, light receiving regions D13C and D13D corresponding to the light receiving regions D3C and D3D, respectively, and light receiving regions D13R and D13S corresponding to the stray light receiving regions D3R and D3S, respectively, are provided.

The light receiving region D13C is adapted to receive reflected light beams LRPC1 and LRPC2 (hereinafter collectively referred to as reflected light beam LRPC) and generate the light reception signal S3C. The light receiving region D13D is adapted to receive reflected light beams LRPD1 and LRPD2 (hereinafter collectively referred to as reflected light beam LRPD) and generate the light reception signal S3D.

Further, in the photodetector 69, a light receiving unit D11 is provided in a position substantially symmetrical to the light receiving unit D4 with the imaginary straight line VL1 set as a symmetry center, i.e., a position in an oblique direction viewed from the reference point P and at substantially equal distances from the light receiving units D2 and D13.

The light receiving unit D11 is adapted to receive the reflected light beam LRS+1 with the single light receiving region D11, generate a light reception signal S11 corresponding to a light amount of the reflected light beam LRS+1, and supply the light reception signal S11 to a head amplifier 72 (FIG. 12).

In the photodetector 69, a light receiving unit D12 is provided in a position substantially symmetrical to the light receiving unit D11 with respect to the reference point P.

The light receiving unit D12 is adapted to receive a reflected light beam LRS−1 with the single light receiving region D12, generate a light reception signal S12 corresponding to a light amount of the reflected light beam LRS−1, and supply the light reception signal S12 to the head amplifier 72 (FIG. 12).

In this way, the photodetector 69 is adapted to receive the reflected light beams LRS0, LRPA to LRPE, and LRS+1 and LRS−1 with the light receiving regions of the light receiving units D1, D2, D4, D13, D11, and D12, respectively, generate light reception signals corresponding to light reception amounts thereof, and supply the light reception signals to the head amplifier 72.

Figure 18:
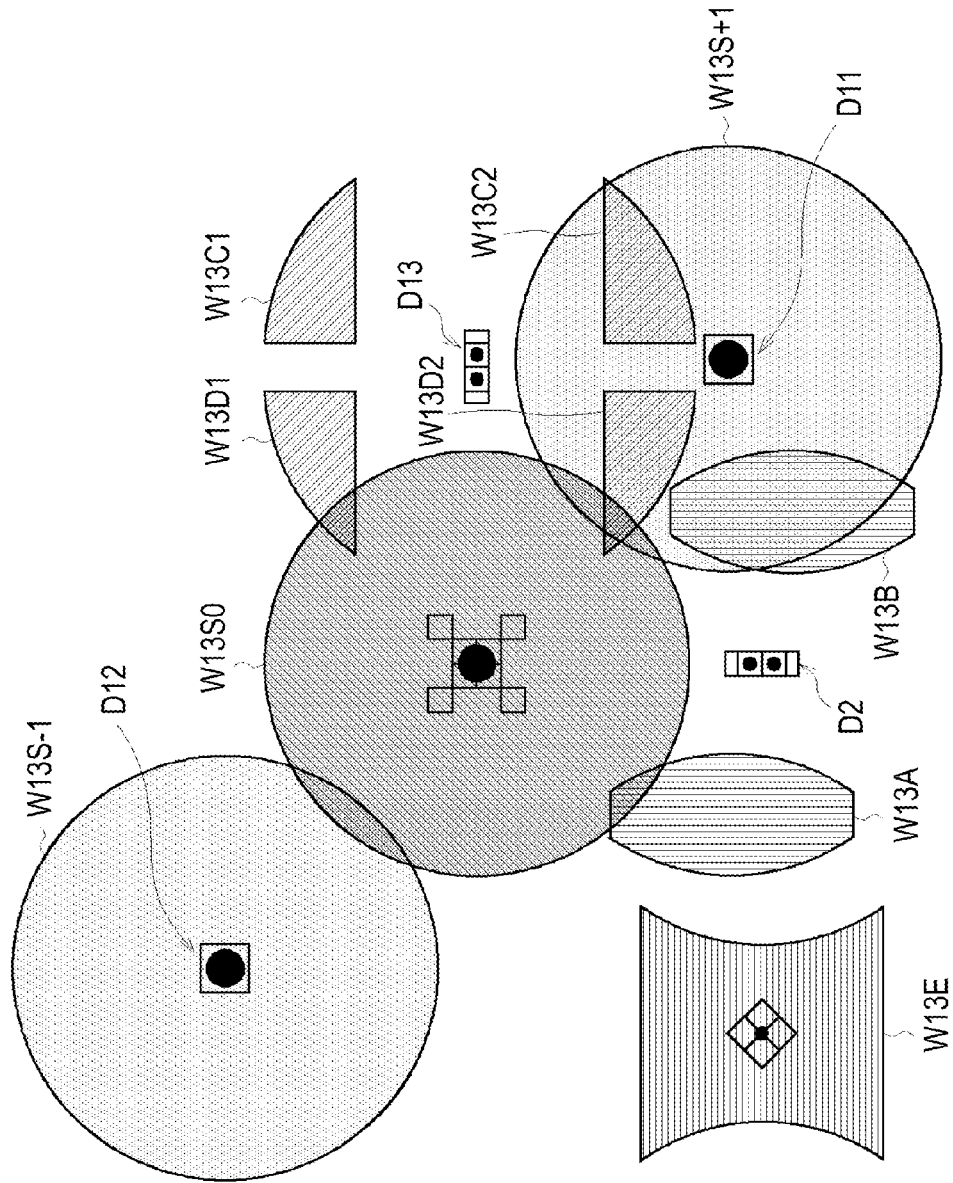
FIG. 18 is a schematic diagram of formation of a stray light pattern according to the third embodiment.

In the photodetector 69, as shown in FIG. 18, according to the same principle as the first embodiment, stray light patterns W13 are formed by the interlayer stray light beam LN. Like the stray light patterns W3, the stray light patterns W13 represent stray light patterns formed when an irradiation range is the largest.

As the stray light patterns W13, compared with the stray light patterns W3 shown in FIG. 7A, stray light patterns W13C1, W13C2, W13D1, and W13D2 are formed symmetrical to the stray light patterns W3C1, W3C2, W3D1, and W3D2, respectively, with the imaginary straight line VL1 (FIG. 17) set as a symmetry center.

As the stray light patterns W13, stray light patterns W13S+1 and W13S−1 are formed by diffracting the interlayer stray light beam LN with the polarization hologram 67C.

In the photodetector 69, like the light receiving units D2 and D3 of the photodetector 19, the light receiving units D2 and D13 are arranged such that the stray light pattern W130, the stray light patterns W13A and W13B, and the stray light patterns W13C1, W13C2, W13D1, and W13D2 do not lie over the light receiving units D2 and D13.

Therefore, in the photodetector 69, an error caused by the interlayer stray light beam LN is hardly caused with respect to the light reception signals S2A, S2B, S3C, and S3D generated by the light receiving regions D2A, D2B, D13C, and D13D, respectively.

3-3. Focus Control and Tracking Control

In practice, the optical disk device 50 is adapted to be capable of performing, with the servo control unit 53A, focus control and tracking control same as those of the optical disk device 1 according to the first embodiment.

Specifically, a focus error signal calculating circuit 54F of the signal processing unit 54 performs the arithmetic operation indicated by Formula 1 to thereby calculate the focus error signal SFE1 and supplies the focus error signal SFE1 to a focus control unit 54AF of the servo control unit 53A.

A tracking error signal calculating circuit 54T of the signal processing unit 54 performs, in generating a tracking error signal according to the one-beam push-pull method, the arithmetic operation indicated by Formula 2 to thereby calculate the tracking error signal STE1 and supplies the tracking error signal STE1 to a tracking control unit 53AT of the servo control unit 53A.

On the other hand, the tracking error signal calculating circuit 54T of the signal processing unit 54 performs, in generating a tracking error signal according to the phase difference method, the arithmetic operation indicated by Formula 3 to thereby calculate the tracking error signal STE1 and supplies the tracking error signal STE1 to the tracking control unit 53AT of the servo control unit 53A.

Unlike the first embodiment, the signal processing unit 54 adds up the light reception signals S11 and S12 according to the following Formula 6 to thereby calculate the reproduction RF signal SRF.

$$SRF = S11 + S12 \qquad \text{Formula 6:}$$

Specifically, the optical disk device 50 is adapted to generate the reproduction RF signal SRF on the basis of a light reception result of the reflected light beams LRS+1 and LRS−1.

Like the reproduction signal calculating circuit 4R (FIG. 2), a reproduction signal calculating circuit 54R is adapted to thereafter apply predetermined demodulation processing, decoding processing, and the like to the reproduction RF signal SRF to thereby reproduce information recorded on the optical disk 100.

3-4. Operation and Effect

In the configuration explained above, the optical pickup 57 of the optical disk device 50 irradiates the light beam L1 on the optical disk 100 and separates the reflected light beam LR reflected by the optical disk 100 and formed by S polarized light with the composite hologram element 67.

After changing a ratio of the S polarized light components and the P polarized light component in the reflected light beam LR with the half-wave plate 67A, the composite hologram element 67 transmits the S polarized light components in the reflected light beam LR to change the reflected light beam LR to the reflected light beam LRS with the polarization hologram 67B and diffracts the P polarized light components in the reflected light beam LR in each of the regions 67BA to 67BE.

The polarization hologram 67B diffracts the reflected light beams LRPA and LRPB in the vertical direction, diffracts the reflected light beams LRPC and LRPD in the horizontal direction, and diffracts the reflected light beam LRPE in an oblique direction.

Further, the composite hologram element 67 diffracts the reflected light beam LRS formed by the S polarized light with the polarization hologram 67C and transmits the reflected light beams LRPA to LRPE formed by the P polarized light. The polarization hologram 67C causes the reflected light beam LRS0 formed by the zeroth-order light to travel substantially straight and diffracts the reflected light beams LRS+1 and LRS−1 formed by the + first-order light and the − first order light in oblique directions substantially orthogonal to the reflected light beam LRPE, respectively.

According to the diffraction of the reflected light beams, the photodetector 69 receives the reflected light beam LRS0 and generates the light reception signals S1A to S1D with the light receiving regions D1A to D1D of the light receiving unit D1. The photodetector 69 receives the reflected light beams LRPA and LRPB and generates the light reception signals S2A and S2B respectively with the light receiving regions D2A and D2B of the light receiving unit D2. Further, the photodetector 69 receives the reflected light beams LRPC and LRPD and generates the light reception signals S3C and S3D respectively with the light receiving regions D13C and D13D of the light receiving unit D13.

The signal processing unit 54 calculates, on the basis of the light reception signals amplified by the head amplifier 72, the focus error signal SFE1 with the focus error signal calculating circuit 54F according to Formula 1. The signal processing unit 54 calculates the tracking error signal STE1 with the tracking error signal calculating circuit 54T according to Formula 2 and supplies the focus error signal SFE1 and the tracking error signal STE1 to the servo control unit 53A.

The servo control unit 53A generates the tracking driving signal STD1 with the tracking control unit 53AT on the basis of the tracking error signal STE1 and supplies the tracking driving signal STD1 to the tracking actuator 9T to thereby perform the tracking control.

Therefore, the optical disk device 50 can receive the reflected light beams LRPA, LRPB, LRPC, and LRPD with the light receiving units D2 and D13 of the photodetector 69 and can perform the tracking control on the basis of the tracking error signal STE1 generated by using the light reception signals S2A, S2B, S3C, and S3D, which are a result of the light reception.

In the photodetector 69, like the photodetector 19, the light receiving unit D2 is arranged in the vertical direction viewed from the reference point P and the light receiving regions D2A and D2B are arranged side by side in the vertical direction. Therefore, it is possible to avoid various stray light patterns W.

In the photodetector 69, the light receiving unit D13 is arranged in the horizontal direction viewed from the reference point P and the light receiving regions D13C and D13D are arranged side by side in the horizontal direction. Therefore, it is possible to avoid various stray light patterns W.

Specifically, in the photodetector 69, the light receiving regions D2A, D2B, D13C, and D13D are arranged such that the various stray light patterns W generated by the plural recording layers Y having different interlayer distances from the target recording layer YT in the optical disk 100 can be effectively avoided. Therefore, in the optical disk device 50, accuracy of the tracking error signal STE1 is hardly deteriorated.

The optical disk device 50 can calculate the reproduction RF signal SRF by adding up the two light reception signals S11 and S12 in the reproduction signal calculating circuit 54R of the signal processing unit 54.

Therefore, in the optical disk device 50, compared with the optical disk device 1 that calculates the reproduction RF signal SRF by adding up the four light reception signals S1A to S1D, the number of interposed amplifier circuits (in the head amplifier 72) can be reduced. Therefore, amplification noise components included in the reproduction RF signal SRF can be reduced.

In the optical disk device 50, spherical aberration that occurs in the light beam L1 and the reflected light beam LR is corrected by the spherical-aberration correcting unit 64. Consequently, compared with, for example, an optical disk device that moves the collimator lens 12 in the optical axis direction to correct the spherical aberration, the optical disk device 50 can stabilize the light beam L1 emitted from the object lens 8 without causing fluctuation in a light amount of the light beam L1.

Besides, the optical disk device 50 can also realize actions and effects same as those of the optical disk device 1 according to the first embodiment.

According to the configuration explained above, the optical pickup 57 of the optical disk device 50 diffracts the reflected light beam LR with the composite hologram element 67 to thereby cause the reflected light beam LRS0 to travel substantially straight, detects the reflected light beam LRS0 with the light receiving unit D1 of the photodetector 69, and generates the light reception signals S1A to S1D. The optical pickup 57 diffracts the reflected light beams LRPA and LRPB in the vertical direction, receives the reflected light beams LRPA and LRPB, and generates the light reception signals S2A and S2B respectively with the light receiving regions D2A and D2B of the light receiving unit D2. Further, the optical pickup 57 diffracts the reflected light beams LRPC and LRPD in the horizontal direction, receives the reflected light beams LRPC and LRPD, and generates the light reception signals S3C and S3D respectively with the light receiving regions D13C and D13D of the light receiving unit D13. Consequently, the optical disk device 50 can generate the tracking error signal STE1 in which the influence of the stray light patterns W formed by the interlayer stray light beams LN from the plural recording layers Y, respectively, is eliminated and can accurately perform the tracking control.

4. Fourth Embodiment

4-1. Configuration of an Optical Disk Device

An optical disk device 70 (FIG. 1) according to a fourth embodiment of the present invention is different from the optical disk device 50 according to the third embodiment in that a signal processing unit 74 and an optical pickup 77 are provided instead of the signal processing unit 54 and the optical pickup 57.

The signal processing unit 74 is different from the signal processing unit 54 in that a reproduction signal calculating circuit 74R is provided instead of the reproduction signal calculating circuit 54R. However, other kinds of arithmetic processing are the same as those in the arithmetic circuits in the signal processing unit 54.

4-2. Configuration of an Optical Pickup

Figure 19:
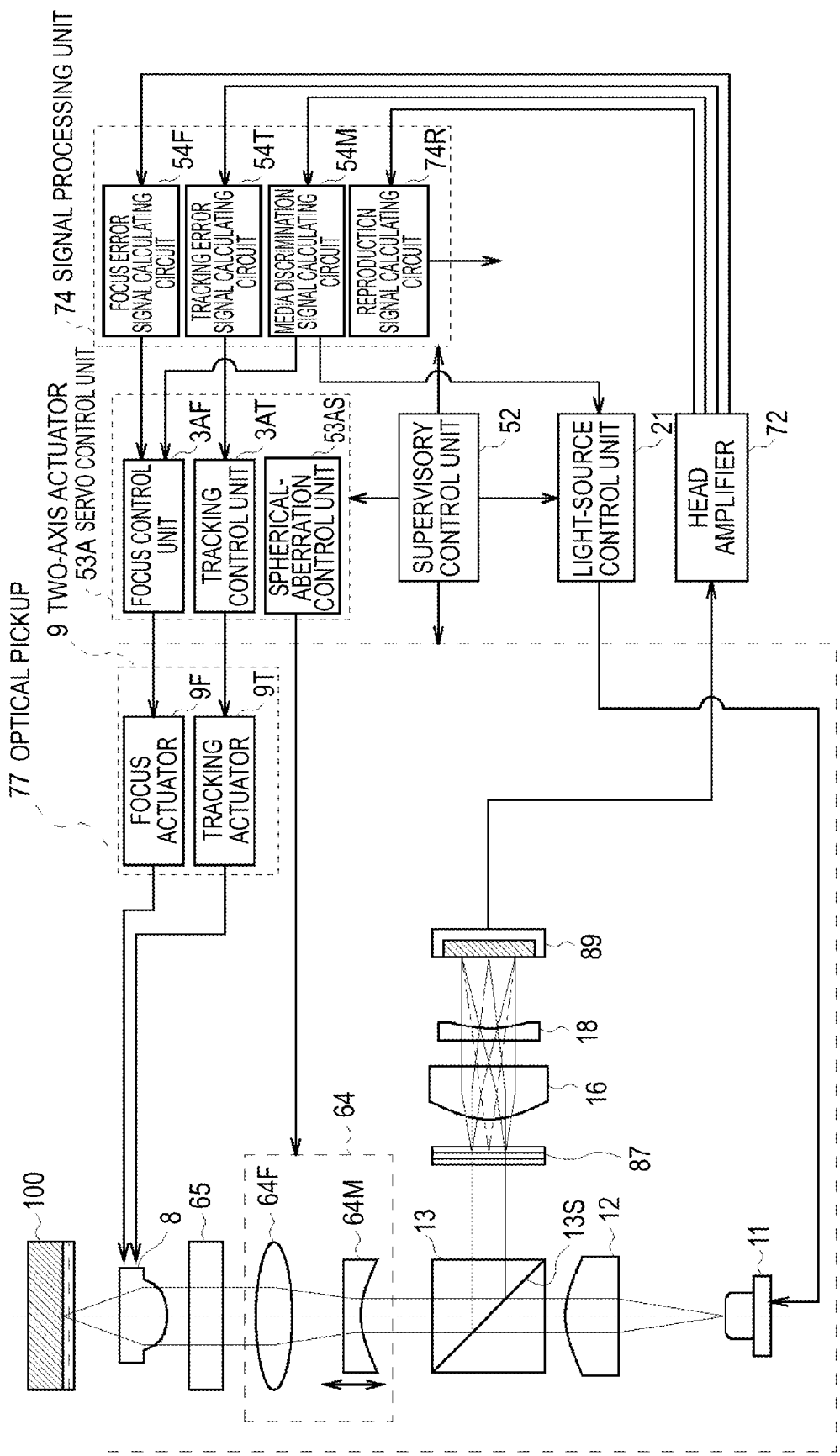
FIG. 19 is a schematic diagram of a configuration of an optical pickup according to a fourth embodiment of the present invention.

As shown in FIG. 19, the optical pickup 77 is different from the optical pickup 57 (FIG. 12) in that a composite hologram element 87 and the photodetector 89 are provided instead of the composite hologram element 67 and the photodetector 69.

Figure 20:
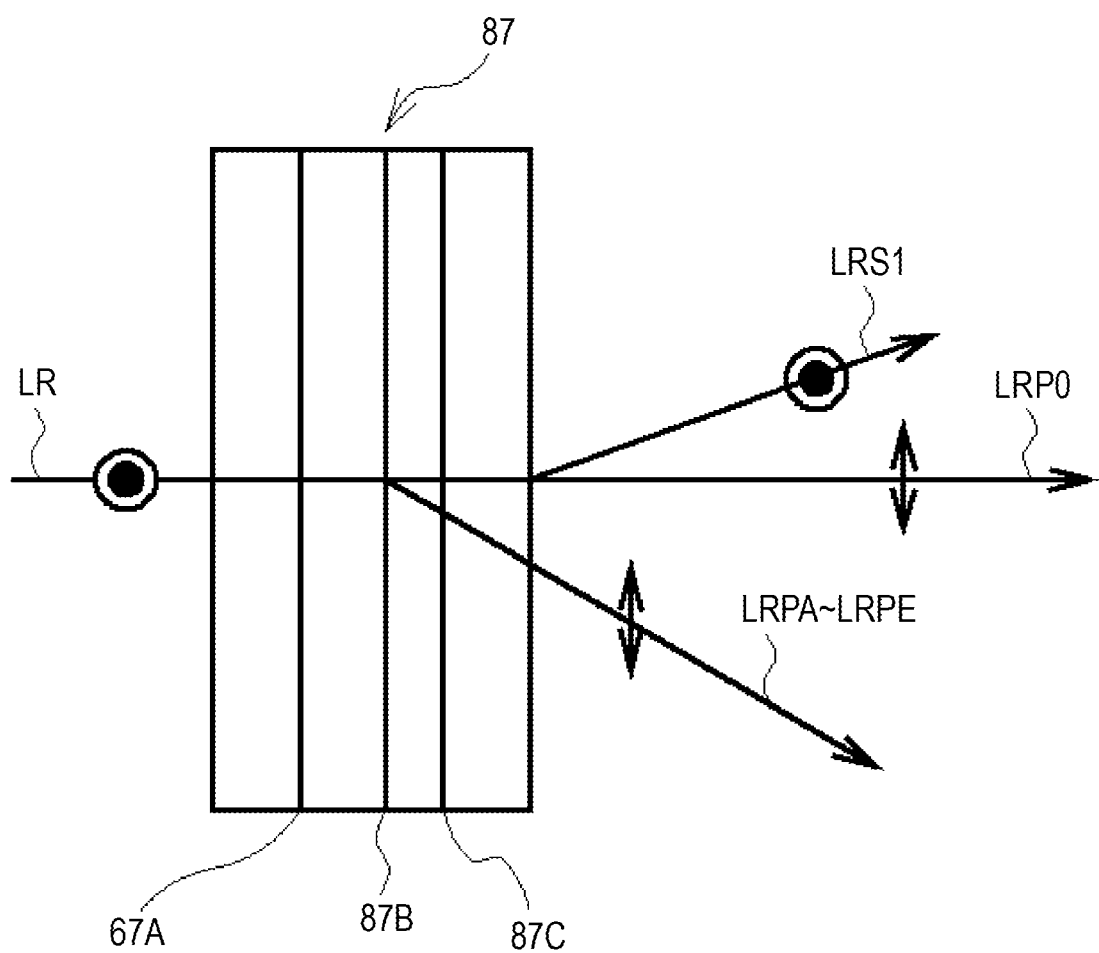
FIG. 20 is a schematic diagram of a configuration of a composite hologram element according to the fourth embodiment.

As shown in FIG. 20 corresponding to FIG. 13, the composite hologram element 87 is different from the composite hologram element 67 in the third embodiment in that a polarization hologram 87B is provided instead of the polarization hologram 67B and a polarization hologram 87C is provided instead of the polarization hologram 67C. However, the half-wave plate 67A is the same as that of the composite hologram element 67.

The polarization hologram 87B is formed by a binary hologram that diffracts the reflected light beam LR into the zeroth-order light and the first-order light. Like the polarization hologram 67B, the polarization hologram 87B is divided into the regions 67BA to 67BE (FIGS. 14A and 14B).

Like the polarization hologram 67C (FIGS. 15A and 15B) the polarization hologram 87C is adapted to exercise the diffracting action on only the S polarized light components of the reflected light beam LR and transmit the P polarized light components without acting thereon.

Figure 21A:
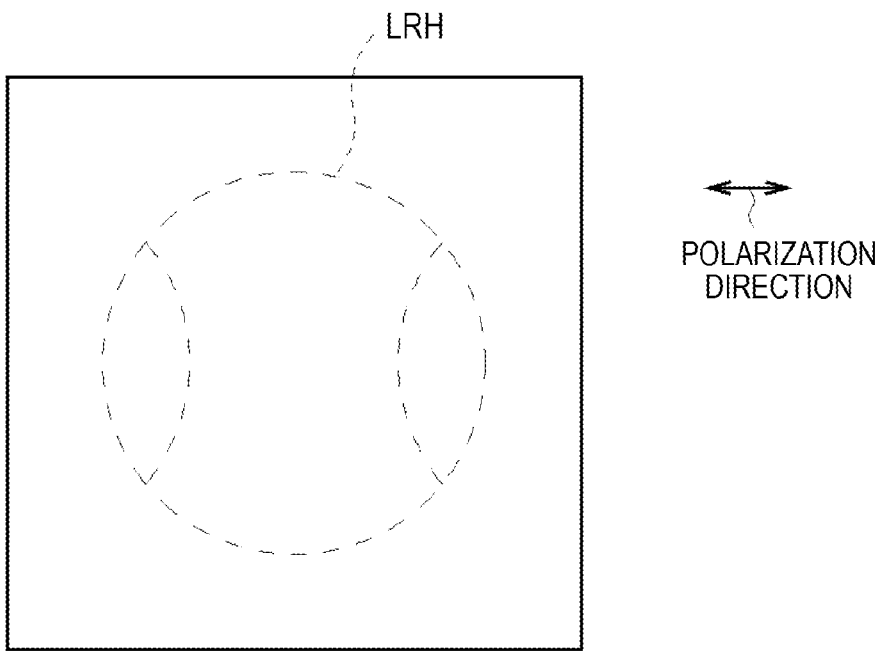
FIGS. 21A and 21B are schematic diagrams of a configuration of a polarization hologram (3)

As shown in FIG. 21A corresponding to FIG. 15A, the entire polarization hologram 87C is configured as a uniform diffraction grating. However, unlike the polarization hologram 67C, in the polarization hologram 87C, a so-called blazed hologram that diffracts a light beam into substantially only the first-order light is formed.

Figure 21B:
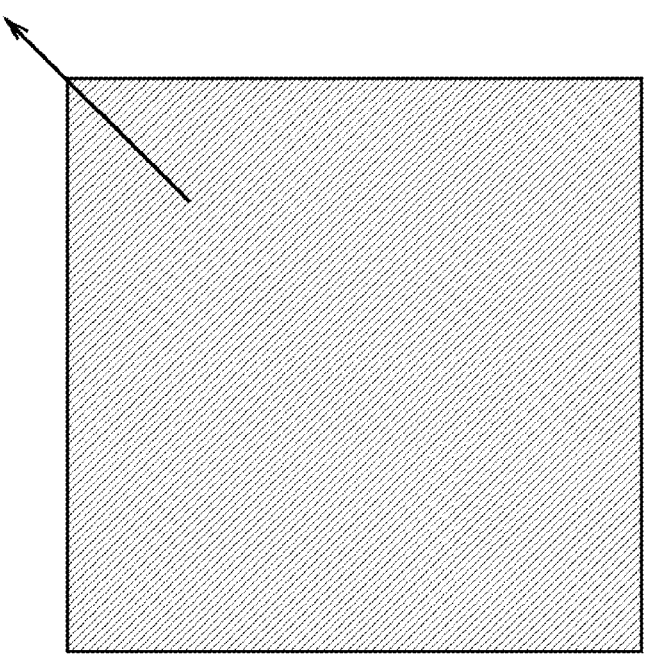

Therefore, as shown in FIG. 21B, the polarization hologram 87C is adapted to diffract the first-order light only to one of oblique directions different from the vertical direction and the horizontal direction, i.e., an upper left direction in the figure.

Figure 22:
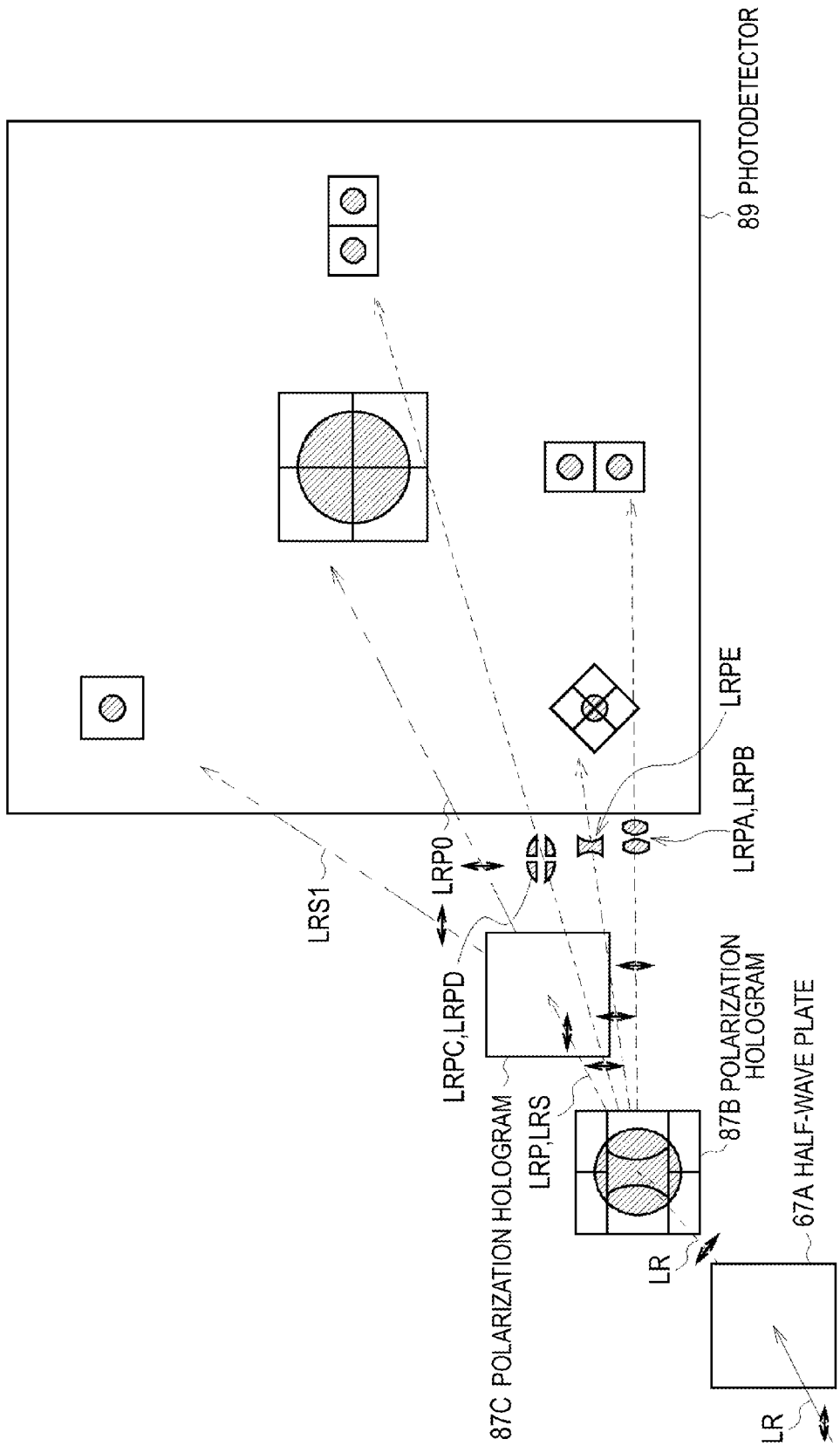
FIG. 22 is a schematic perspective view of a state of separation of a light beam according to the fourth embodiment.

In practice, as shown in FIG. 22, the polarization hologram 87C exercises the diffracting action on the reflected light beam LRS transmitted through the polarization hologram 87B in the reflected light beam LR.

The polarization hologram 87C diffracts the reflected light beam LRS1 formed by the first-order light in an oblique direction.

Like the polarization hologram 67C, the polarization hologram 87C directly transmits, without exercising the diffracting action, the P polarized light components of the reflected light beam LR, i.e., the reflected light beam LRP0 that travels straight through the polarization hologram 87B and the reflected light beams LRPA to LRPE diffracted in each of the regions by the polarization hologram 87B.

The condensing lens 16 condenses the reflected light beam LRP0, LRPA to LRPE, and LRS1 emitted from the composite hologram element 87 and makes the reflected light beams incident on the cylindrical lens 18.

As in the first embodiment, the cylindrical lens 18 imparts astigmatism to the reflected light beam LRP0 formed by the zeroth-order light and irradiates the reflected light beam LRP0 on the photodetector 69.

The cylindrical lens 18 also imparts, according to an optical characteristic thereof, astigmatism to the reflected light beams LRPA to LRPE and LRS1 formed by the first-order light. However, when the reflected light beams LRPA to LRPE and LRS1 are diffracted in the polarization holograms 87B and 87C, aberration for offsetting the astigmatism is imparted to the reflected light beams in advance.

Therefore, the reflected light beams LRPA to LRPE and LRS1 do not have aberration at a point when the reflected light beams LRPA to LRPE and LRS1 are emitted from the cylindrical lens 18.

Figure 23:
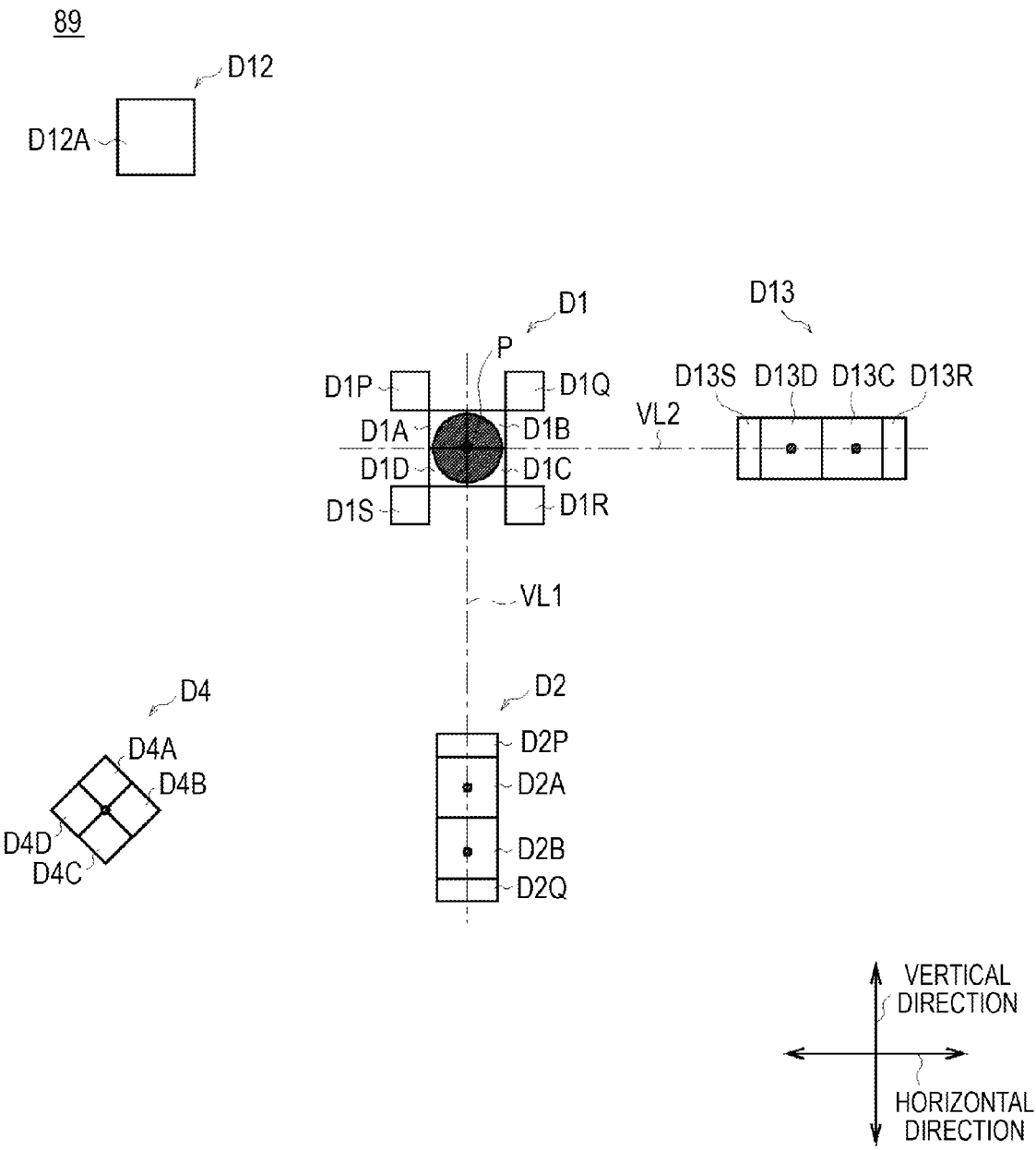
FIG. 23 is a schematic diagram of a configuration of a photodetector according to the fourth embodiment.

On the other hand, as shown in FIG. 23 corresponding to FIG. 17, the photodetector 89 corresponding to the photodetector 69 has a configuration in which the light receiving unit D11 is removed from the photodetector 69.

The light receiving unit 12 is adapted to receive the reflected light beam LRS1 from the light receiving region D12A, generate the light reception signal S12 corresponding to a light amount of the reflected light beam LRS1, and supply the light reception signal S12 to the head amplifier 72 (FIG. 12).

In this way, the photodetector 89 is adapted to receive the reflected light beams LRP0, LRPA to LRPE, and LRS1 with the light reception regions of the light receiving units D1, D2, D4, D13, and D12, respectively, generate light reception signals corresponding to light reception amounts thereof, respectively, and supply the reception signals to the head amplifier 72.

Figure 24:
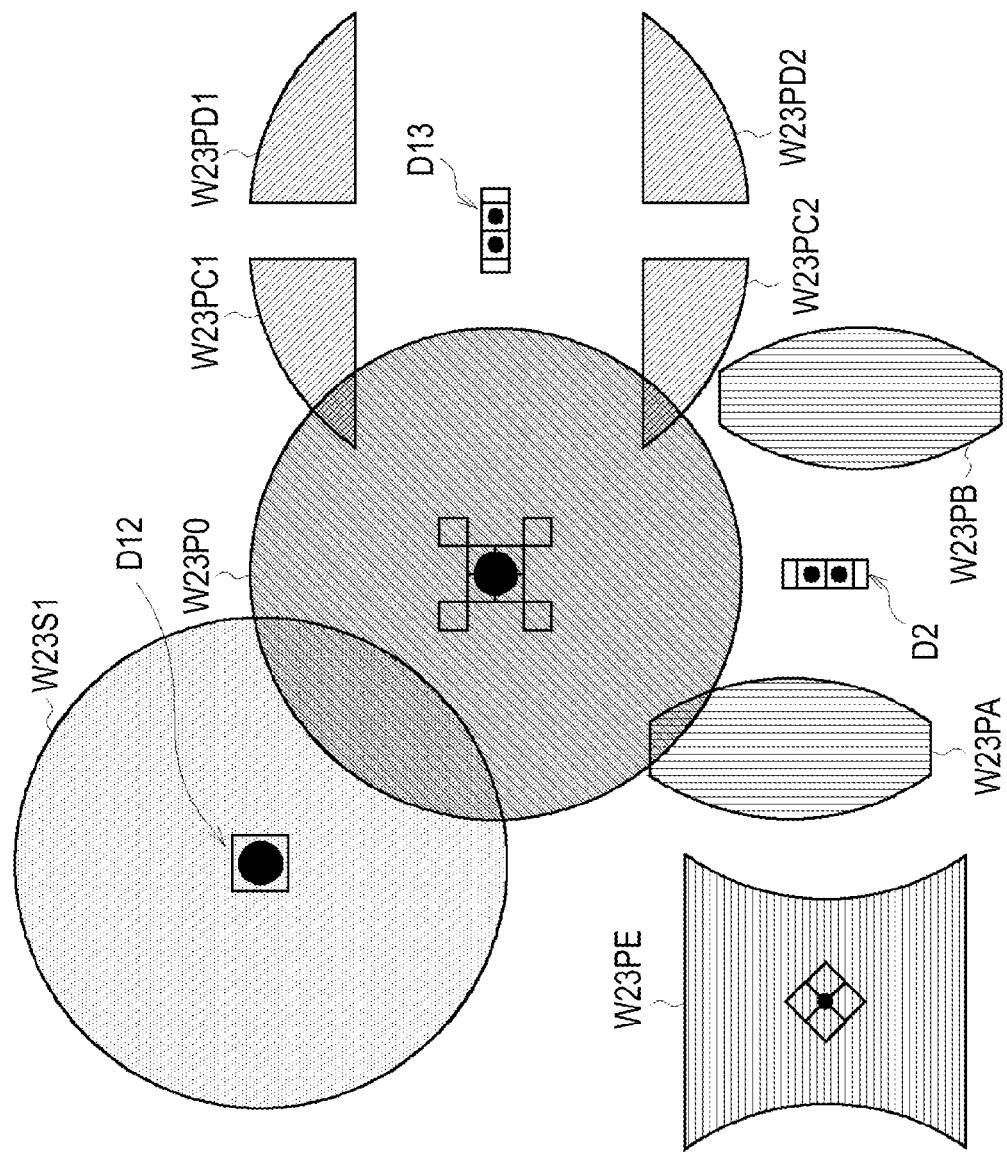
FIG. 24 is a schematic diagram of formation of a stray light pattern according to the fourth embodiment.

In the photodetector 89, as shown in FIG. 24 corresponding to FIG. 18, stray light patterns W23 are formed by the interlayer stray light beam LN. Like the stray light patterns W13, the stray light patterns W23 represent stray light patterns formed when an irradiation range is the largest.

Compared with the stray light patterns W13, the stray light patterns W23 have a shape formed by deleting the part of the stray light pattern W13S+1. This is because the polarization hologram 87C is formed by a blazed hologram and only one first-order light is generated when a light beam is diffracted.

Therefore, in the photodetector 89, as in the photodetector 69 according to the third embodiment, the light receiving units D2 and D13 are arranged such that the stray light patterns W23P0, W23S1, and W23PA to W23PE do not lie over the light receiving units D2 and D13.

Therefore, in the photodetector 89, an error caused by the interlayer stray light beam LN is hardly caused with respect to the light reception signals S2A, S2B, S3C, and S3D generated by the light receiving regions D2A, D2B, D13C, and D13D, respectively.

4-3. Focus Control and Tracking Control

In practice, like the optical disk device 50 according to the third embodiment, the optical disk device 70 is adapted to be capable of performing the focus control and the tracking control with the servo control unit 53A.

Unlike the third embodiment, the signal processing unit 74 sets the light reception signal S12 as the reproduction RF signal SRF according to the following Formula 7.

$$SRF = S12 \qquad \text{Formula 7:}$$

Specifically, the optical disk device 70 is adapted to generate the reproduction RF signal SRF on the basis of a light reception result of the reflected light beam LRS1.

Like the reproduction signal calculating circuit 54R (FIG. 12), the reproduction signal calculating circuit 74R is adapted to thereafter apply predetermined demodulation processing, decoding processing, and the like to the reproduction RF signal SRF to thereby reproduce information recorded on the optical disk 100.

4-4. Operation and Effect

In the configuration explained above, the optical pickup 77 of the optical disk device 70 irradiates the light beam L1 on the optical disk 100 and separates the reflected light beam LR reflected by the optical disk 100 and formed by the S polarized light with the composite hologram element 87.

As in the third embodiment, first, the half-wave plate 67A of the composite hologram element 87 changes a ratio of the S polarized light components and the P polarized light components in the reflected light beam LR. Subsequently, the polarization hologram 87B transmits the S polarized light components in the reflected light beam LR to change the reflected light beam LR to the reflected light beam LRS and diffracts the P polarized light components of the reflected light beam LR in each of the regions 67BA to 67BE.

The polarization hologram 87B diffracts the reflected light beams LRPA and LRPB in the vertical direction, diffracts the reflected light beams LRPC and LRPD in the horizontal direction, and diffracts the reflected light beam LRPE in an oblique direction. Further, the polarization hologram 67B causes the not-diffracted zeroth-order light of the reflected light beam LRP to directly travel straight as the reflected light beam LRP0.

Further, the polarization hologram 87C of the composite hologram element 87 diffracts the reflected light beam LRS formed by the S polarized light and transmits the reflected light beams LRP0 and LRPA to LRPE formed by the P polarized light. The polarization hologram 87C diffracts the reflected light beam LRS1 and the reflected light beam LRPE formed by the first-order light in an oblique direction substantially orthogonal to the reflected light beam LRPE.

According to the diffraction of the reflected light beams, the photodetector 89 receives the reflected light beam LRP0 and generates the light reception signals S1A and S1D with the light receiving regions D1A to D1D of the light receiving unit D1. The photodetector 89 receives the reflected light beams LRPA and LRPB and generates the light reception signals S2A and S2B respectively with the light receiving regions D2A and D2B of the light receiving unit D2. Further, the photodetector 89 receives the reflected light beams LRPC and LRPD and generates the light reception signals S3C and S3D respectively with the light receiving regions D13C and D13D of the light receiving unit D13.

As in the third embodiment, the signal processing unit 74 calculates, on the basis of the light reception signals amplified by the head amplifier 72, the tracking error signal STE1 with the tracking error signal calculating circuit 54T according to Formula 2 and supplies the tracking error signal STE1 to the servo control unit 53A.

The servo control unit 53A generates the tracking driving signal STD1 with the tracking control unit 53AT on the basis of the tracking error signal STE1 and supplies the tracking driving signal STD1 to the tracking actuator 9T to thereby perform the tracking control.

Therefore, the optical disk device 70 can receive the reflected light beams LRPA, LRPB, LRPC, and LRPD with the light receiving units D2 and D13 of the photodetector 89 and can perform the tracking control on the basis of the tracking error signal STE1 generated by using the light reception signals S2A, S2B, S3C, and S3D, which are a result of the light reception.

In the photodetector 89, like the photodetector 69, the light receiving unit D2 is arranged in the vertical direction viewed from the reference point P and the light receiving regions D2A and D2B are arranged side by side in the vertical direction. Therefore, it is possible to avoid various stray patterns W.

In the photodetector 89, like the photodetector 69, the light receiving unit D13 is arranged in the horizontal direction viewed from the reference point P and the light receiving regions D13C and D13D are arranged side by side in the horizontal direction. Therefore, it is possible to avoid various stray light patterns W.

Specifically, in the photodetector 89, the light receiving regions D2A, D2B, D13C, and D13D are arranged such that the various stray light patterns W generated by the plural recording layers Y having different interlayer distances from the target recording layer YT in the optical disk 100 can be effectively avoided. Therefore, in the optical disk device 70, accuracy of the tracking error signal STE1 is hardly deteriorated.

The optical disk device 70 can calculate the reproduction RF signal SRF on the basis of the light reception signal S12 in the reproduction signal calculating circuit 74R of the signal processing unit 74.

Therefore, in the optical disk device 70, compared with the optical disk device 50 that calculates the reproduction RF signal SRF by adding up the two light reception signals S11 to S12, the number of interposed amplifier circuits (in the head amplifier 72) can be reduced. Therefore, amplification noise components included in the reproduction RF signal SRF can be reduced.

In the optical disk device 70, astigmatism of the reflected light beam LRS1 formed by the first-order light is suppressed by the polarization hologram 87C of the composite hologram element 87. Therefore, the reflected light beam LRS1 can be caused to converge generally in a dot shape and irradiated on the light receiving region D12A of the light receiving unit D12. Therefore, it is possible to reduce a total area of the light receiving regions of the light receiving units D12, reduce an electric capacity of the light receiving regions, and improve a frequency characteristic of the reproduction RF signal SRF.

Besides, the optical disk device 70 can also realize actions and effects same as those of the optical disk device 50 according to the third embodiment.

According to the configuration explained above, the optical pickup 77 of the optical disk device 70 diffracts the reflected light beam LR with the composite hologram element 77 to thereby cause the reflected light beam LRP0 to travel substantially straight and detects the reflected light beam LRP0 with the light receiving unit D1 of the photodetector 89 to generate the light reception signals S1A to S1D. The optical pickup 77 diffracts the reflected light beams LRPA and LRPB in the vertical direction, receives the reflected light beams LRPA and LRPB, and generates the light reception signals S2A and S2B respectively with the light receiving regions D2A and D2B of the light receiving unit D2. Further, the optical pickup 77 diffracts the reflected light beams LRPC and LRPD in the horizontal direction, receives the reflected light beams LRPC and LRPD, and generates the light reception signals S3C and S3D respectively with the light receiving regions D13C and D13D of the light receiving unit D13. Consequently, the optical disk device 70 can generate the tracking error signal STE1 in which the influence of the stray light patterns W formed by the interlayer stray light beams LN from the plural recording layers Y, respectively, is eliminated and can accurately perform the tracking control.

5. Fifth Embodiment

5-1. Configuration of an Optical Disk

An optical disk device 90 (FIG. 1) according to a fifth embodiment of the present invention is different from the optical disk device 70 according to the fourth embodiment in that an optical pickup 91 is provided instead of the optical pickup 77. Otherwise, the optical disk device 90 is configured the same as the optical disk device 70.

5-2. Configuration of the Optical Pickup

Figure 25:
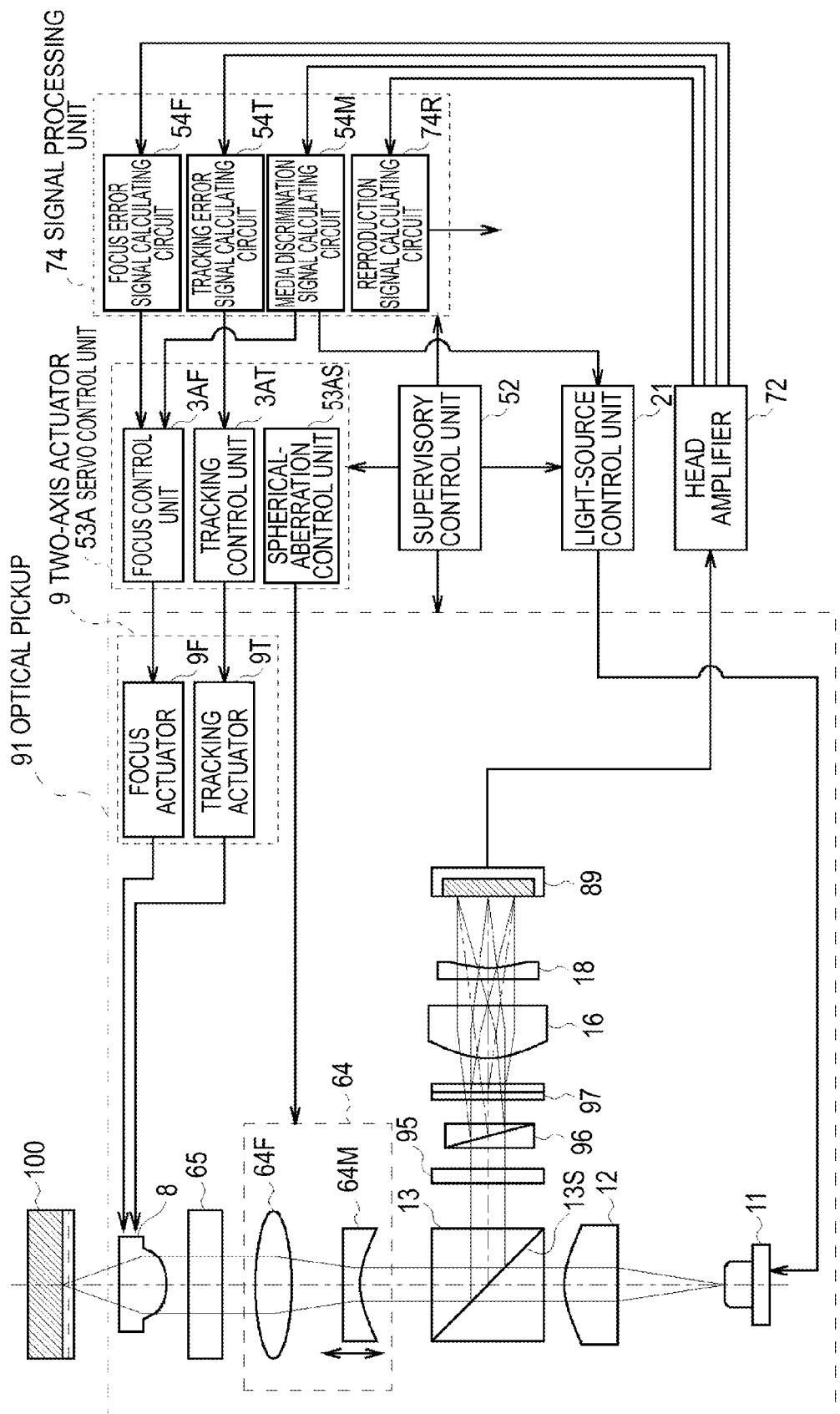
FIG. 25 is a schematic diagram of a configuration of an optical pickup according to a fifth embodiment of the present invention.
Figure 26:
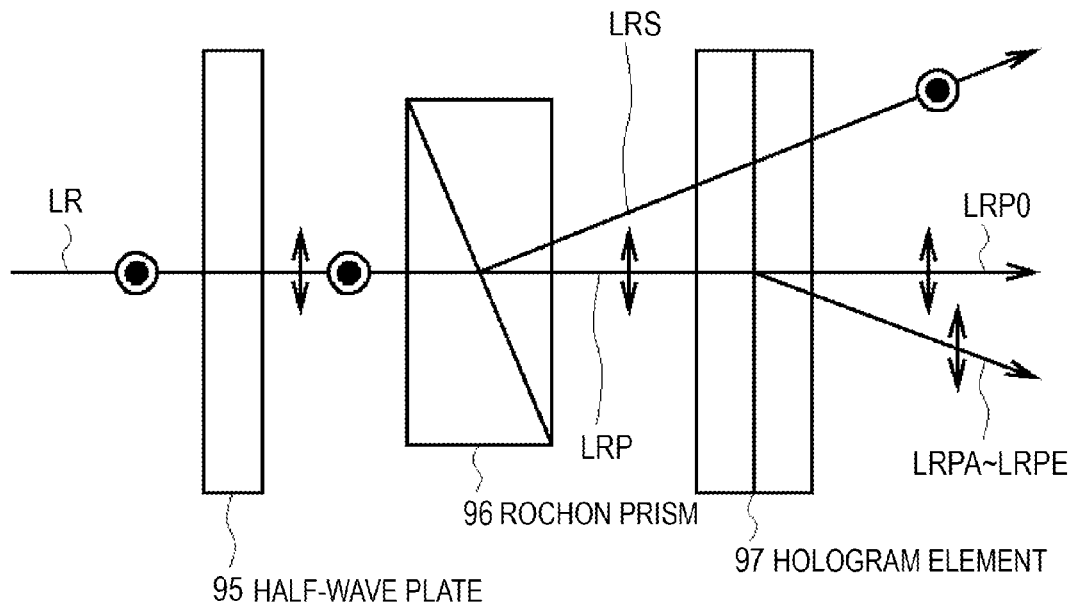
FIG. 26 is a schematic diagram for explaining the arrangement of optical elements in the fifth embodiment.

As shown in FIG. 25 in which components corresponding to those shown in FIG. 19 are denoted by the same reference numerals and signs, the optical pickup 91 is different from the optical pickup 77 in that a half-wave plate 95, a Rochon prism 96, and a hologram element 97 are provided instead of the composite hologram element 87.

Like the half-wave plate 67A of the composite hologram element 87, the half-wave plate 95 rotates a polarization direction of the reflected light beam LR by a predetermined angle to thereby reduce the S polarized light components to a predetermine ratio and makes the remaining S polarized light components incident on the Rochon prism 96 as P polarized light components.

The Rochon prism 96 is a type of a polarizer called Nicol prism employing birefringent crystal. The Rochon prism 96 is adapted to diffract predetermined polarization direction components in an incident light beam and transmit and cause the other polarization direction components to travel straight.

The Rochon prism 96 is adapted to diffract the light beam in an oblique direction at about 45 degrees with respect to both the vertical direction and the horizontal direction, i.e., an oblique upper left direction shown in FIG. 23.

In order to change a traveling direction of the light beam with the diffracting action, the Rochon prism 96 can substantially change the traveling direction compared with the diffracting action by the hologram element or the like.

In practice, the Rochon prism 96 diffracts the S polarized light components of the reflected light beam LR to change the reflected light beam LR to the reflected light beam LRS, directly transmits the P polarized light components as the reflected light beam LRS, and makes the reflected light beams LRS incident on the hologram element 97.

The hologram element 97 is configured substantially the same as the polarization hologram 67B of the composite hologram element 87. The hologram element 97 is adapted to be capable of directly transmitting a light beam of S polarized light components and, on the other hand, exercising the diffracting action on a light beam of P polarized light components and separating the light beam into zeroth-order light and first-order light.

Like the polarization hologram 67B, the hologram element 97 is divided into plural regions. The hologram element 97 exercises the diffracting action on the reflected light beam LRP in each of the regions to thereby divide the reflected light beam LRP into the reflected light beams LRPA to LRPE.

The reflected light beams LRPA and LRPB are diffracted in the vertical direction, the reflected light beams LRPC and LRPD are diffracted in the horizontal direction, and the reflected light beam LRPE is diffracted in an oblique direction (an oblique lower left direction shown in FIG. 23).

Further, the hologram element 97 causes the not-diffracted zeroth-order light of the reflected light beam LRP to directly travel straight as the reflected light beam LRP0.

As explained above, in the fifth embodiment, the reflected light beam LR is separated into the plural reflected light beams LRS, LRPA to LRPE, and LRP0 by the half-wave plate 95, the Rochon prism 96, and the hologram element 97 instead of the composite hologram element 87 according to the fourth embodiment.

As in the fourth embodiment, the photodetector 89 receives the reflected light beams LRPA and LRPB with the light receiving regions D2A and D2B of the light receiving unit D2, respectively, and receives the reflected light beams LRPC and LRPD with the light receiving regions D13C and D13D of the light receiving unit D13, respectively. The photodetector 89 receives the reflected light beam LRPE with the light receiving regions D4A to D4D of the light receiving unit D4.

The photodetector 89 receives the reflected light beam LRP0 with the light receiving regions D1A to D1D of the light receiving unit D1 and receives the reflected light beam LRS with the light receiving unit D12 instead of the reflected light beam LRS1 in the fourth embodiment.

In the photodetector 89, as in the fourth embodiment, as shown in FIG. 24, the stray light patterns W23P0, W23S1, and W23PA to W23PE do not lie over the light receiving units D2 and D13.

Therefore, as in the fourth embodiment, the photodetector 89 is adapted such that an error caused by the interlayer stray light beam LN is hardly caused with respect to the light reception signals S2A, S2B, S3C, and S3D generated by the light receiving regions D2A, D2B, D13C, and D13D, respectively.

Like the optical disk device 70 according to the fourth embodiment, the optical disk device 90 is adapted to be capable of performing the focus control and the tracking control with the servo control unit 53A.

Further, as in the fourth embodiment, the optical disk device 90 is adapted to generate the reproduction RF signal SRF with the signal processing unit 74 according to Formula 7 and apply predetermined demodulation processing, decoding processing, and the like to the reproduction RF signal SRF to thereby reproduce information recorded on the optical disk 100.

5-3. Operation and Effect

In the configuration explained above, the optical pickup 91 of the optical disk device 90 irradiates the light beam L1 on the optical disk 100 and separates the reflected light beam LR reflected by the optical disk 100 and formed by the S polarized light with the half-wave plate 95, the Rochon prism 96, and the hologram element 97.

First, the half-wave plate 95 changes a ratio of the S polarized light components and the P polarized light components in the reflected light beam LR. Subsequently, the Rochon prism 96 transmits the P polarized light components as the reflected light beam LRP and, on the other hand, diffracts the S polarized light components as the reflected light beam LRS and causes the reflected light beam LRS to travel in an oblique direction.

The hologram element 97 transmits the reflected light beam LRS formed by the S polarized light and, on the other hand, diffracts the reflected light beam LRP formed by the P polarized light in each of the regions and separates the reflected light beam LRP into the reflected light beams LRP0 and LRPA to LRPE.

According to the separation of the reflected light beam LRP, the photodetector 89 receives the reflected light beam LRP0 and generates the light reception signals S1A to S1D with the light receiving regions D1A to D1D of the light receiving unit D1. The photodetector 89 receives the reflected light beams LRPA and LRPB and generates the light reception signals S2A and S2B respectively with the light receiving regions D2A and D2B of the light receiving unit D2. Further, the photodetector 89 receives the reflected light beams LRPC and LRPD and generates the light reception signals S3C and S3D respectively with the light receiving regions D13C and D13D of the light receiving unit D13.

As in the fourth embodiment, the signal processing unit 74 calculates, on the basis of the reception signals amplified by the head amplifier 72, the tracking error signal STE1 with the tracking error signal calculating circuit 54T according to Formula 2 and supplies the tracking error signal STE1 to the servo control unit 53A.

The servo control unit 53A generates the tracking driving signal STD1 with the tracking control unit 53AT on the basis of the tracking error signal STE1 and supplies the tracking driving signal STD1 to the tracking actuator 9T to thereby perform the tracking control.

Therefore, as in the fourth embodiment, the optical disk device 90 can receive the reflected light beams LRPA, LRPB, LRPC, and LRPD with the light receiving units D2 and D13 of the photodetector 89 and can perform the tracking control on the basis of the tracking error signal STE1 generated by using the light reception signals S2A, S2B, S3C, and S3D, which are a result of the light reception.

In the optical pickup 91 of the optical disk device 90, it is possible to change a traveling direction of the reflected light beam LRS according to the diffracting action by the Rochon prism 96. Therefore, the optical disk device 90 does not need to taken into account limitation in design to reduce a grating pitch of a hologram in the polarization hologram 87C in order to increase a diffraction angle.

Besides, the optical disk device 90 can also realize actions and effects same as those of the optical disk device 70 according to the fourth embodiment.

According to the configuration explained above, the optical pickup 91 of the optical disk device 90 diffracts the reflected light beam LR with the Rochon prism 96 to thereby diffract the reflected light beam LRS in an oblique direction, causes the reflected light beam LRP0 to travel substantially straight with the hologram element 97, and detects the reflected light beam LRP0 with the light receiving unit D1 of the photodetector 89 to generate the light reception signal S1A to S1D. The optical pickup 77 diffracts the reflected light beams LRPA and LRPB in the vertical direction with the hologram element 97, receives the reflected light beams LRPA and LRPB and generates the light reception signals S2A and S2B with the light receiving regions D2A and D2B of the light receiving unit D2. Further, the optical pickup 77 diffracts the reflected light beams LRPC and LRPD in the lateral direction, receives the reflected light beams LRPC and LRPD, and generates the light reception signals S3C and S3D with the light receiving regions D13C and D13D of the light receiving unit D13. Consequently, the optical disk device 90 can generate the tracking error signal STE1 in which the influence of the stray light patterns W formed by the interlayer stray light beams LN from the plural recording layers Y, respectively, is eliminated and can accurately perform the tracking control.

6. Sixth Embodiment

6-1. Configuration of an Optical Disk Device

In a sixth embodiment of the present invention, an optical disk device 110 is adapted to be applicable to the optical disk 100 of a BD type (hereinafter referred to as optical disk 100B), the optical disk 100 of a DVD type (hereinafter referred to as optical disk 100D), and the optical disk 100C of a CD type (hereinafter referred to as optical disk 100C).

Figure 27:
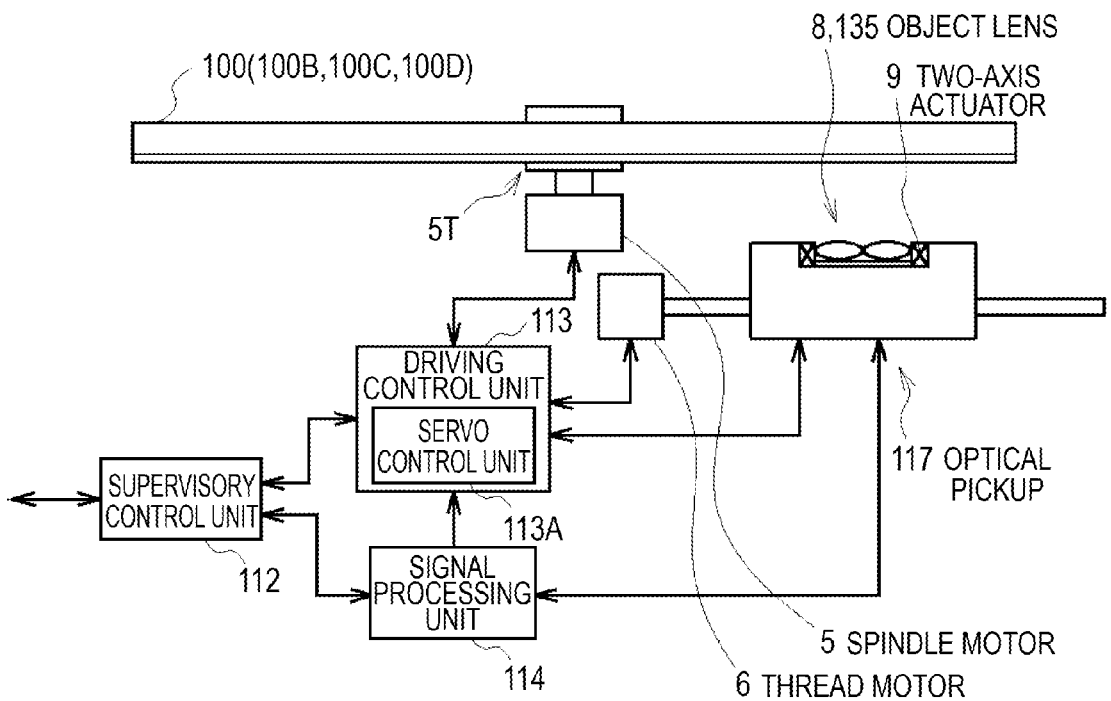
FIG. 27 is a schematic diagram of a configuration of an optical disk device according to a sixth embodiment of the present invention.

As shown in FIG. 27 in which components corresponding to those shown in FIG. 1 are denoted by the same reference numerals and signs, in the optical disk device 110, a supervisory control unit 112, a driving control unit 113, a signal processing unit 114, and an optical pickup 117 are provided instead of the supervisory control unit 2, the driving control unit 3, the signal processing unit 4, and the optical pickup 7 according to the first embodiment.

Like the supervisory control unit 2, the supervisory control unit 112 includes a not-shown CPU, a ROM in which various programs and the like are stored, and a RAM used as a work memory for the CPU. The supervisory control unit 112 is adapted to supervise and control the entire optical disk device 110.

Specifically, in addition to the functions of the supervisory control unit 2, the supervisory control unit 112 is adapted to discriminate a type of the optical disk 100 and supply a switching command and the like corresponding to the type of the optical disk 100 to the driving control unit 113, the signal processing unit 114, the optical pickup 117, and the like.

The optical pickup 117 is adapted to irradiate a light beam corresponding to the type of the optical disk 100 on the optical disk 100 and receive a reflected light beam of the light beam reflected by the optical disk 100 (explained in detail later).

Like the signal processing unit 4, the signal processing unit 114 performs predetermined arithmetic processing using a supplied light reception signal to thereby generate a focus error signal and a tracking error signal and supplies the focus error signal and the tracking error signal to the driving control unit 113.

Like the servo control unit 3A according to the first embodiment, the servo control unit 113A of the driving control unit 113 is adapted to perform the focus control and the tracking control for the object lens 8 or 135 (explained in detail later).

In this way, the optical disk device 110 is adapted to be capable of causing the optical pickup 117 to irradiate a light beam on the optical disk 100 and performing information reproduction processing and information recording processing while performing the focus control and the tracking control on the basis of reflected light of the light beam.

6-2. Configuration of the Optical Pickup

Figure 28:
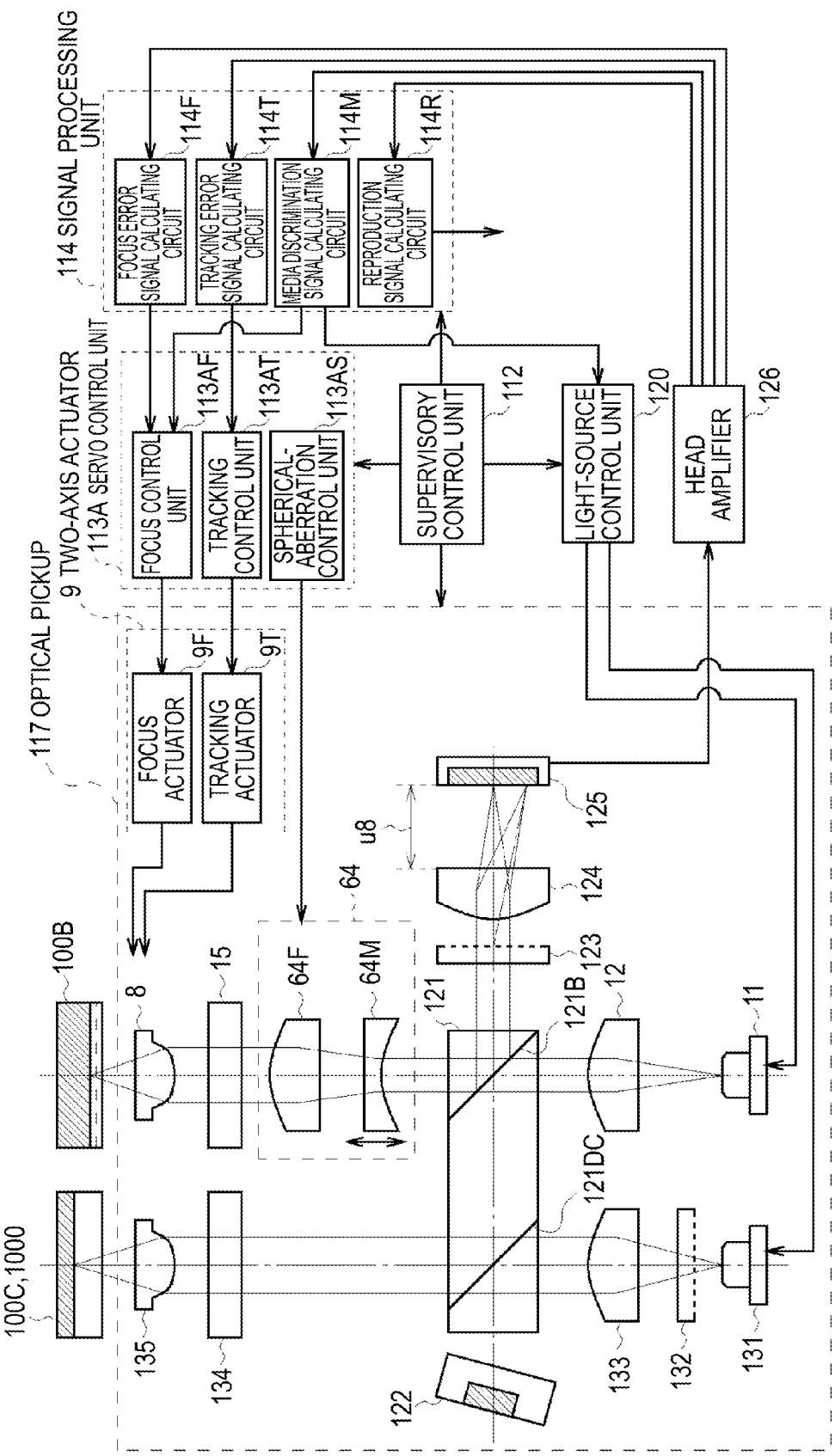
FIG. 28 is a schematic diagram of a configuration of an optical pickup according to the sixth embodiment.

As shown in FIG. 28 in which components corresponding to those shown in FIG. 2 are denoted by the same reference numerals and signs, the optical pickup 117 is adapted to irradiate light beams having a wavelength of about 405 nm, a wavelength of about 660 nm, and a wavelength of about 780 nm on the optical disk 100B, the optical disk 100D, and the optical disk 100C, respectively, and receive reflected light beams of the light beams.

The optical disk device 110 is adapted to be capable of discriminating whether the optical disk 100 is the optical disk 100B of the BD type, the optical disk 100D of the DVD type, or the optical disk 100C of the CD type by performing predetermined media discrimination processing.

6-2-1. Irradiation of a Light Beam on the Optical Disk 100B of the BD Type and Light Reception The supervisory control unit 112 of the optical disk device 110 is adapted to cause, when the optical disk 100 is the optical disk 100B of the BD type, the optical pickup 117 to irradiate a light beam having a wavelength suitable for the optical disk 100B.

Specifically, as in the first embodiment, the laser diode 11 of the optical pickup 117 is adapted to be capable of emitting the light beam LB formed by blue-purple laser light having a wavelength of about 405 nm as diverging light under the control by a light-source control unit 120. An attachment angle and the like of the laser diode 11 is adjusted such that the light beam LB changes to P polarized light.

In practice, the supervisory control unit 112 controls the light-source control unit 120 to thereby cause the laser diode 11 to emit the light beam LB and makes the light beam LB incident on the collimator lens 12. The collimator lens 12 converts the light beam LB from the diverging light into parallel light and makes the light beam LB incident on a polarization prism 121.

The polarization prism 121 is adapted to transmit a light beam of the P polarized light at a rate of about 90% with a reflecting and transmitting surface 121B, transmittance of which varies according to a polarization direction, and reflect the remaining light beam and reflect a light beam of the S polarized light at a rate of nearly 100%.

The reflecting and transmitting surface 121B is adapted to act on the light beam LB having a wavelength of about 405 nm and transmit light beams having a wavelength of about 660 nm and a wavelength of about 780 nm without acting thereon.

In practice, the polarization prism 121 transmits the light beam LB at a rate of about 90% with the reflecting and transmitting surface 121B and makes the light beam LB incident on the spherical-aberration correcting unit 64. The polarization prism 121 reflects the remaining about 10% as a front monitor light beam LBM and makes the front monitor light beam LBM incident on a front monitor photodetector 122.

The front monitor photodetector 122 receives the front monitor light beam LBM, generates a front monitor light reception signal SFM corresponding to a light amount of the front monitor light beam LBM, and supplies the front monitor light reception signal SFM to the light-source control unit 120. The light-source control unit 120 is adapted to perform, on the basis of the front monitor light reception signal SFM, feedback control such that a light amount of the light beam LB emitted from the laser diode 11 has a desired value.

On the other hand, as in the third embodiment, the spherical-aberration correcting unit 64 is adapted to impart in advance, to the light beam LB, spherical aberration having a characteristic opposite to that of spherical aberration that occurs when the light beam LB is condensed and reaches the target recording layer YT of the optical disk 100B.

As in the first embodiment, the quarter-wave plate 15 converts, for example, the light beam LB formed by the P polarized light into left circularly polarized light and makes the light beam LB incident on the object lens 8.

As in the first embodiment, the object lens 8 condenses the light beam LB. The supervisory control unit 112 adjusts, via a focus control unit 113AF, a position of the object lens 8 with respect to the focus direction with the focus actuator 9F. Therefore, the object lens 8 irradiates the light beam LB to generally set a focus FB of the light beam LB on the target recording layer YT of the optical disk 100B.

The light beam LB is reflected on the target recording layer YT to thereby change to a reflected light beam LBR and is made incident on the object lens 8. Since a rotating direction in circularly polarized light is reversed during reflection, the reflected light beam LBR changes to right circularly polarized light.

Thereafter, like the reflected light beam LR in the first embodiment, the reflected light beam LBR is converted from the diverging light into parallel light by the object lens 8, converted from the right circularly polarized light into S polarized light (linearly polarized light) by the quarter-wave plate 15, and made incident on the spherical-aberration correcting unit 64.

The spherical-aberration correcting unit 64 corrects spherical aberration that occurs until the reflected light beam LBR passes through the object lens 8 after being reflected by the target recording layer YT and makes the reflected light beam LBR incident on the polarization prism 121.

The polarization prism 121 reflects the reflected light beam LBR formed by the S polarized light on the reflecting and transmitting surface 121B and makes the reflected light beam LBR incident on a hologram element 123.

The hologram element 123 separates the reflected light beam LBR having a wavelength of about 405 nm into at least zeroth-order light and first-order light according to a characteristic of a diffraction element and makes the zeroth-order light and the first-order light incident on an anamorphic lens 124.

Figure 29A:
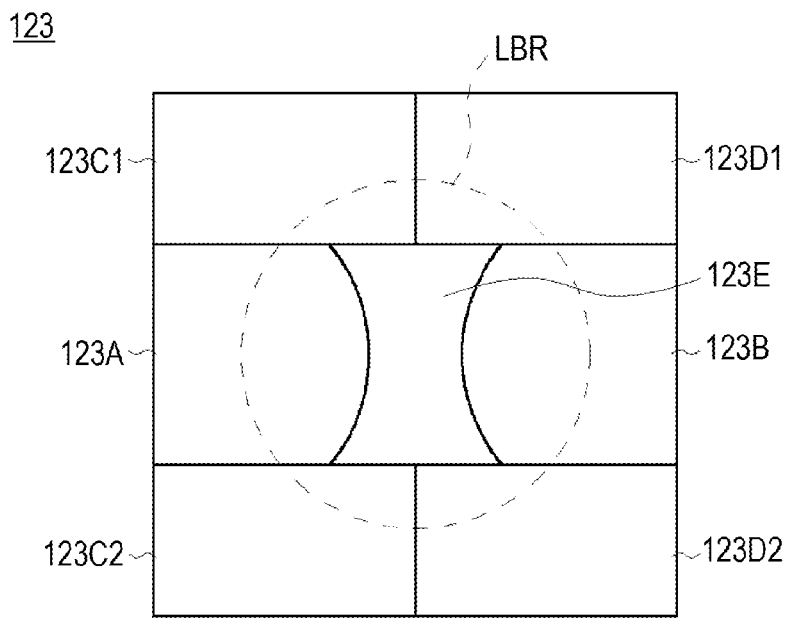
FIGS. 29A and 29B are schematic diagrams of a configuration of a hologram element according to the sixth embodiment.
Figure 29B:
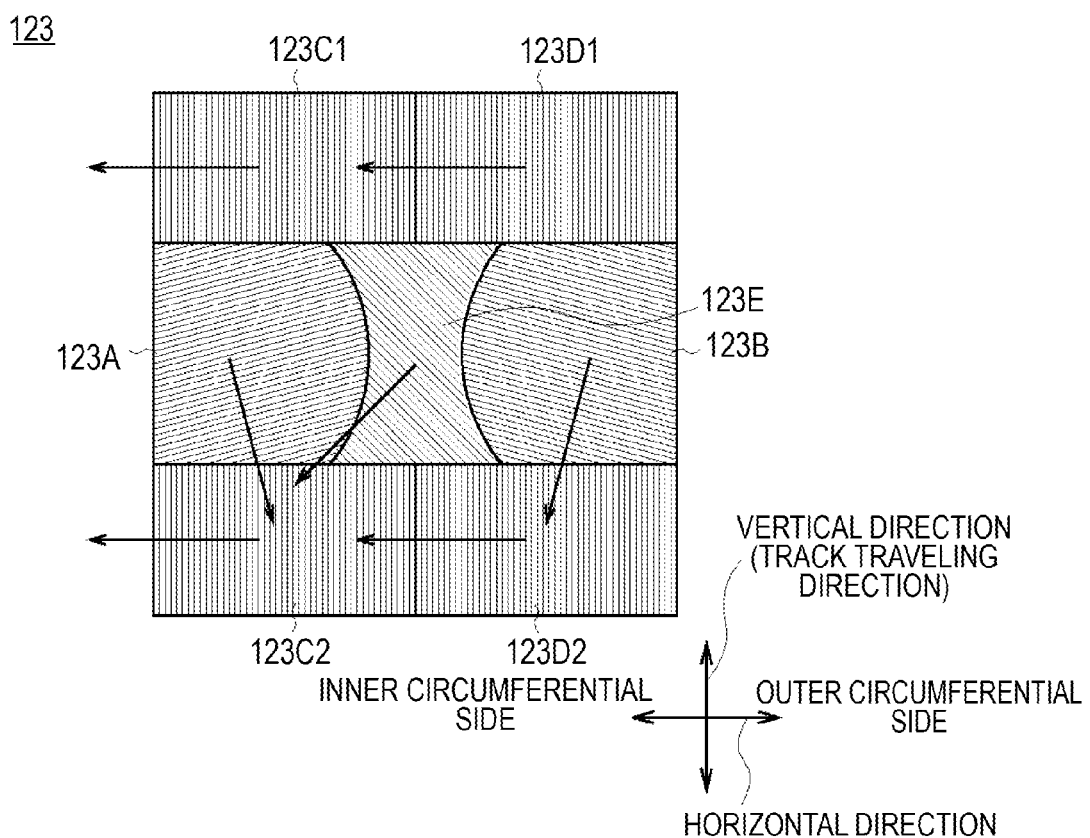

As shown in FIGS. 29A and 29B corresponding to FIGS. 4A and 4B, the hologram element 123 is divided into plural regions 123A to 123E. The hologram element 123 diffracts, with the regions, the reflected light beam LBR at diffraction angles same as those of the regions 17A to 17E of the hologram element 17 and causes the reflected light beam LBR to travel in a direction different from that of a reflected light beam LBR0 formed by zeroth-order light.

Specifically, the hologram element 123 diffracts reflected light beams LBR1A and LBR1B in the vertical direction with the regions 123A and 123B, respectively. The hologram element 123 diffracts reflected light beams LBRC1, LBRC2, DBRD1, and LBRD2 in the horizontal direction with the regions 123C1, 123C2, 123D1, and 123D2, respectively. Further, the hologram element 123 diffracts a reflected light beam LBR1E in an oblique direction with the region 123E.

The anamorphic lens 124 has the functions of the condensing lens 16 and the cylindrical lens 18 according to the first embodiment. The anamorphic lens 124 imparts astigmatism to the reflected light beam LBR0 formed by the zeroth-order light and irradiates the reflected light beam LBR0 on the photodetector 125.

The anamorphic lens 124 also imparts astigmatism to the reflected light beams LBR1A to LBR1E formed by the first-order light. However, when the reflected light beams LBR1A to LBR1E formed by the first-order light are diffracted by the hologram element 123, an optical characteristic for offsetting the astigmatism is imparted to the reflected light beams LBR1A to LBR1E.

Specifically, the reflected light beams LBR1A to LBR1E formed by the first-order light do not have astigmatism at a point when the reflected light beams LBR1A to LBR1E are emitted from the anamorphic lens 124.

In the optical pickup 117, a gap u8 from the photodetector 125 to the anamorphic lens 124 is set larger than a gap u7 calculated by the following Formula 8.

$$u7 = u1 \times M^2 \quad \text{Formula 8:}$$

In Formula 8, a gap u1 represents a maximum of a gap between the recording layers Y in the optical disk 100B, for example, a gap between the recording layers Y0 and Y3 in FIG. 3. Lateral magnification M represents lateral magnification of an optical system in an optical path from the optical disk 100B to the photodetector 125.

Specifically, in the optical pickup 117, no other optical components and the like are provided in a range of the gap u7 from the photodetector 125 on optical paths of the reflected light beam LBR and the like.

Figure 30:
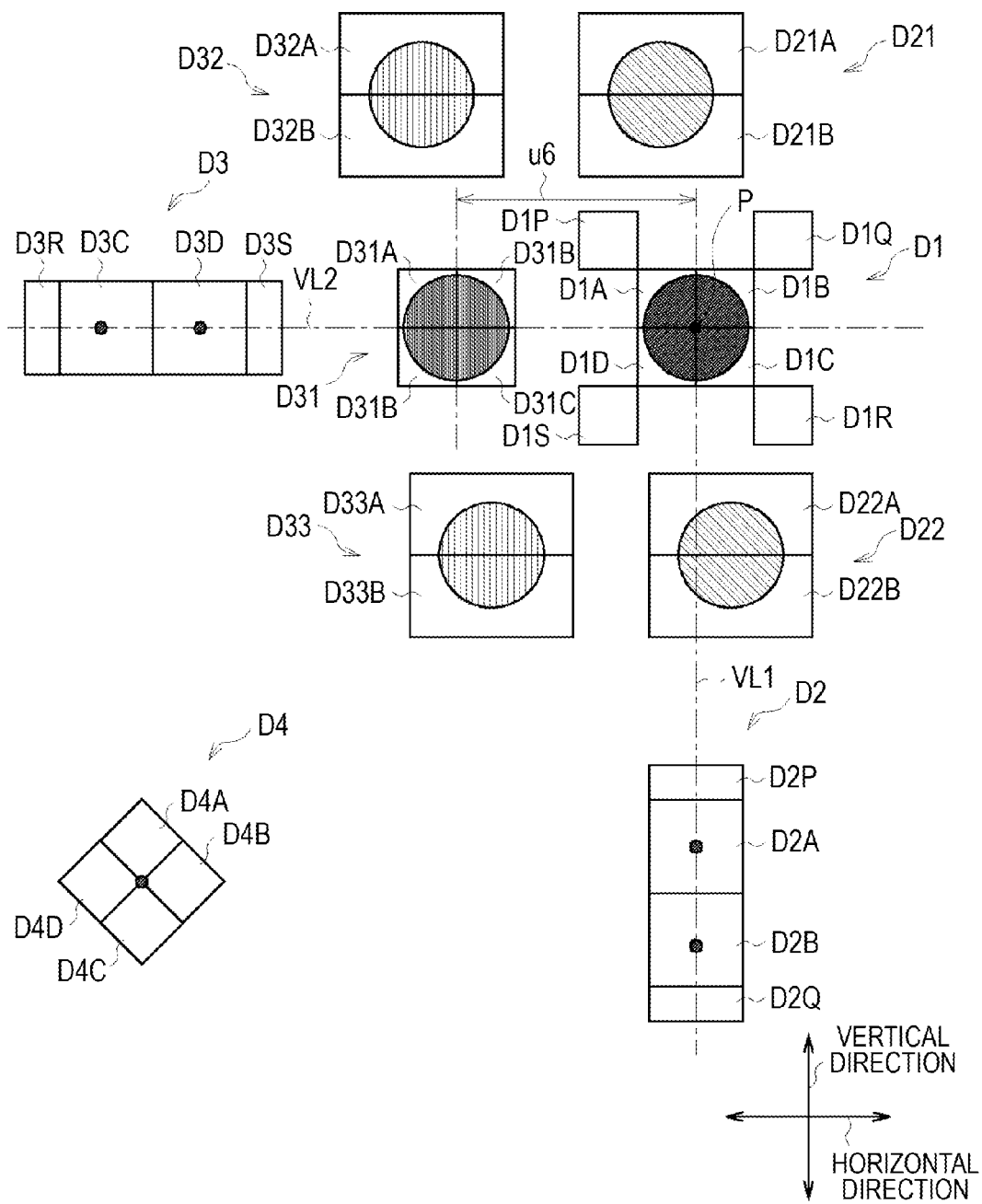
FIG. 30 is a schematic diagram of a configuration of a photodetector according to the sixth embodiment.

As shown in FIG. 30, the photodetector 125 has a configuration partially similar to the photodetector 19 (FIG. 5) according to the first embodiment. The light receiving unit D1 to D4 same as those of the photodetector 19 are formed in the photodetector 125.

Specifically, the photodetector 125 is adapted to receive the reflected light beams LBR0, LBR1A, LBR1B, LBR1C, LBR1D, and LBR1E in the light receiving units D1 to D4, generate light reception signals according to a result of the light reception, and supply the light reception signal to a head amplifier 126 (FIG. 28).

Further, in the photodetector 125, light receiving units D21 and D22 are added to hold the light receiving unit D1 from the vertical direction. Light receiving units D31, D32, and D33 are provided in places separated from the light receiving units D1, D21, and D22 in the horizontal direction by predetermined distances, respectively.

The light receiving unit D21 has light receiving regions D21A and D21B divided into two with respect to the vertical direction. The light receiving regions D21A and D21B are adapted to generate light reception signals S21A and S21B corresponding to light reception amounts thereof, respectively, and send the light reception signals S21A and S21B to the head amplifier 126.

Like the light receiving unit D21, the light receiving unit D22 includes light receiving regions D22A and D22B divided into two with respect to the vertical direction. The light receiving regions D22A and D22B are adapted to generate light reception signals S22A and S22B corresponding to light reception amounts thereof, respectively, and send the light reception signals S22A and S22B to the head amplifier 126.

In this case, as in the optical disk device 1, the optical disk device 110 calculates the focus error signal SFE1 and the tracking error signal STE1 with the signal processing unit 114 and supplies the focus error signal SFE1 and the tracking error signal STE1 to the servo control unit 113A. The signal processing unit 114 also calculates the reproduction RF signal SRF and the like.

Like the servo control unit 3A of the optical disk device 1, the servo control unit 113A is adapted to perform focus control based on the focus error signal SFE1 and tracking control based on the tracking error signal STE1.

6-2-2. Irradiation of a Light Beam on the Optical Disk 100C of the CD Type and Light Reception When the optical disk 100 is the optical disk 100C of the CD type, the supervisory control unit 112 of the optical disk device 110 is adapted to irradiate a light beam having a wavelength suitable for the optical disk 100C.

The optical disk 100C includes only one recording layer Y according to a standard thereof. In the following explanation, for convenience, this recording layer Y is referred to as target recording layer YT.

Figure 31:
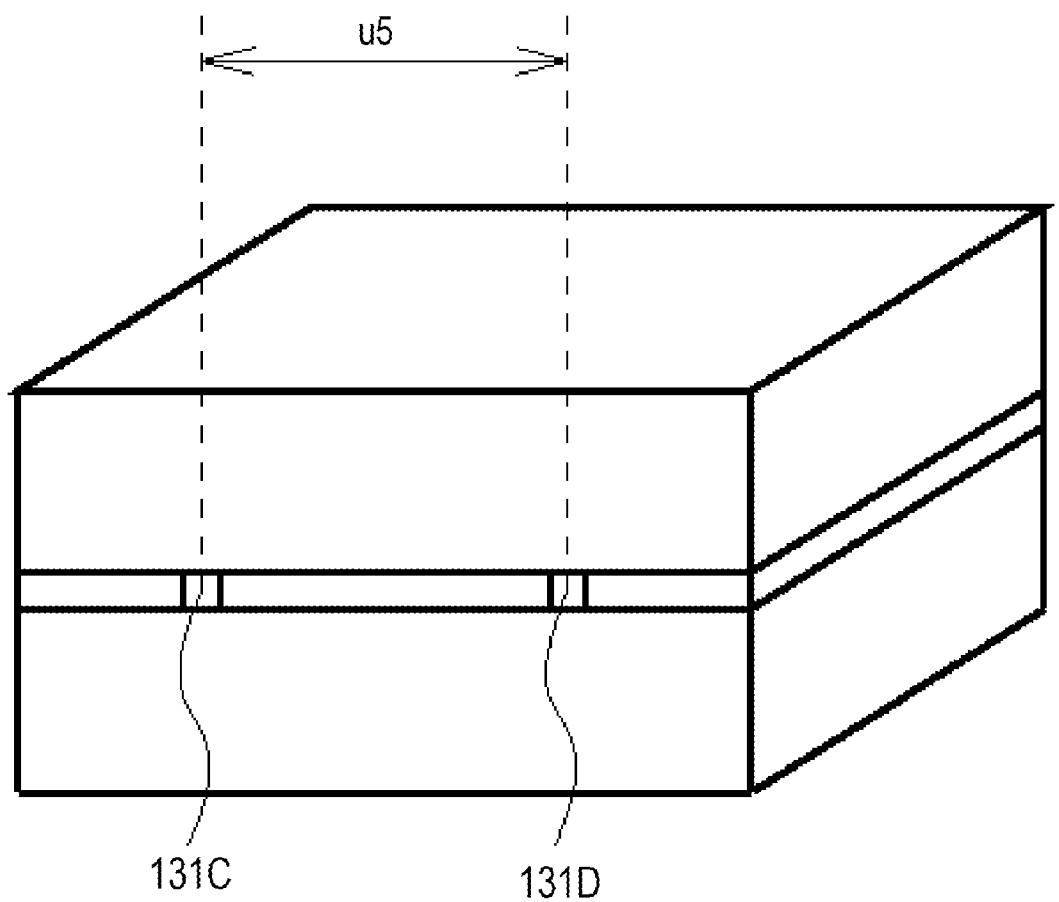
FIG. 31 is a schematic perspective view of a configuration of a double frequency laser diode.

In a laser diode 131 of the optical pickup 117, as shown in FIG. 31, a laser chip 131C that emits a light beam having a wavelength of about 780 nm and a laser chip 131D that emits a light beam having a wavelength of about 660 nm are provided to be separated by a predetermined gap u5. An attachment angle and the like of the laser diode 131 are adjusted such that the light beam LC changes to P polarized light.

In practice, the supervisory control unit 112 controls the light-source control unit 120 to thereby emit the light beam LC formed by infrared laser light having a wavelength of about 780 nm from the laser chip 131C of the laser diode 131 as diverging light and makes the light beam LC incident on a grating 132.

The grating 132 diffracts the light beam LC to thereby separate a light beam LCA formed by the zeroth-order light into a light beam LCB formed by + first-order light and a light beam LCC formed by − first-order light and makes the light beams LCB and LCC incident on a collimator lens 133.

The light beams LCB and LCC travel substantially parallel to the light beam LCA with optical axes thereof slightly separated from an optical axis of the light beam LCA. Like the light beam LCA, for example, the light beams LCB and LCC are caused to converge, diverge, or reflect. Therefore, the light beam LCA is mainly explained below. A part of explanation of the light beams LCB and LCC is omitted.

The collimator lens 133 converts the light beam LCA from diverging light into parallel light and makes the light beam LCA incident on the polarization prism 121.

The polarization prism 121 is adapted to transmit a light beam of P polarized light at a rate of about 90% with a reflecting and transmitting surface 121DC, transmittance of which varies according to a polarization direction, and reflect the remaining light beam and reflect a light beam of S polarized light at a rate of about 100%. A reflecting and transmitting surface 121B is adapted to act on light beams having a wavelength of about 660 nm and a wavelength of about 780 nm and transmit a light beam having a wavelength of about 405 nm without acting thereon.

In practice, the polarization prism 121 transmits the light beam LCA at a rate of about 90% with the reflecting and transmitting surface 121DC and makes the light beam LCA incident on a quarter-wave plate 134. The polarization prism 121 transmits the remaining about 10% of the light beam LCA and makes the light beam LCA incident on the front monitor photodetector 122 as a front monitor light beam LCM.

The front monitor photodetector 122 receives, like the front monitor light beam LBM, the front monitor light beam LCM, generates a front monitor light reception signal SFM corresponding to a light amount thereof, and supplies the front monitor light reception signal SFM to the light-source control unit 120. The light-source control unit 120 is adapted to perform, on the basis of the front monitor light reception signal SFM, feedback control such that a light amount of the light beam LC emitted from the laser diode 131 reaches a desired light amount.

Like the quarter-wave plate 15, the quarter-wave plate 134 is adapted to be capable of converting a light beam between linearly polarized light and circularly polarized light. For example, the quarter-wave plate 134 converts the light beam LCA formed by P polarized light into left circularly polarized light and makes the light beam LCA incident on the object lens 135.

The object lens 135 condenses the light beam LCA. The supervisory control unit 112 adjusts, via the focus control unit 113AF, a position of the object lens 135 with respect to the focus direction with the focus actuator 9F. Therefore, the object lens 135 irradiates the light beam LCA to generally set a focus FCA of the light beam LCA on the target recording layer YT of the optical disk 100C.

The light beam LCA is reflected on the target recording layer YT to thereby change to a reflected light beam LCAR and is made incident on the object lens 135. Since a rotating direction in circularly polarized light is reversed during reflection, the reflected light beam LCAR changes to right circularly polarized light.

The light beams LCB and LCC are condensed by the object lens 135 and focuses FCB and FCC thereof are formed in positions each shifting from the focus FCA in the tracking direction by a half track.

Specifically, the light beam LCA is irradiated as a so-called main beam such that the focus FCA thereof is set on a desired track. The light beams LCB and LCC are irradiated as so-called side beams such that focuses FCB and FCC thereof are set on places each separated from the desired track by a half track.

The light beams LCB and LCC are reflected on the target recording layer YT and change to reflected light beams LCBR and LCCR, respectively. The reflected light beams LCBR and LCCR travel substantially parallel to the reflected light beam LCAR with optical axes thereof slightly separated from an optical axis of the reflected light beam LCAR. Like the explanation of the light beams LCB and LCC, a part of explanation of the reflected light beams LCBR and LCCR is omitted.

Thereafter, like the reflected light beam LBR, the reflected light beam LCAR is converted from diverging light into parallel light by the object lens 135, converted from right circularly polarized light into S polarized light (linearly polarized light) by the quarter-wave plate 134, and made incident on the polarization prism 121.

The polarization prism 121 reflects the reflected light beam LCAR formed by the S polarized light on the reflecting and transmitting surface 121DC, transmits the reflected light beam LCAR, and makes the reflected light beam LCAR incident on the hologram element 123.

The hologram element 123 separates the reflected light beam LCAR having a wavelength of about 780 nm into at least zeroth-order light and first-order light and makes the reflected light beam LCAR incident on the anamorphic lens 124.

Components other than the zeroth-order light of the reflected light beam LCAR diffracted by the hologram element 123 are finally not irradiated on the light receiving units D1, D21, and D22 related to signal detection of the CD type. Therefore, explanation of the components is omitted below. Explanation of components other than the zeroth-order light of the reflected light beams LCBR and LCCR diffracted by the hologram element 123 is also omitted.

The anamorphic lens 124 condenses the reflected light beam LCAR as a main reflected light beam, imparts astigmatism to the reflected light beam LCAR, and irradiates the reflected light beam LCAR on the photodetector 125. The reflected light beams LCBR and LCCR are also condensed as sub-reflected light beams.

The photodetector 125 receives the reflected light beam LCAR with the light receiving regions D1A to D1D of the light receiving unit D1, generates the light reception signals S1A to S1D according to a result of the light reception, and supplies the light reception signals S1A to S1D to the head amplifier 126.

The photodetector 125 receives the reflected light beam LCBR with the light receiving unit D21, generates the light reception signals S21A and S21B according to a result of the light reception, and sends the light reception signals S21A and S21B to the head amplifier 126.

Similarly, the photodetector 125 receives the reflected light beam LCCR with the light receiving unit D22, generates the light reception signals S22A and S22B according to a result of the light reception, and sends the light reception signals S22A and S22B to the head amplifier 126.

Like the head amplifier 22, the head amplifier 126 amplifies the light reception signals and supplies the light reception signals to the signal processing unit 114.

A tracking error signal calculating circuit 114T of the signal processing unit 114 performs an arithmetic operation indicated by the following Formula 9 using a predetermined coefficient "δ" to thereby calculate a tracking error signal STE2 conforming to the DPP (Differential Push Pull) method.

$$STE2 = (S1A + S1B) - (S1C + S1D) - \delta\{(S21A - S21B) + (S22A - S22B)\} \quad \text{Formula 9:}$$

The signal processing unit 114 supplies the tracking error signal STE2 to a tracking control unit 113AT of the servo control unit 113A.

The tracking control unit 113AT of the servo control unit 113A generates a tracking driving signal STD2 on the basis of the tracking error signal STE2 and supplies the tracking driving signal STD2 to the tracking actuator 9T. The tracking actuator 9T drives the object lens 135 in the tracking direction on the basis of the tracking driving signal STD2. In this way, the servo control unit 113A performs the tracking control by the DPP method.

Like the servo control unit 3A of the optical disk device 1, the servo control unit 113A is adapted to calculate the focus error signal SFE1 according to the astigmatism method and perform the focus control based on the focus error signal SFE1.

As in the first embodiment, a reproduction signal calculating circuit 114R of the signal processing unit 114 is adapted to add up the light reception signals S1A to S1D according to Formula 4 to thereby calculate the reproduction RF signal SRF.

In this way, the optical pickup 117 of the optical disk device 110 is adapted to be capable of receiving, with the light receiving unit D1 of the photodetector 125, both the reflected light beam LBR0 reflected by the optical disk 100B of the BD type and the reflected light beam LCAR reflected by the optical disk 100C of the CD type.

6-2-3. Irradiation of a Light Beam on the Optical Disk 100D of the DVD Type and Light Reception When the optical disk 100 is the optical disk 100D of the DVD type, the supervisory control unit 112 of the optical disk device 110 is adapted to cause the optical pickup 117 to irradiate a light beam having a wavelength suitable for the optical disk 100D.

In practice, the supervisory control unit 112 controls the light-source control unit 120 to thereby cause the laser chip 131D of the laser diode 131 to emit the light beam LC formed by red laser light having a wavelength of about 660 nm as diverging light and makes the light beam LC incident on the grating 132.

Since a light emitting point of the light beam LD is separated from the light beam LC by a distance u5, the light beam LD travels along an optical axis slightly separated from an optical axis of the light beam LC.

The grating 132 diffracts the light beam LD to thereby separate the light beam LD into a light beam LDA formed by zeroth-order light, a light beam LDB formed by + first-order light, and a light beam LDC formed by − first-order light and makes the light beams incident on the collimator lens 133.

Like the light beams LCB and LCC, the light beams LDB and LDC travel substantially parallel to a light beam LDA with an optical axis thereof slightly separated from an optical axis of the light beam LDA and are caused to, for example, converge, diverge, and reflect like the light beam LDA. Therefore, the light beam LDA is mainly explained below and a part of explanation of the light beams LDB and LDC is omitted.

Like the light beams LCA, LCB, and LCC, the light beams LDA, LDB, and LDC are made incident on the object lens 135 via the polarization prism 121 and the quarter-wave plate 134 and condensed to be focused on the target recording layer YT of the optical disk 100D.

Like the light beams LCA, LCB, and LCC, the light beams LDA, LDB, and LDC are reflected on the target recording layer YT and change to reflected light beams LDAR, LDBR, and LDCR.

The reflected light beams LDBR and LDCR travel substantially parallel to the reflected light beam LDAR with optical axes thereof slightly separated from an optical axis of the reflected light beam LDAR. Like the explanation of the reflected light beams LDBR and LDCR, a part of explanation of the light beams LCB and LCC is omitted.

Thereafter, like the reflected light beam LCAR, the reflected light beam LDAR is converted from diverging light into parallel light by the object lens 135, converted from right circularly polarized light into S polarized light (linearly polarized light) by the quarter-wave plate 134, and made incident on the polarization prism 121.

The polarization prism 121 reflects the reflected light beam LDAR formed by the S polarized light on the reflecting and transmitting surface 121DC, transmits the reflected light beam LDAR through the reflecting and transmitting surface 121B, and makes the reflected light beam LDAR incident on the hologram element 123.

The hologram element 123 separates the reflected light beam LDAR having a wavelength of about 660 nm into at least zeroth-order light and first-order light and makes the reflected light beam LDAR incident on the anamorphic lens 124.

Components other than the zeroth-order light of the reflected light beam LDAR diffracted by the hologram element 123 are not finally irradiated on the light receiving units D31 to D33 related to signal detection of the DVD type. Therefore, explanation of the components is omitted below. Explanation of the reflected light beams LDBR and LDCR diffracted by the hologram element 123 is also omitted.

The anamorphic lens 124 condenses the reflected light beam LDAR, imparts astigmatism thereto, and irradiates the reflected light beam LDAR on the photodetector 125. The reflected light beams LDBR and LDCR are also condensed.

The light receiving unit D1 of the photodetector 125 is set in an irradiation position of the reflected light beam LCA irradiated from the laser chip 131C of the laser diode 131. Therefore, the reflected light beam LDA irradiated from the laser chip 131D separated from the laser chip 131C by the predetermined distance u5 is irradiated on a place separated from the light receiving unit D1 by a predetermined distance u6, i.e., the light receiving unit D31. The distance u6 is a value set on the basis of the distance u5, optical design in the optical pickup 117, and the like.

The photodetector 125 receives the reflected light beam LDAR with light receiving regions D31A to D31D of the light receiving unit D31, generates light reception signals S31A to S31D according to a result of the light reception, and supplies the light reception signals S31A to S31D to the head amplifier 126.

The photodetector 125 receives the reflected light beam LDBR with light receiving regions D32A and D32B of the light receiving unit D32, generates light reception signals S32A and S32B according to a result of the light reception, and sends the light reception signals S32A and S32B to the head amplifier 126.

Similarly, the photodetector 125 receives the reflected light beam LDCR with light receiving regions D33A and D33B of the light receiving unit D33, generates light reception signals S33A and S33B according to a result of the light reception, and sends the light reception signals S33A and S33B to the head amplifier 126. The head amplifier 126 amplifies the light reception signals and supplies the light reception signals to the signal processing unit 114.

The tracking error signal calculating circuit 114T of the signal processing unit 114 performs an arithmetic operation indicated by the following Formula 10 corresponding to Formula 9 to thereby calculate the tracking error signal STE2 conforming to the DPP method and supplies the tracking error signal STE2 to the tracking control unit 113AT of the servo control unit 113A.

$$STE2=(S31A+S31B)-(S31C+S31D)-\delta\{(S32A-S32B)+ \\ (S33A-S33B)\} \qquad \text{Formula 10:}$$

The signal processing unit 114 supplies the tracking error signal STE2 to the tracking control unit 113AT of the servo control unit 113A.

The tracking control unit 113AT of the servo control unit 113A generates the tracking driving signal STD2 on the basis of the tracking error signal STE2 and supplies the tracking driving signal STD2 to the tracking actuator 9T. The tracking actuator 9T drives the object lens 135 in the tracking direction on the basis of the tracking driving signal STD2. In this way, the servo control unit 113A performs the tracking control by the DPP method.

The servo control unit 113A is adapted to calculate the focus error signal SFE1 according to the astigmatism method and perform the focus control based on the focus error signal SFE1.

The reproduction signal calculating circuit 114R of the signal processing unit 114 is adapted to add up the light reception signals S31A to S31D according to Formula 4 to thereby calculate the reproduction RF signal SRF.

In this way, the optical pickup 117 of the optical disk device 110 is adapted to be capable of receiving the reflected light beams LDAR, LDBR, and LDCR reflected by the optical disk 100D of the DVD type with the light receiving units D31, D32, and D33 of the photodetector 125.

6-3. Operation and Effect

In the configuration explained above, when the optical disk 100 is the optical disk 100B of the BD system, the optical pickup 117 of the optical disk device 110 generates, with the photodetector 125, light reception signals in the same manner as the photodetector 19 according to the first embodiment.

Consequently, as in the first embodiment, the optical disk device 110 can perform the focus control and the tracking control without being affected by the interlayer stray light beam LN.

On the other hand, when the optical disk 100 is the optical disk 100C of the CD type, the optical pickup 117 of the optical disk device 110 separates the light beam LC into zeroth-order light and + first-order light with the grating 132 and reflects the zeroth-order light and the + first-order light on the target recording layer YT of the optical disk 100C.

Further, the optical pickup 117 receives the reflected light beams LCAR, LCBR, and LCCR and generates light reception signals with the light receiving units D1, D21, and D22 of the photodetector 125.

The signal processing unit 114 calculates the tracking error signal STE2 using the light reception signals according to the DPP method and supplies the tracking error signal STE2 to the servo control unit 113A. The servo control unit 113A performs the tracking control on the basis of the tracking error signal STE2.

Therefore, in the photodetector 125 of the optical pickup 117, the light receiving units D21 and D22 are added to the photodetector 19 according to the first embodiment. Consequently, the optical disk device 110 can generate light reception signals corresponding to the DPP method.

Specifically, regardless of whether the optical disk 100 is the BD type or the CD type, the optical disk device 110 can generate the focus error signal SFE1 or the reproduction RF signal SRF using the light reception signals S1A to S1D generated by the light receiving unit D1 of the photodetector 125.

The photodetector 125 can receive both a reflected light beam LBRS0 and a reflected light beam LCRA with the light receiving regions D1A to D1D of the light receiving unit D1. Consequently, in the optical disk device 110, compared with the case in which the reflected light beam LBRS0 and the reflected light beam LCRA are received by independent light receiving regions, respectively, a reduction in size of the photodetector 125 can be realized and the number of amplifier circuits in the head amplifier 126 can be reduced.

In the optical disk device 110, the laser chips 131C and 131D are separated by the gap u5 in the laser diode 131. The centers of the light receiving units D1, D21, and D22 and the light receiving units D31, D32, and D33 are separated from each other by the gap u6 in the photodetector 125.

Consequently, the optical disk device 110 can receive reflected light beams of the BD type, the DVD type, and the CD type with one photodetector 125 and a reduction in component number and a reduction in size of an apparatus configuration can be realized.

In particular, in the laser diode 131, fluctuation in a gap between the laser chips 131D and 131C can be nearly eliminated according to a manufacturing process thereof. Consequently, the photodetector 125 can be designed with the gap u6 set to a substantially fixed value.

Since the hologram element 123 has the wavelength selectivity, the hologram element 123 can diffract the reflected light beam LBR having a wavelength of about 405 nm and transmit all the reflected light beams LDAR, LDBR, and LDCR having a wavelength of about 660 nm and the reflected light beams LCAR, LCBR, and LCCR having a wavelength of about 780 nm without diffracting the reflected light beams.

Specifically, since the hologram element 123 does not unnecessarily diffract the reflected light beams LDAR, LDBR, and LDCR and the reflected light beams LCAR, LCBR, and LCCR, the hologram element 123 does not have to irradiate unnecessary stray light on the photodetector 125.

Further, in the optical disk device 110, the hologram element 123 is not provided between the anamorphic lens 124 and the photodetector 125 and the hologram element 123 is provided in the front of the anamorphic lens 124.

In general, when the reflected light beam LBR is condensed by the anamorphic lens 124 or the like, the interlayer stray light beam LN and the like are also condensed. A focus of the interlayer stray light beam LN is formed in the front or the back of the reflected light beam LBR.

As a configuration of an optical pickup, when it is desired to reduce the size of the optical pickup taking into account focal length of a condensing lens and the like, as in the first embodiment, it is also conceivable to provide the hologram element 17 between the condensing lens 16 and the photodetector 19.

However, in the case of such a configuration, depending on a layer gap or the like in the optical disk 100, the interlayer stray light beam LN is likely to form a focus near the surface of an interposed optical component such as the hologram element 17 or near a boundary surface between different materials.

If a very small quantity of foreign matters adhere to the surface of the hologram element 17 or the surface is damaged or air bubbles are mixed in the hologram element 17, since the interlayer stray light beam LN is condensed small, most of the interlayer stray light beam LN is blocked. When lens shift occurs in this state, the interlayer stray light beam LN moves following the lens shift. A transmission or blocking state of the interlayer stray light beam LN substantially changes. As a result, it is likely that the brightness of the stray light patterns W substantially fluctuates and various light reception signals are affected.

On the other hand, in the optical disk device 110, the surface of the optical component, the boundary, or the like is not provided in a position where the focus of the interlayer stray beam LN is formed between the anamorphic lens 124 and the photodetector 125. Therefore, such a problem can be prevented.

In the case of the optical disk device 110, the hologram element 123 only has to exercise the diffracting action on the reflected light beam LBR or the like as parallel light. Therefore, compared with the case in which the diffracting action is exercised on the reflected light beam LBR formed by converging light, the hologram element 123 can ease design difficulty and manufacturing difficulty. Further, in the optical disk device 110, similarly, the other optical components such as the polarization prism 121 only have to exercise predetermined actions on a light beam formed by parallel light. Therefore, compared with the case in which the hologram element 123 is provided in converging light, design difficulty, manufacturing difficulty, and the like thereof can be eased.

Further, in the optical disk device 110, as in the third embodiment, spherical aberration caused by the light beam LB and the reflected light beam LBR is corrected by the spherical-aberration correcting unit 64. Therefore, it is possible to stabilize a light amount of the light beam LB emitted from the object lens 8 without causing fluctuation in the light amount.

According to the configuration explained above, as in the first embodiment, concerning the optical disk 100B of the BD type, the optical disk device 110 according to the sixth embodiment can perform the tracking control and the focus control without being affected by an interlayer stray light beam. In addition, concerning the optical disk 100D of the DVD type and the optical disk 100C of the CD type, the optical disk device 110 can perform the tracking control by the DPP method on the basis of a result of light reception by the light receiving units D1, D21, and D22 or the light receiving units D31, D32, and D33 of the photodetector 125.

7. Seventh Embodiment

7-1. Configuration of an Optical Disk Device

An optical disk device 190 according to the seventh embodiment is different from the optical disk device 1 according to the first embodiment in that a signal processing unit 194 and an optical pickup 191 are provided instead of the signal processing unit 4 and the optical pickup 7.

Like the signal processing unit 4, the signal processing unit 194 performs predetermined arithmetic processing to thereby generate a focus error signal and a tracking error signal and supplies the focus error signal and the tracking error signal to the driving control unit 3. However, the signal processing unit 194 is different from the signal processing unit 4 in a part of the arithmetic processing (explained in detail later).

7-2. Configuration of the Optical Pickup

Figure 32:
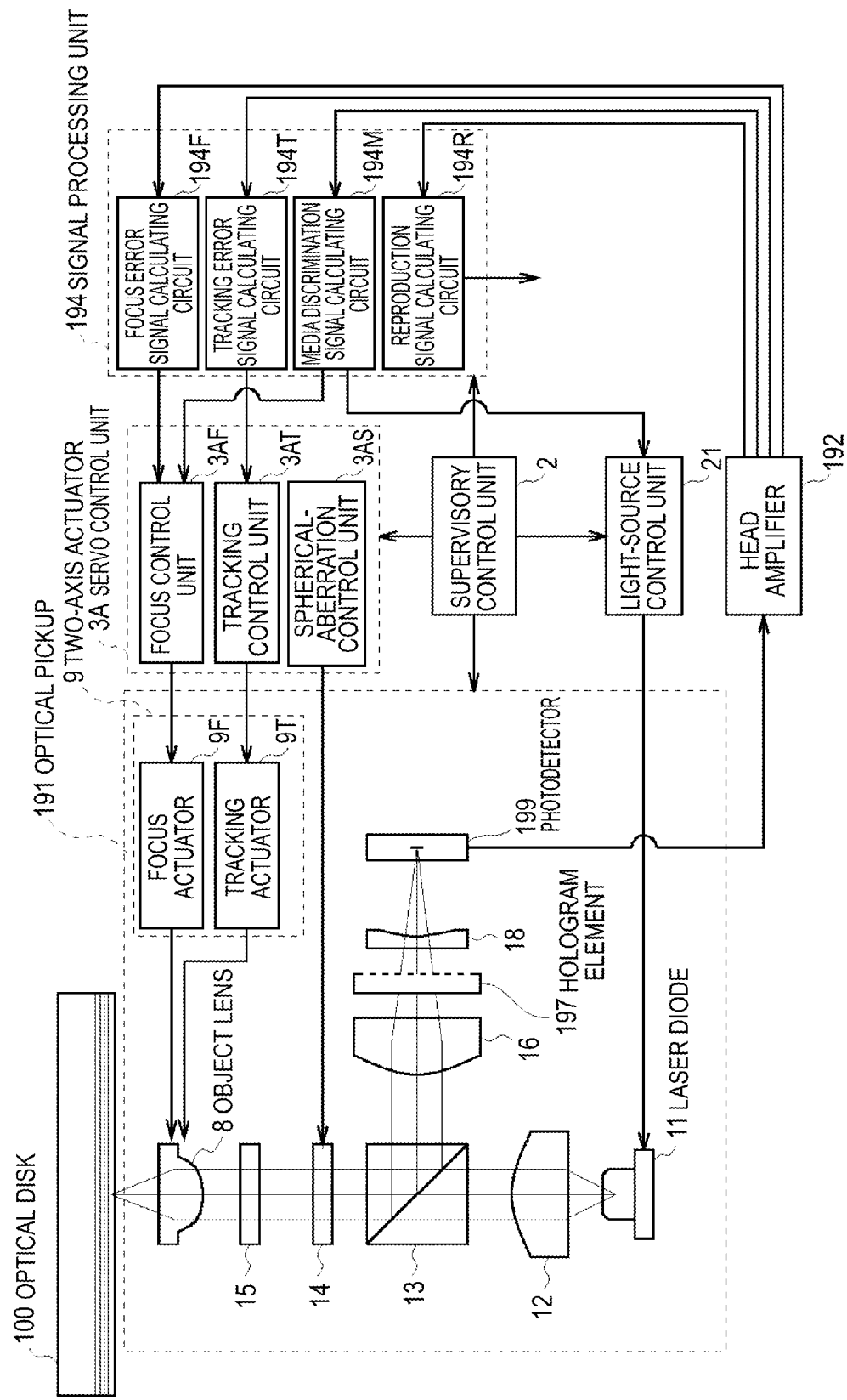
FIG. 32 is a schematic diagram of a configuration of an optical pickup according to a seventh embodiment of the present invention.

As shown in FIG. 32 in which components corresponding to those shown in FIG. 2 are denoted by the same reference numerals and signs, the optical pickup 191 is different from the optical pickup 7 in that a hologram element 197 and a photodetector 199 are provided instead of the hologram element 17 and the photodetector 19.

Further, the optical pickup 191 is different from the optical pickup 7 in that a head amplifier 192 is provided instead of the head amplifier 22.

Figure 33A:
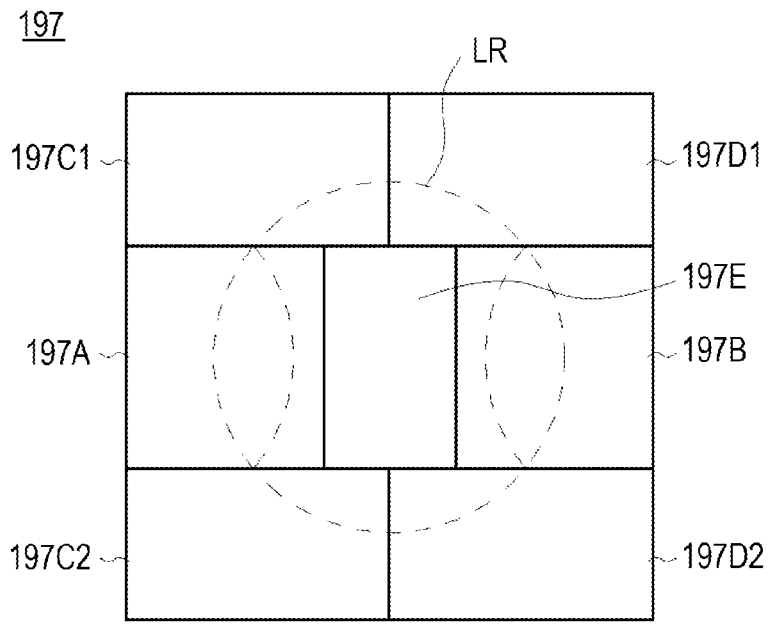
FIGS. 33A and 33B are schematic diagrams of a configuration of a hologram element according to the seventh embodiment.
Figure 33B:
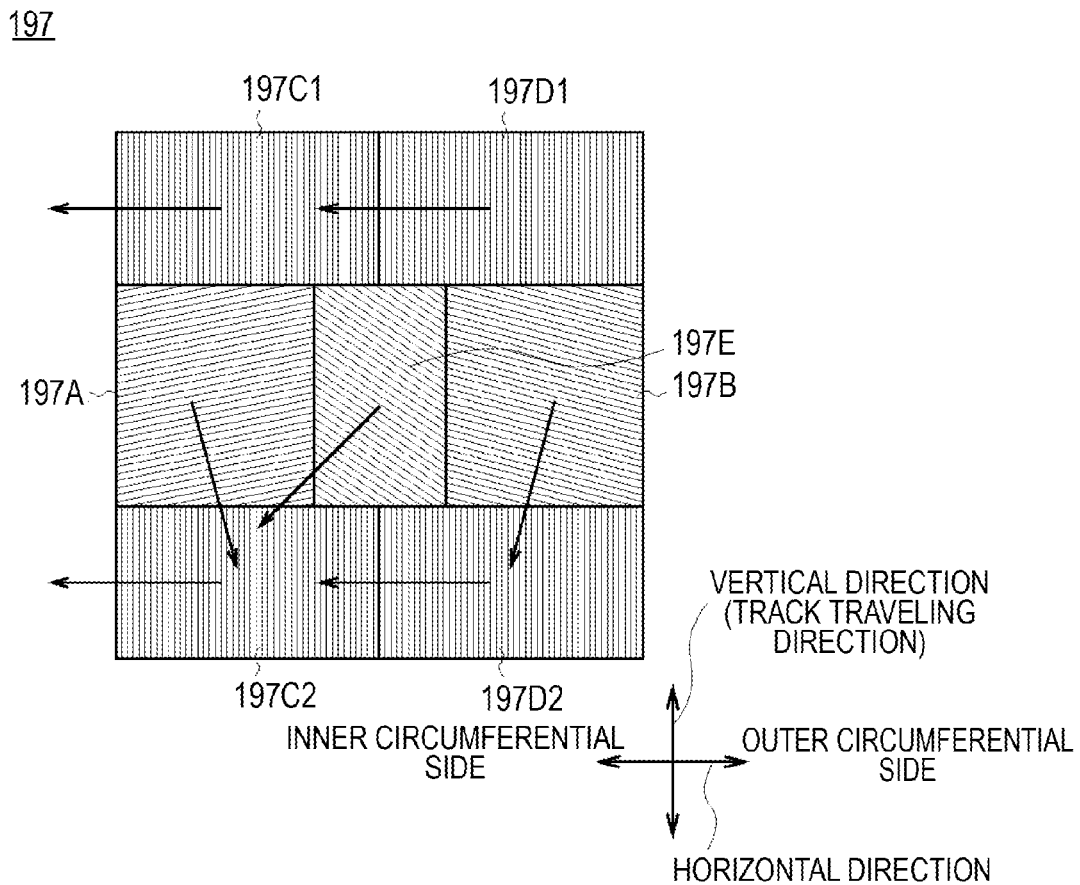

The hologram element 197 shown in FIGS. 33A and 33B is different from the hologram element 17 in the optical pickup 7 in a division pattern. However, a diffracting direction of a diffraction grating and the like of the hologram element 197 are set the same as those in the hologram element 17.

Specifically, whereas a boundary between the divided regions 17A and 17E in the hologram element 17 is formed in a curved shape, a boundary between divided regions 197A and 197E in the hologram element 197 corresponding to the divided regions 17A and 17E is formed in a linear shape.

Similarly, whereas a boundary between the divided regions 17B and 17E in the hologram element 17 is formed in a curved shape, a boundary between divided regions 197B and 197E in the hologram element 197 corresponding to the divided regions 17B and 17E is formed in a linear shape.

Like the hologram element 17, the hologram element 197 is adapted to diffract the reflected light beam LR1 in a direction set for each of the regions to thereby divide the reflected light bean LR1 into plural reflected light beams LR1A to LR1E.

Figure 34:
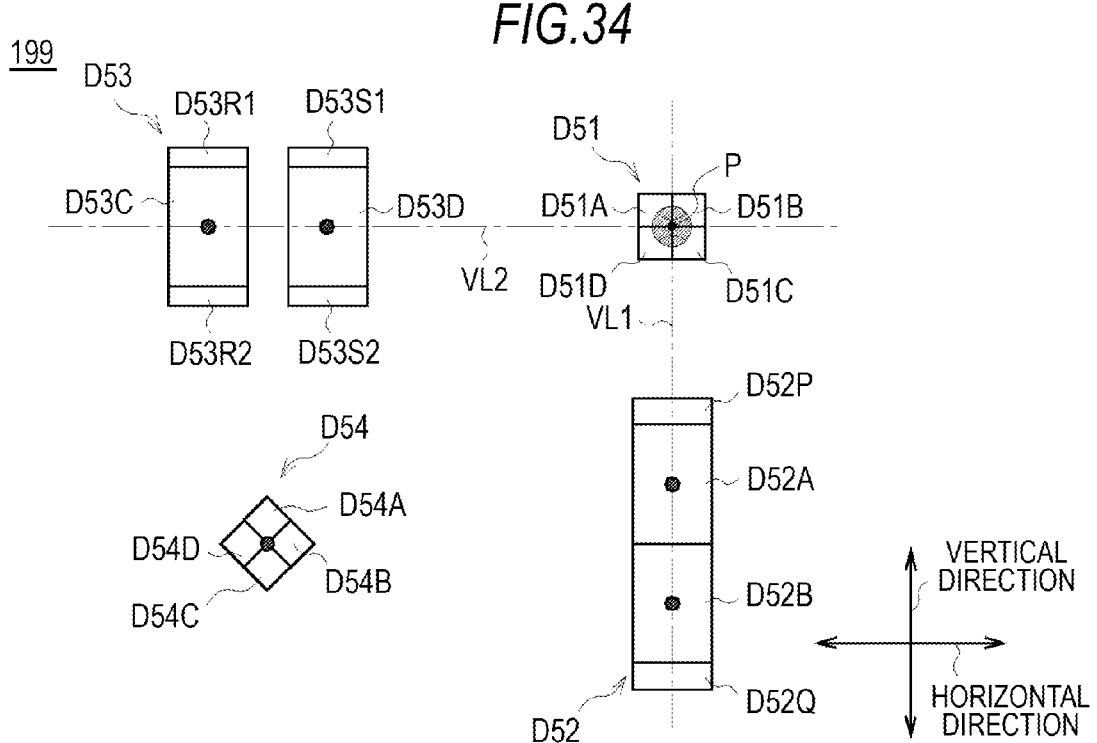
FIG. 34 is a schematic diagram of a configuration of a photodetector according to the seventh embodiment.

As shown in FIG. 34 corresponding to FIG. 5, in the photodetector 199, compared with the photodetector 19, light receiving units D52 to D54 are arranged in positions substantially the same as the light receiving units D2 to D4 with respect to the reference point P corresponding to the optical axis of the reflected light beam LR0 formed by the zeroth-order light.

A light receiving unit D51 corresponding to the light receiving unit D1 is adapted to receive the reflected light beam LR0 with light receiving regions D51A, D51B, D51C, and D51D divided into four in a lattice shape as in the light receiving unit D1. All the light receiving regions D51A to D51D are formed in a substantially regular square in substantially the same sizes. Unlike the light receiving unit D1, in the light receiving unit D51, the stray light receiving regions D1P to D1S are not provided.

The light receiving regions D51A, D51B, D51C, and D51D are adapted to generate light reception signals S51A, S51B, S51C, and S51D corresponding to light reception amounts thereof, respectively, and send the light reception signals to the head amplifier 192 (FIG. 32).

Unlike the light receiving unit D2, light receiving regions D52A and D52B of the light receiving unit D52 corresponding to the light receiving unit D2 are formed in a rectangular shape extending in the vertical direction in substantially the same sizes.

Consequently, the light receiving regions D52A and D52B are adapted to be capable of coping with movement amounts of reflected light beams different in the vertical direction and the horizontal direction caused by various factors such as wavelength fluctuation, a temperature characteristic, and defocus of a light beam.

The light receiving regions D52A and D52B are adapted to receive the reflected light beams LR1A and LR1B, respectively, generate light reception signals S52A and S52B corresponding to light reception amounts thereof, respectively, and send the light reception signals S52A and S52B to the head amplifier 192 (FIG. 32).

Further, in the light receiving unit D52, as in the light receiving unit D2, stray light receiving regions D52P and D52Q are provided to be adjacent to the light receiving regions D52A and D52B, respectively, along the vertical direction.

The stray light receiving regions D52P and D52Q are adapted to generate stray light reception signals S52P and S52Q corresponding to light reception amounts thereof, respectively, and send the stray light reception signals S52P and S52Q to the head amplifier 192 (FIG. 32).

Light receiving regions D53C and D53D of the light receiving unit D53 corresponding to the light receiving unit D3 are formed in a rectangular shape extending in the vertical direction in substantially the same sizes because of the same reason as in the light receiving unit D52.

The light receiving regions D53C and D53D are adapted to receive the reflected light beams LR1C and LR1D, respectively, generate light reception signals S53C and S53D corresponding to light reception amounts thereof, respectively, and send the light reception signals S53C and S53D to the head amplifier 192 (FIG. 32).

In the light receiving unit D53, unlike the light receiving unit D3, stray light receiving regions D53R1 and D53R2 (hereinafter also collectively referred to as stray light receiving region D53R) are provided adjacent to the light receiving region D53C to hold the light receiving region D53C from the vertical direction.

Similarly, in the light receiving unit D53, stray light receiving regions D53S1 and D53S2 (hereinafter also collectively referred to as stray light receiving region D53S) are provided adjacent to the light receiving region D53D to hold the light receiving region D53D from the vertical direction.

The stray light receiving regions D53R1 and D53R2 are adapted to generate stray light reception signals S53R1 and S53R2 corresponding to light reception amounts thereof, respectively, and send the stray light reception signals S53R1 and S53R2 to the head amplifier 192 (FIG. 32).

Similarly, the stray light receiving regions D53S1 and D53S2 are adapted to generate stray light reception signals S53S1 and S53S2 corresponding to light reception amounts thereof, respectively, and send the stray light reception signals S53S1 and S53S2 to the head amplifier 192 (FIG. 32).

Unlike the light receiving regions D3C and D3D, the light receiving regions D53C and D53D are provided a predetermined space apart from each other.

Consequently, the photodetector 199 can prevent, for example, reflected light that should be received in the light receiving region D53C from lying over the other light receiving region D53D even in a state in which movement of a reflected light beam caused by various factors such as wavelength fluctuation, a temperature characteristic, and defocus of a light beam occurs.

The light receiving unit D54 corresponding to the light receiving unit D4 is adapted to receive the reflected light beam LR1E with light receiving regions D54A, D54B, D54C, and D54D divided into four in a lattice shape as in the light receiving unit D4. All the light receiving regions D54A to D54D are formed in a substantially regular square in substantially the same sizes.

A dividing direction of the light receiving regions in the light receiving unit D54 is set at an angle of about 45 degrees with respect to the dividing direction in the light receiving unit D51.

The light receiving regions D54A, D54B, D54C, and D54D are adapted to generate light reception signals S54A, S54B, S54C, and S54D corresponding to light reception amounts thereof, respectively, and send the light reception signals to the head amplifier 192 (FIG. 32).

In this way, the photodetector 199 is adapted to receive the reflected light beams LR0 and LR1A to LR1E with the light receiving regions of the light receiving units D51 to D54 and supply light reception signals corresponding to light reception amounts to the head amplifier 192.

7-3. Irradiation of Stray Light and Arrangement of Light Receiving Regions

As shown in FIG. 7B, the light receiving regions of the photodetector 19 are arranged such that the stray light pattern W1 formed by the interlayer stray light beam LN reflected on the recording layer Y near the target recording layer YT does not lie over the light receiving regions D2 and D3.

However, the thickness of the recording layer Y may be smaller than the thickness of the recording layer Y of the optical disk 100 according to the first embodiment. In such a case, the interlayer stray light beam LN reflected on the recording layer Y located at a gap smaller than a layer gap between the target recording layer YT and the recording layer Y closest thereto in the first embodiment is irradiated on the photodetector 199. A gap between the target recording layer YT in the seventh embodiment and the recording layer Y that reflects the interlayer stray light beam LN is referred to as stray light layer gap dn.

Figure 35:
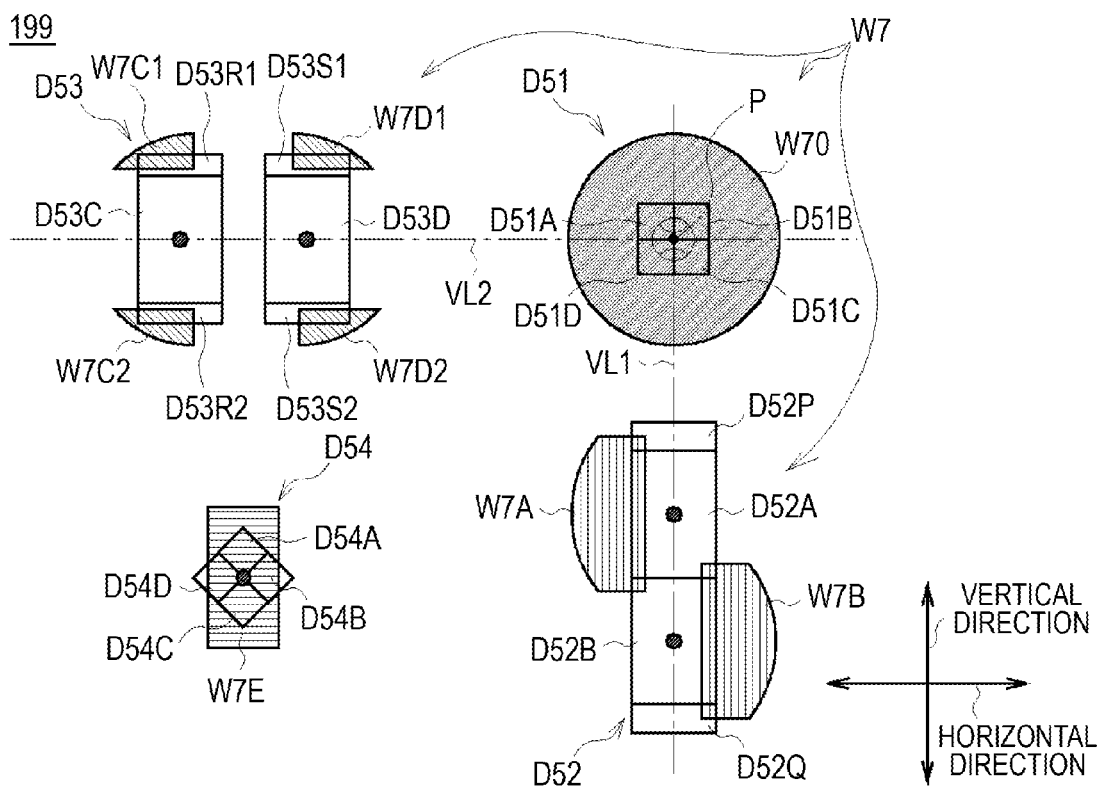
FIG. 35 is a schematic diagram of formation of a stray light pattern (1) according to the seventh embodiment.

When the stray light layer gap dn is smaller than the layer gap between the target recording layer YT and the recording layer YT closest thereto in the first embodiment, as in the photodetector 199 shown in FIG. 35, stray patterns W7 may lie over the light receiving unit D52. In the photodetector 199 shown in FIG. 35, lens shift does not occur.

In the photodetector 199 in which lens shift does not occur as shown in FIG. 35, stray light patterns W7A and W7B lie over the light receiving regions D52A and D52B, respectively, in substantially the same sizes.

The stray light patterns W7A and W7B also lie over the stray light reception regions D52P and D52Q in substantially the same sizes and receive the interlayer stray light beams LN of substantially the same amounts.

Stray light patterns W7C1, W7C2, W7D1, and W7D2 lie over the stray light receiving regions D53R1, D53R2, D53S1, and D53S2 in substantially the same sizes and receive the interlayer stray light beams LN of substantially the same amounts.

As explained above, the boundary between the divided regions 197A and 197E and the boundary between the divided regions 197B and 198E of the hologram element 197 (FIGS. 33A and 33B) are formed in a linear shape.

Therefore, unlike the hologram element 17, a boundary of the stray light pattern W7A lying over the light receiving region D52A and the stray light receiving region D52P is formed in a linear shape.

Therefore, it is possible to prevent a state in which the stray light pattern W7A lies over the light receiving region D52A but does not lie over the stray light receiving region D52P. Consequently, the optical pickup 191 can typically set a ratio of the stray light pattern W7A lying over the light receiving region D52A and the stray light pattern W7A lying over the stray light receiving region D52P substantially constant.

Figure 36:
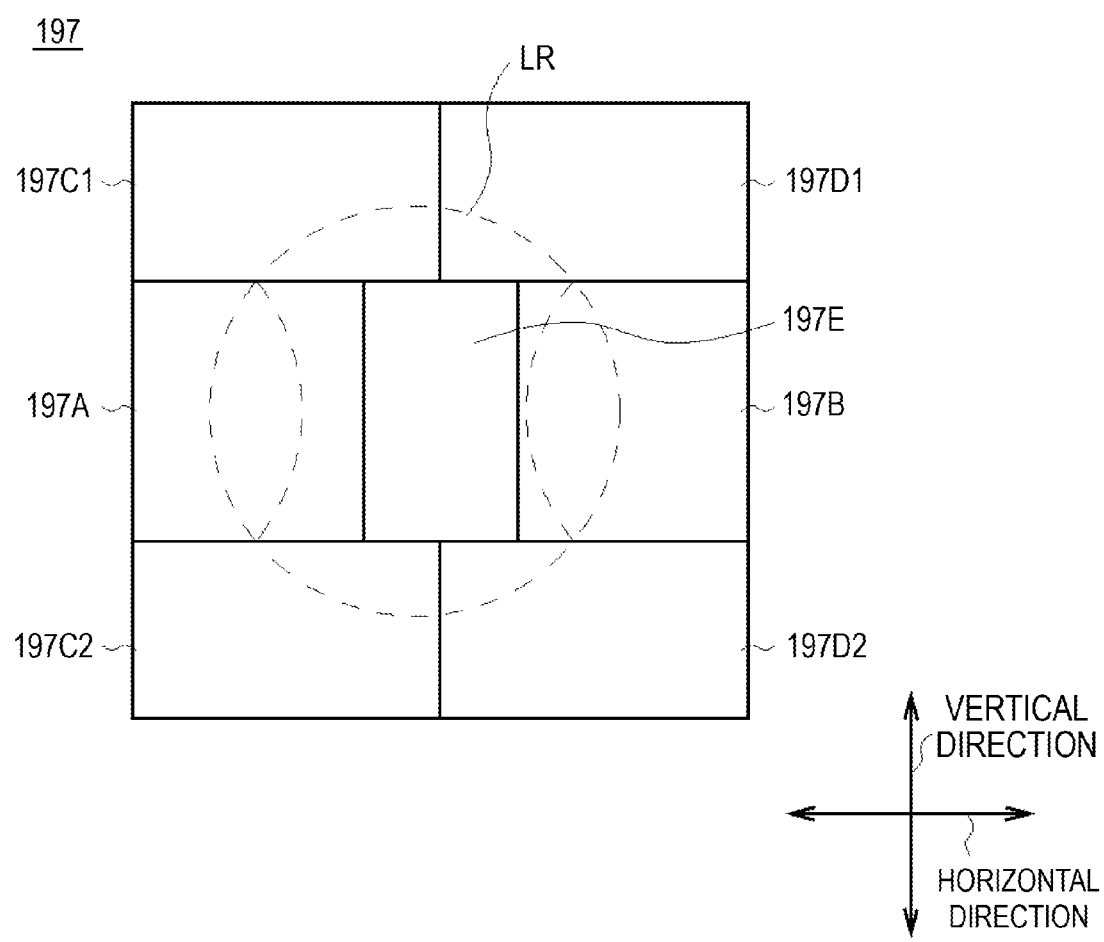
FIG. 36 is a schematic diagram of the movement of an irradiation position of a reflected light beam according to lens shift.

In the optical pickup 191, as shown in FIG. 36, when lens shift occurs, the reflected light beam LR made incident on the hologram element 197 shifts to, for example, an inner circumferential side of the disk 100 compared with the state in which lens shift does not occur (FIGS. 33A and 33B). According to the shift of the reflected light beam LR, the interlayer stray light beam LN made incident on the hologram element 197 also shifts to the inner circumferential side of the disk 100.

Figure 37A:
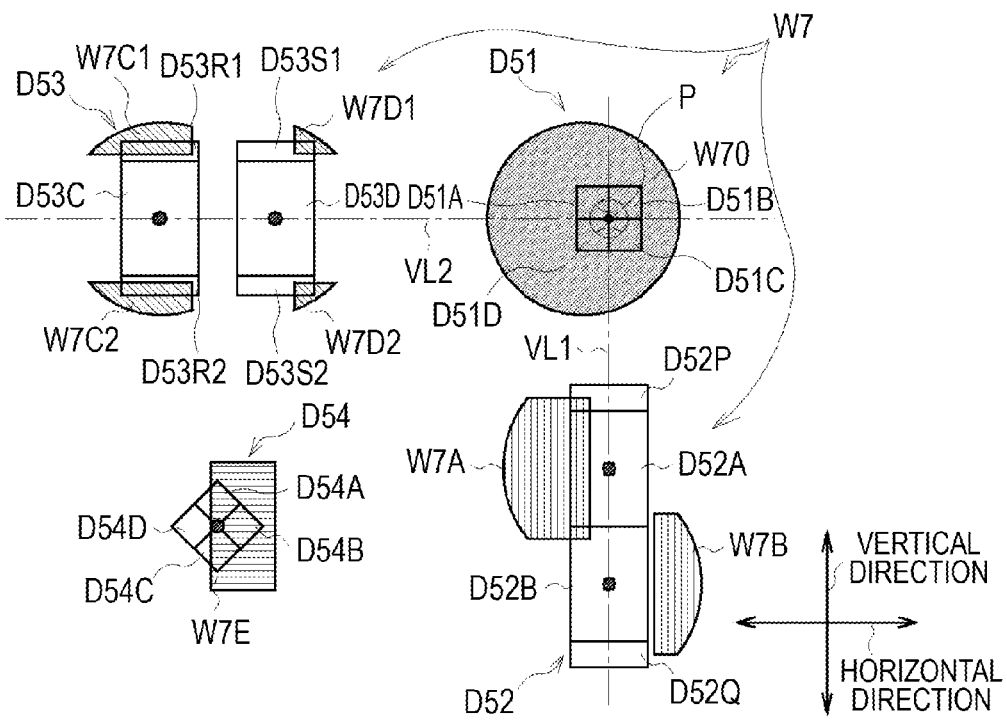
FIGS. 37A and 37B are schematic diagrams of formation of a stray light pattern at the time when lens shift occurs.

Therefore, as shown in FIG. 37A, the interlayer stray light beam LN diffracted by the regions in the hologram element 197 forms the stray light patterns W7 extended in the horizontal direction on the photodetector 199 compared with the state in which lens shift does not occur (FIG. 35).

In the photodetector 199 shown in FIG. 37A, the stray light pattern W7B does not lie over the light receiving region D52B and the stray light receiving region D52Q. On the other hand, the stray light pattern W7A lies over the light receiving region D52A and the stray light receiving region D52P. A stray light pattern W7C lies over the stray light receiving region D53R and a stray light pattern W7D lies over the stray light receiving region D53S.

A portion of the stray light pattern W7C lying over the stray light receiving region D53R is larger than a portion of the stray light pattern W7D lying over the stray light receiving region D53S.

Figure 37B:
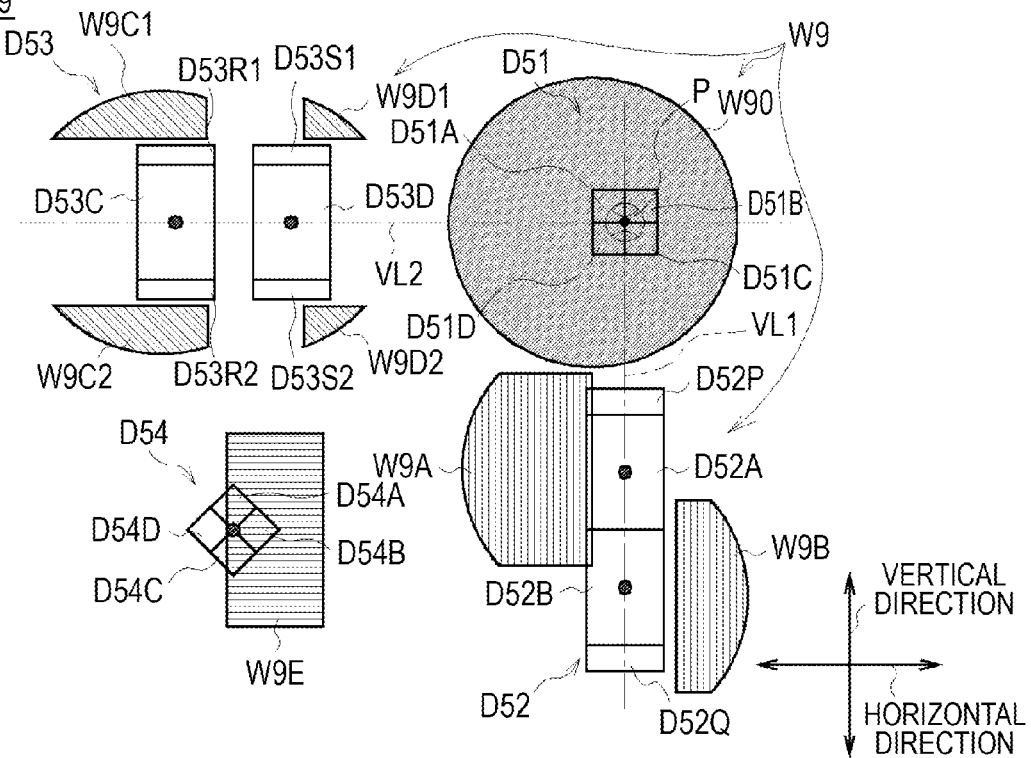

In FIG. 37B, the interlayer stray light beam LN formed when the stray light layer gap dn is large (the stray light layer gap dn is in a stray light layer gap range dh2 in FIG. 38A referred to later) in a state in which lens shift occurs is shown. As shown in FIG. 37B, the light beam LN forms stray light patterns W9 spreading relatively large on the photodetector 199 compared with the stray light patterns W7 shown in FIG. 37A.

In the photodetector 199 shown in FIG. 37B, as in the photodetector 199 shown in FIG. 37A, a stray light pattern W9B does not lie over the light receiving region D52B and the stray light receiving region D52Q.

On the other hand, as in the photodetector 199 shown in FIG. 37A, a stray light pattern W9A lies over the light receiving region D52A and the stray light receiving region D52P. However, a portion lying over the light receiving region D52A or the stray light receiving region D52P is smaller in the stray light pattern W9A than in the stray light pattern W7A.

Stray light patterns W7C and W7D do not lie over the stray light receiving region D53R and D53S.

In this way, when lens shift does not occur, the stray light pattern W7 lies over the light receiving regions D52A and D52B and the stray light receiving regions D53P and D53Q in substantially the same sizes and in a well-balanced state.

In the photodetector 199, the light receiving regions and the stray light receiving regions are arranged such that, when lens shift occurs, the stray light patterns W7 lie larger over the stray light receiving region D53R than the stray light receiving region D53S when the stray light layer gap dn is small (the stray light layer gap dn is in a stray light layer gap range dh1 in FIG. 38A explained later). Further, in the photodetector 199, the light receiving regions and the stray light receiving regions are arranged such that the stray light patterns W9 do not lie over the stray light receiving regions D53R and D53S when the stray light layer gap dn is large (the stray light layer gap dn is in a stray light layer gap range dh2 in FIG. 38A).

7-4. Focus Control and Tracking Control

The optical disk device 190 is adapted to be capable of performing, with the servo control unit 3A, focus control and tracking control same as those in the optical disk device 1 according to the first embodiment.

A focus error signal calculating circuit 194F of the signal processing unit 194 performs an arithmetic operation indicated by the following Formula 11 instead of Formula 1 to thereby calculate a focus error signal SFE2 and supplies the focus error signal SFE2 to the focus control unit 3AF of the servo control unit 3A.

$$SFE2=(S51A+S51C)-(S51B+S51D) \quad \text{Formula 11:}$$

In the photodetector 199 (FIG. 34) according to this embodiment, a stray light receiving region is not provided around the light receiving region D51. Therefore, in Formula 11, the term k{(S1P+S1R)−(S1Q+S1S)} in Formula 1 is omitted.

A tracking error signal calculating circuit 194T of the signal processing unit 194 performs an arithmetic operation indicated by the following Formula 12 corresponding to Formula 1 to thereby calculate a tracking error signal STE3 and supplies the tracking error signal STE3 to the tracking control unit 3AT of the servo control unit 3A.

$$STE3=(S52A-S52B)-p(S52P-S52Q)-s(S53R-S53S)-\alpha(S53C-S53D) \quad \text{Formula 12:}$$

In Formula 12, coefficients "p", "s", and "α" represent predetermined coefficients, respectively. S53R includes (S53R1+S53R2) and S53S includes (S53S1+S53S2).

The term (S52A−S52B) is equivalent to a value obtained by adding a stray light component (i.e., a component of interlayer stray light reflected on another recording layer different from a desired recording layer) and a lens shift component to a push-pull component. −p(S52P−S52Q)−s (S53R−S53S) is equivalent to a value of a stray light component.

Specifically, (S52A−S52B)−p(S52P−S52Q)−s(S53R−S53S) is equivalent to a value of a push-pull component obtained by subtracting the stray light component from the push-pull component added with the stray light component and the lens shift component and adding only the lens shift component to the push-pull component from which the stray light component is subtracted.

The term α(S53C−S53D) is equivalent to a value of the lens shift component. According to this term, only the lens shift component is subtracted from the push-pull component added with the lens shift component to calculate a push-pull component.

The first to third terms of Formula 12 are explained with reference to FIGS. 38A and 38B in comparison with the photodetector 199 shown in FIGS. 37A and 37B.

Concerning the term (S52A−S52B), as shown in FIGS. 37A and 37B, when lens shift occurs, a portion lying over the light receiving region D52A is larger in the stray light pattern W7A at the time when the stray light layer gap dn is small than in the stray light pattern W9A at the time when the stray light layer gap dn is large. "The stray light layer gap dn is small" indicates that the stray light layer gap dn is in the stray light layer gap range dh1 shown in FIGS. 38A and 38B. "The stray light layer gap dn is large" indicates that the stray light layer gap dn is in the stray light layer gap range dh2 shown in FIGS. 38A and 38B.

Figure 38A:
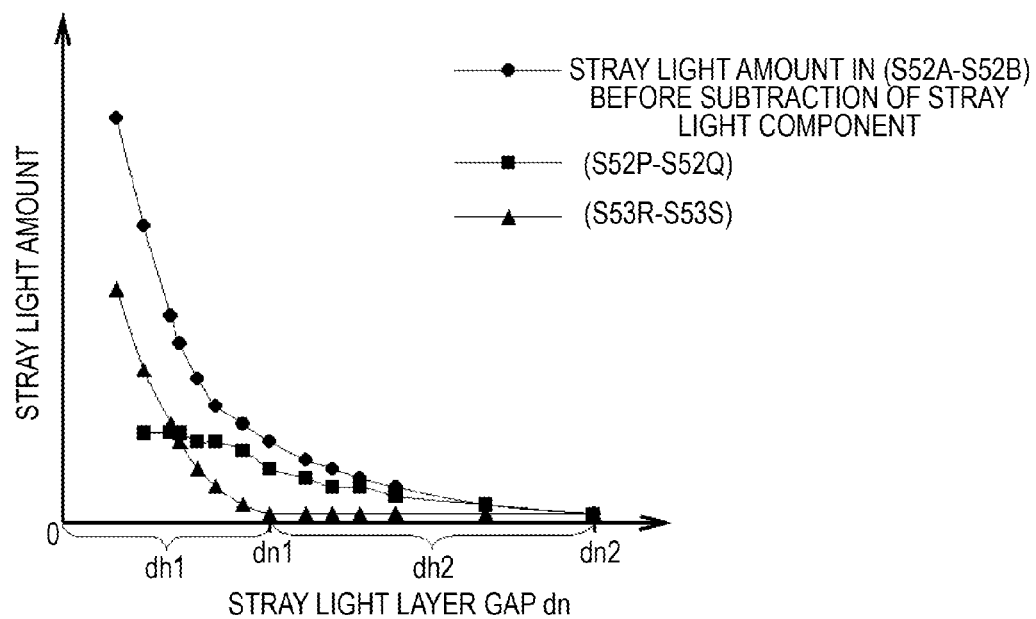
FIGS. 38A and 38B are graphs of a relation between a stray light layer gap and a stray light amount at the time when lens shift occurs.

Therefore, as indicated by a relation between the stray light layer gap dn and a stray light amount in (S52A−S52B) at the time when lens shift occurs shown in FIG. 38A, the stray light amount increases as the stray light layer gap dn decreases, i.e., the stray light layer gap dn decreases closer to 0 from a stray light layer gap dn2 in the stray light layer gap ranges dh1 and dh2. The stray light amount in (S52A−S52B) has a characteristic that the stray light amount suddenly increases as the stray light layer gap dn decreases closer to 0 from a stray light layer gap dn1 in the stray light layer gap range dh1.

Concerning the term p(S52P−S52Q), as shown in FIGS. 37A and 37B, when lens shift occurs, a portion lying over the stray light receiving region D52P is larger in the stray light pattern W7A at the time when the stray light layer gap dn is in the stray light layer gap range dh1 (FIGS. 38A and 38B) than in the stray light pattern W9A at the time when the stray light layer gap dn is in the stray light layer gap range dh2.

Therefore, as shown in FIG. 38A, a value of (S52P−S52Q) increases as the stray light layer gap dn decreases closer to 0 from the stray light layer gap dn2 in the stray light layer gap ranges dh1 and dh2. The value of (S52P−S52Q) has a substantially proportional relation with the stray light amount in (S52A−S52B) while the stray light layer gap dn is in the stray light layer gap range dh2.

However, as the stray light layer gap dn decreases closer to 0 from the stray light layer gap dn1 in the stray light layer gap range dh1, the value of (S52P−S52Q) deviates from the proportional relation with the stray light amount that suddenly increases in (S52A−S52B).

Figure 38B:
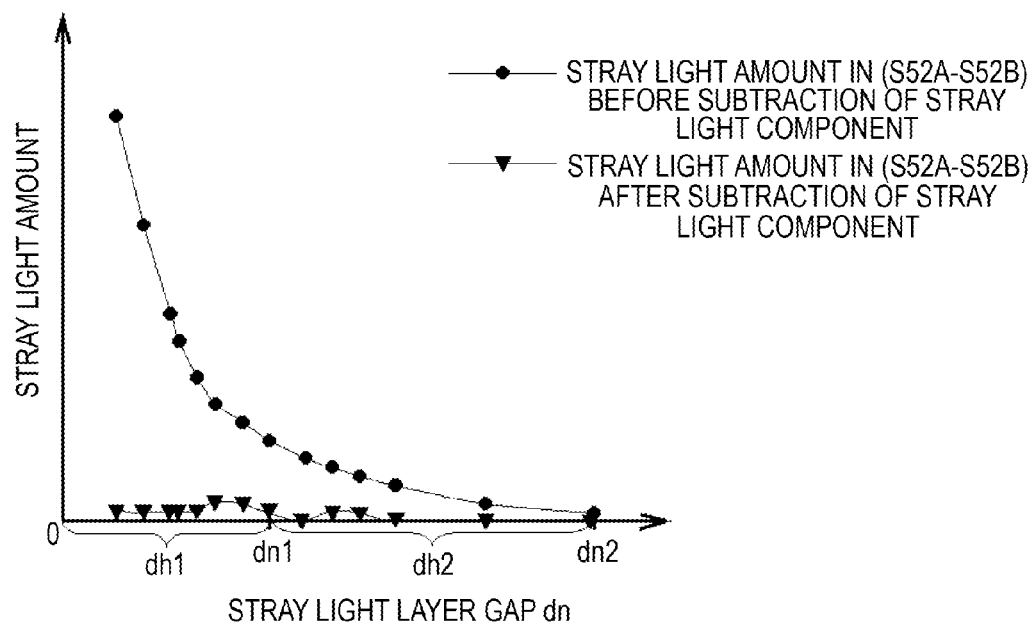

Concerning the term s(S53R−S53S), as shown in FIGS. 37A and 37B, when lens shift occurs, a portion lying over the stray light receiving region D53R in the stray light pattern W7C is larger than a portion lying over the stray light receiving region D53S in the stray light pattern W7D when the stray light layer gap dn is in the stray light layer gap range dh1 (FIGS. 38A and 38B).

Therefore, as shown in FIG. 38A, a value of (S53R−S53S) increases as the stray light layer gap dn decreases closer to 0 from the stray light layer gap dn2 in the stray light layer gap ranges dh1 and dh2. Like the stray light amount in (S52A−S52B), the value of (S53R−S53S) has a characteristic that the value suddenly increases as the stray light layer gap dn decreases closer to 0 from the stray light layer gap dn1. The value of (S53R−S53S) has a substantially proportional relation with the stray light amount that suddenly increases in (S52A−S52B) in the stray light layer gap range dh1.

When the stray light layer gap dn is in the stray light layer gap range dh2, stray light patterns W9C and W9D do not lie over the stray light receiving regions D53R and D53S (FIG. 37B), the value of (S53R−S53S) is 0 as shown in FIG. 38A.

As explained above, concerning (S52A−S52B)−p(S52P−S52Q)−s(S53R−S53S) of the entire Formula 12, the value of (S53R−S53S) is 0 when the stray light layer gap dn is in the stray light layer gap range dh2. The tracking error signal calculating circuit 194T subtracts, from a value of a push-pull component (S52A−S52B) added with the stray light component and the lens shift component, only a value of p(S52P−S52Q) having a substantially proportional relation with a stray light component included in the push-pull component to thereby calculate a push-pull component added with only the lens shift component.

On the other hand, when the stray light layer gap dn is in the stray light layer gap range dh1, the value of (S53R−S53S) is not 0. The tracking error signal calculating circuit 194T subtracts the value of p(S52P−S52Q) from the value of the push-pull component (S52A−S52B) added with the stray light component and the lens shift component. Further, the tracking error signal calculating circuit 194T subtracts a value of s(S53R−S53S) having a substantially proportional relation with the stray light component included in the push-pull component to thereby calculate a push-pull component added with only the lens shift component.

(S52A−S52B)−p(S52P−S52Q)−s(S53R−S53S) is a combination of an arithmetic expression for subtracting the stray light reception signals S52P and S53S from the light reception signal S52A and an arithmetic expression for subtracting the stray light reception signals S52Q and S53R from the light reception signal S52B.

Subsequently, the tracking error signal calculating circuit 194T subtracts only the lens shift component in a value of α(S53C−S53D) from the calculated push-pull component added with the lens shift component to calculate the tracking error signal STE3.

The tracking error signal calculating circuit 194T supplies the tracking error signal STE3 to the tracking control unit 3AT of the servo control unit 3A.

The servo control unit 3A generates the tracking driving signal STD1 with the tracking control unit 3AT on the basis of the tracking error signal STE3 and supplies the tracking driving signal STD1 to the tracking actuator 9T to thereby perform the tracking control.

7-5. Operation and Effect

In the configuration explained above, the optical pickup 191 of the optical disk device 190 irradiates the light beam L1 on the optical disk 100 and separates the reflected light beam LR reflected by the optical disk 100 with the hologram element 197.

The hologram element 197 causes the reflected light beam LR0 formed by the zeroth-order light to travel substantially straight and diffracts the reflected light beam LR1 formed by the first-order light in each of the divided regions 197A to 197E (FIG. 33A) to thereby divide the reflected light beam LR1 into the plural reflected light beams LR1A to LR1E.

The photodetector 199 receives the reflected light beam LR0 and generates the light reception signals S51A to S51D with the light receiving regions D51A to D51D of the light receiving unit D51. The photodetector 199 receives the reflected light beams LR1A and LR1B and generates the light reception signals S52A and S52B respectively with the light receiving regions D52A and D52B of the light receiving unit D52. Further, the photodetector 199 receives the reflected light beams LR1C and LR1D and generates the light reception signals S53C and S53D respectively with the light receiving regions D53C and D53D of the light receiving unit D53.

At the same time, the photodetector 199 generates the stray light reception signals S52P and S52Q corresponding to light reception amounts by the stray light receiving regions D52P and D52Q provided adjacent to each other in the light receiving unit D52. The photodetector 199 generates the stray light reception signals S53R1 and S53R2 corresponding to light reception amounts by the stray light receiving regions D53R1 and D53R2 provided adjacent to each other in the light receiving unit D53. Further, the photodetector 199 generates the stray light reception signals S53S1 and S53S2 corresponding to light reception amounts by the stray light reception regions D53S1 and D53S2 provided adjacent to each other in the light receiving unit D53.

The signal processing unit 194 calculates, on the basis of the reception signals amplified by the head amplifier 192, the focus error signal SFE2 with the focus error signal calculating circuit 194F according to Formula 11. The signal processing unit 194 calculates the tracking error signal STE3 with the tracking error signal calculating circuit 194T according to Formula 12 and supplies the focus error signal SFE2 and the tracking error signal STE3 to the servo control unit 3A.

The servo control unit 3A generates the tracking driving signal STD1 with the tracking control unit 3AT on the basis of the tracking error signal STE3 and supplies the tracking driving signal STD1 to the tracking actuator 9T to thereby perform the tracking control.

In the photodetector 199, when lens shift occurs and the stray light layer gap dn is in the stray light layer gap range dh1, the stray light receiving regions D53S and D53R are arranged such that the stray light patterns W7 lie over the stray light receiving region D53R more than over the stray light receiving region D53S as shown in FIG. 37A.

Consequently, as shown in FIG. 38A, the signal processing unit 194 can obtain a value of (S53R−S53S) that suddenly increases as the stray light layer gap dn decreases closer to 0 from the stray light layer gap dn1 in the stray light layer gap range dh1.

Further, in the photodetector 199, as shown in FIGS. 37A and 37B, the stray light receiving regions D52P and D52Q are arranged such that a stray light pattern lies larger over the stray light receiving region D52P when lens shift occurs and the stray light layer gap dn is in the stray light layer gap range dh1 than when the stray light layer gap dn is in the stray light layer gap range dh2.

Consequently, the signal processing unit 194 can obtain a value of (S52P−S52Q) having a substantially proportional relation with the stray light component in (S52A−S52B) when the stray light layer gap dn is in the stray light layer gap range dh2 as shown in FIG. 38A.

In the photodetector 199, the stray light receiving regions D53R and D53S are arranged such that the stray light patterns W7C and W7D do not lie over the stray light receiving regions D53R and D53S as shown in FIG. 37B when lens shift occurs and the stray light layer gap dn is in the stray light layer gap dh2.

Consequently, the signal processing unit 194 can obtain a value of (S53R−S53S) that decreases to 0 when the stray light layer gap dn is in the stray light layer gap range dh2 as shown in FIG. 38A.

The signal processing unit 194 subtracts the value of p(S52P−S52Q) from the value of (S52A−S52B) in Formula 12. When the stray light layer gap dn is in the stray light layer gap range dh2, the stray light component in (S52A−S52B) has a substantially proportional relation with the value of (S52P−S52Q).

Therefore, when the stray light layer gap dn is in the stray light layer gap range dh2, the signal processing unit 194 can remove the stray light component from the push-pull component (S52A−S52B) added with the stray light component and the lens shift component using the value of (S52P−S52Q).

On the other hand, the signal processing unit 194 subtracts the value of s(S53R−S53S) from the value of (S52A−S52B) in Formula 12. When the stray light layer gap dn is in the stray light layer gap range dh1, the stray light component that suddenly increases in (S52A−S52B) has a substantially proportional relation with the value of (S53R−S53S).

Therefore, when the stray light layer gap dn is in the stray light layer gap range dh1, the signal processing unit 194 can remove the stray light component from the push-pull component (S52A−S52B) added with the stray light component and the lens shift component using the value of (S53R−S53S).

Since the value of (S53R−S53S) is 0 when the stray light layer gap dn is in the stray light layer gap range dh2, regardless of what kind of value the coefficient "s" takes, the coefficient "s" does not affect a calculation result. Therefore, when the stray light layer gap dn is in the stray light layer gap range dh2, the signal processing unit 194 can remove the stray light component from (S52A−S52B) using only the value of (S52P−S52Q).

Consequently, the signal processing unit 194 can perform the arithmetic operation with the coefficients "s" and "p" set to fixed values without performing processing for, for example, reducing values of the coefficients "s" and "p" as the stray light layer gap dn is larger, i.e., the stray light layer gap dn increases closer to the stray light layer gap dn2 from the stray light layer gap dn1 in the stray light layer gap range dh2.

As explained above, in the photodetector 197, the light receiving regions and the stray light receiving regions are arranged such that the relation between the stray light layer gap dn and the stray light amount shown in FIG. 38A is obtained.

Consequently, as shown in FIG. 38B, the signal processing unit 194 can suppress the stray light component in (S52A−S52B) to nearly zero and remove the stray light component from the push-pull component even if lens shift occurs and even if the stray light layer gap dn decreases closer to 0 from the stray light layer gap dn2 in the stray light layer gap ranges dh1 and dh2.

According to the configuration explained above, the optical pickup 197 of the optical disk device 190 diffracts the reflected light beam LR with the hologram element 197, causes the reflected light beam LR0 formed by the zeroth-order light to travel substantially straight, detects the reflected light beam LR0 with the light receiving unit D51 of the photodetector 199, and generates the light reception signals S51A to S51D. The optical pickup 197 receives the reflected light beams LR1A to LR1D of the first-order light and generates the light reception signals S52A, S52B, S53C, and S53D respectively with the light receiving regions D52A, D52B, D53C, and D53D. Further, the optical pickup 197 receives stray light and generates the stray light reception signals S52P, S52Q, S53R, and S53S with the stray light receiving regions D52P, D52Q, D53R, and D53S. Subsequently, the optical pickup 197 calculates the tracking error signal STE3 according to Formula 12. When the stray light layer gap dn is in the stray light layer gap range dh1, the optical pickup 197 removes, using a value obtained from the stray light receiving regions D52P and D52Q having a substantially proportional relation with the stray light component that suddenly increases in the push-pull component, the stray light component from the push-pull component in Formula 12. Consequently, when the stray light layer gap dn is small and even if lens shift occurs, the optical disk device 190 can generate the tracking error signal STE3 in which the influence of the stray light patterns W formed by the interlayer stray light beams LN from the plural recording layers Y, respectively, and accurately perform the tracking control.

8. Other Embodiments

In the first embodiment explained above, the reflected light beams LR1A and LR1B are diffracted in the vertical direction, i.e., the direction substantially parallel to the traveling direction in an image of the track grooves formed in the optical disk 100.

However, the present invention is not limited to this. The reflected light beams LR1A and LR1B may be diffracted in other directions, respectively. In this case, it is desirable that the other directions are at least different from directions of the reflected light beams LR1C and LR1D. The light receiving unit D2 of the photodetector 19 only has to be provided to correspond to the other directions. The same holds true for the second to seventh embodiments.

In the first embodiment, the reflected light beams LR1C and LR1D are diffracted in the horizontal direction, i.e., the direction substantially orthogonal to the traveling direction in the image of the track grooves formed in the optical disk 100.

However, the present invention is not limited to this. The reflected light beams LR1C and LR1D may be diffracted in other directions, respectively. In this case, it is desirable that the other directions are at least different from the directions of the reflected light beams LR1A and LR1B. The light receiving unit D3 of the photodetector 19 only has to be provided to correspond to the other directions. The same holds true for the second to seventh embodiments.

In the first embodiment, in the light receiving unit D2 of the photodetector 19, the light receiving regions D2A and D2B are arranged side by side in the vertical direction.

However, the present invention is not limited to this. For example, when the light receiving regions D2A and D2B can be arranged to not enter formation ranges of the stray light patterns W1A and W1B (FIG. 7B), the light receiving regions D2A and D2B may be arranged side by side in the horizontal direction or other directions. The same holds true for the second to seventh embodiments. In this case, diffraction angles in the regions 17A and 17B in the hologram element 17 only have to be appropriately set.

In the first embodiment explained above, in the light receiving unit D3 of the photodetector 19, the light receiving regions D3C and D3D are arranged side by side in the horizontal direction.

However, the present invention is not limited to this. For example, when the light receiving regions D3C and D3D can be arranged to not enter formation ranges of the stray light patterns W1C1 and W1C2 (FIG. 7B) and not enter formation ranges of the stray light patterns W1D1 and W1D2, the light receiving regions D3C and D3D may be arranged side by side in the vertical direction or other directions. The same holds true for the second to seventh embodiments. In this case, diffraction angles in the regions 17C1 and 17C2 and the regions 17D1 and 17D2 in the hologram element 17 only have to be appropriately set.

In the first embodiment explained above, the reflected light beams LR1A and LR1B are diffracted in the downward direction in FIGS. 5 and 6 and the like and the light receiving unit D2 is provided on the lower side of the reference point P.

However, the present invention is not limited to this. For example, the reflected light beams LR1A and LR1B may be diffracted in the upward direction in FIGS. 5 and 6 and the like and the light receiving unit D2 may be provided on the upper side of the reference point P. Further, for example, the reflected light beams LR1A and LR1B may be diffracted in the upward direction and the downward direction, respectively, and the light receiving units D2A and D2B may be provided on the upper side and the lower side of the reference point P, respectively. The same holds true for the second to seventh embodiments.

In the first embodiment explained above, the reflected light beams LR1C1, LR1C2, LR1D1, and LR1D2 are diffracted in the left direction in FIGS. 5 and 6 and the like and the light receiving unit D3 is provided on the left side of the reference point P.

However, the present invention is not limited to this. For example, the reflected light beams LR1C1, LR1C2, LR1D1, and LR1D2 may be diffracted in the right direction in FIGS. 5 and 6 and the like and the light receiving unit D2 may be provided on the right side of the reference point P. Further, for example, the reflected light beams LR1C1 and LR1C2 and the reflected light beams LR1D1, and LR1D2 may be diffracted in the left direction and the right direction, respectively, and the light receiving units D3C and D3D may be provided on the left side and the right side of the reference point P, respectively. The same holds true for the second to seventh embodiments.

In the first embodiment explained above, the light receiving units D2 and D3 of the photodetector 19 is arranged on the outside of the irradiation range of the zeroth-order light beam at the time when the interlayer stray light beam LN by the recording layer Y most distant from the target recording layer YT is diffracted by the hologram element 17, i.e., on the outside of the formation range of the stray patterns W30 (FIG. 7A).

However, the present invention is not limited to this. For example, when the influence caused by the stray light patterns W30 can be neglected, the light receiving units D2 and D3 may be arranged in the formation range of the stray light patterns W30 in the photodetector 19. The same holds true for the second to seventh embodiments. In particular, in the third and fourth embodiments, the light receiving units D11 and D12 may be arranged in the same manner.

In the first embodiment explained above, the light receiving regions D4A, D4B, D4C, and D4D of the light receiving unit D4 in the photodetector 19 is formed in the shape obtained by rotating the light receiving regions D1A to D1D of the light receiving unit D1 by about 45 degrees.

However, the present invention is not limited to this. The light receiving unit D4 and the light receiving regions D4A to D4D may be formed in various shapes or may be divided into an arbitrary number of light receiving regions. In this case, in short, the light receiving unit D4 and the light receiving regions D4A to D4D only have to be capable of generating reception signals with which an attachment angle of the photodetector 19 can be calculated by various kinds of arithmetic processing. The same holds true for the second to seventh embodiments.

In the first embodiment explained above, the reflected light beam LR1E is detected by the light receiving unit D4 and the reflected light beam LR1E is used for adjustment of an attachment angle of the photodetector 19 on the basis of a result of the detection.

However, the present invention is not limited to this. For example, when the adjustment of an attachment angle is unnecessary because of design accuracy or when the adjustment of an attachment angle can be performed by other methods, the reception signals in the light receiving unit D4 may not be used or the light receiving unit D4 may be omitted.

In the first embodiment explained above, a so-called binary hologram is formed in the regions 17A to 17E.

However, the present invention is not limited to this. A so-called blazed hologram may be formed in the regions 17A to 17E. Consequently, it is possible to improve efficiency of use of first-order diffracted light. The same holds true for the second to seventh embodiments.

In the first embodiment explained above, the reflected light beams LR1A to LR1E are irradiated to be focused on the photodetector 19.

However, the present invention is not limited to this. The reflected light beams LR1A to LR1E do not have to be focused on the photodetector 19. In this case, the light receiving regions D2A, D2B, D3C, and D3D only have to be capable of entirely receiving the reflected light beams. The same holds true for the second to seventh embodiments.

In the first embodiment of the present invention, as shown in FIG. 5, the four stray light receiving regions D1P to D1S formed in a substantially regular square shape are provided in the places equivalent to the extended lines of the diagonals when the light receiving regions D1A to D1D are regarded as substantially regular squares in the light receiving unit D1.

However, the present invention is not limited to this. The stray light receiving regions D1P to D1S may be arranged in arbitrary places around the light receiving regions D1A to D1D or the may be formed in various shapes and sizes or an arbitrary number of stray light receiving regions may be provided. In this case, the coefficient "k" of Formula 1, the coefficient "j" of Formula 2, and the like only have to be appropriately set according to positions, shapes, areas, and the like of the stray light receiving regions.

When the influence caused by stray light can be neglected in the tracking error signal STE1, the stray light receiving regions D2P and D2Q in the light receiving unit D2 and the stray light receiving regions D3R and D3S in the light receiving unit D3 of the photodetector 19 may be omitted. In this case, the latter half of Formula 2 can be omitted.

When the influence caused by stray light can be neglected in the focus error signal SFE1, the stray light receiving regions D1P and D1S in the light receiving unit D1 of the photodetector 19 may be omitted. In this case, the latter half of Formula 1 can be omitted.

In the first embodiment explained above, it is discriminated on the basis of the light reception signals S1P to S1S generated by the stray light receiving regions D1P to D1S whether the optical disk 100 has only one recording layer Y.

However, the present invention is not limited to this. A stray light receiving region may be added in a place where presence or absence of the stray light patterns W changes according to a distance from the target recording layer YT to the recording layer Y when the interlayer stray light beam LN forming the stray light patterns W is reflected on the optical disk 100. In this case, for example, it is conceivable that the stray light receiving region is provided in a place over which the stray light patterns W30 (FIG. 7A) lie but the stray light patterns W10 (FIG. 7B) do not lie.

Consequently, the optical disk device 1 can discriminate, in the media discrimination signal calculating circuit 4M of the signal processing unit 4, the number of recording layers Y in the optical disk 100 on the basis of a light reception signal generated by the added stray light receiving region.

In the first embodiment explained above, the cylindrical lens 18 is arranged apart from the photodetector 19 and the optical characteristic opposite to astigmatism imparted by the cylindrical lens 18 is imparted in advance by the hologram element 17 during the diffraction of the reflected light beam LR.

Figure 39:
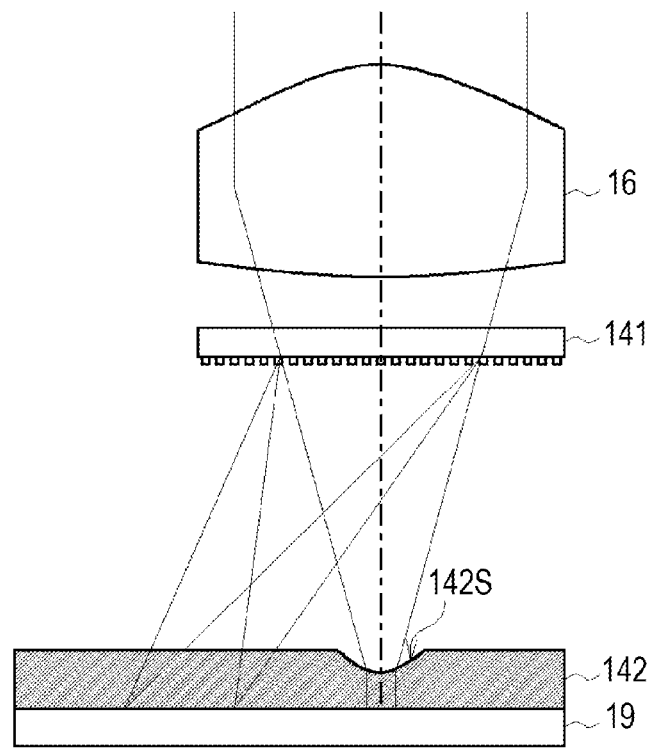
FIG. 39 is a schematic diagram of a configuration of a cylindrical lens (1) according to another embodiment.
Figure 40:
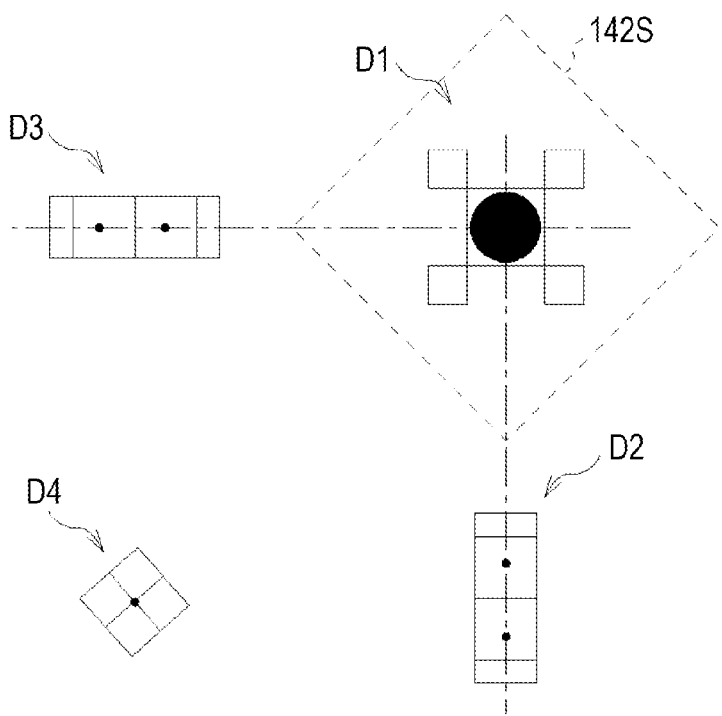
FIG. 40 is a schematic diagram of a configuration of the cylindrical lens (2) according to the other embodiment.

However, the present invention is not limited to this. For example, as shown in FIGS. 39 and 40, an optical element 142 replacing the cylindrical lens 18 may be provided near the photodetector 19. In the optical element 142, a lens surface 142S having an effect same as that of the cylindrical lens 18 is formed only in a portion where the reflected light beam LR0 formed by the zeroth-order light passes.

Consequently, the optical element 141 does not impart unnecessary astigmatism to the reflected light beam LR1A and the like formed by the first-order light. In this case, unlike the hologram element 17, the hologram element 141 does not need to impart the optical characteristic opposite to astigmatism in advance when the reflected light beam LR is diffracted. Therefore, design limitation thereof is eased. The same hold true for the second to fifth and seventh embodiments.

In the sixth embodiment explained above, the optical disk device 110 is applicable to the optical disk 100B of the BD type, the optical disk 100D of the DVD type, and the optical disk 100C of the CD type.

Figure 41:
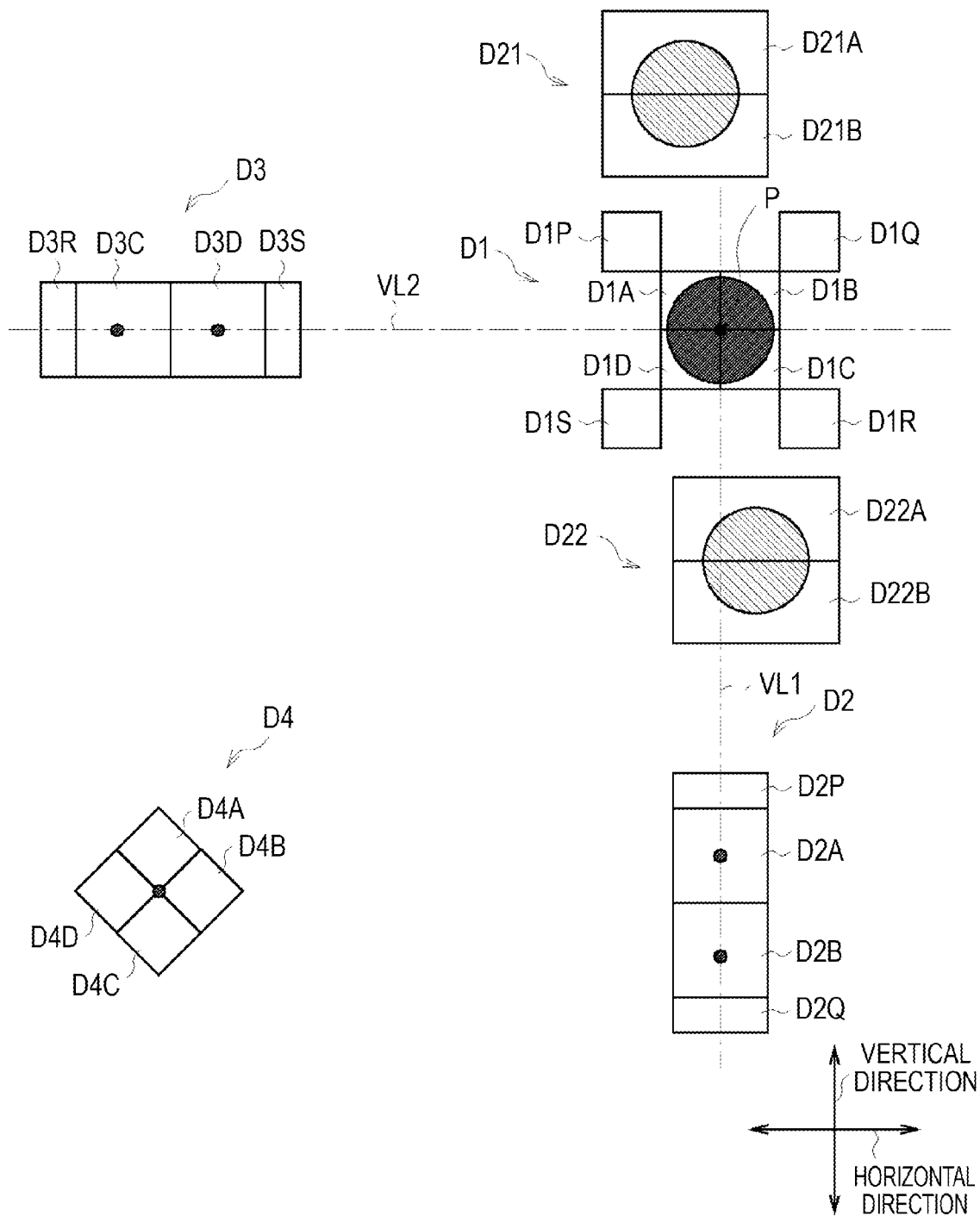
FIG. 41 a schematic diagram of a configuration of a photodetector according to another embodiment.

However, the present invention is not limited to this. For example, the optical disk device 100 may be applicable to only the optical disk 100D of the DVD system. In this case, the laser chip 131D can be omitted from the laser diode 131 of the optical pickup 117. Further, as shown in FIG. 41, the light receiving units D31, D32, and D33 can be omitted from the photodetector 125.

In the sixth embodiment explained above, the grating 132 and the collimator lenses 132 and 133 are individually provided.

Figure 42:
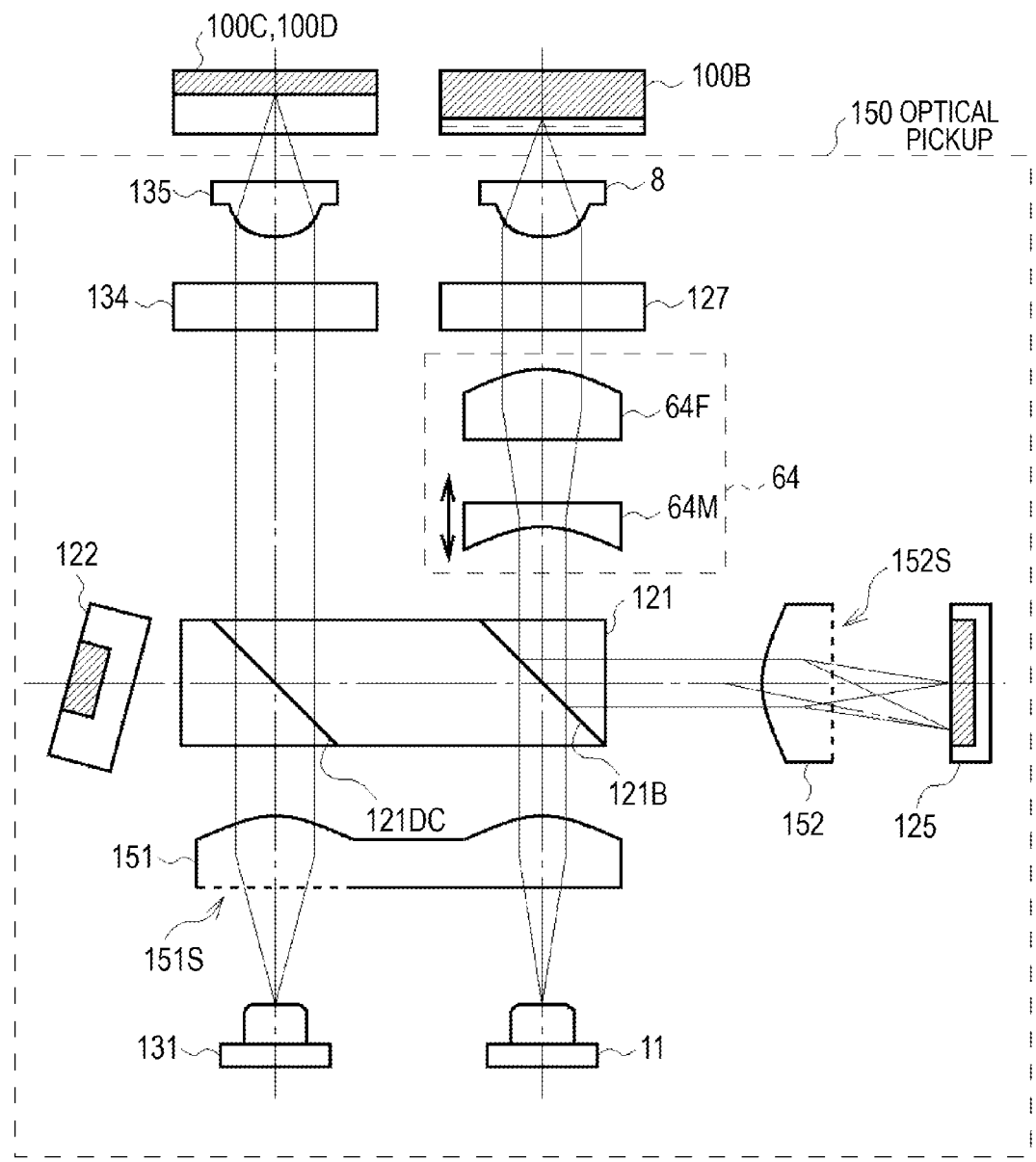
FIG. 42 is a schematic diagram of a configuration of an optical pickup according to another embodiment.

However, the present invention is not limited to this. For example, as shown in FIG. 42 partially corresponding to FIG. 28, in the optical pickup 150, an integrated collimator lens 151 in which the functions of the grating 132 and the collimator lenses 12 and 133 are integrated may be used.

In this case, the integrated collimator lens 151 can separate the light beams LD and LC with a diffraction grating 151S having a function same as that of the grating 132 in a portion where the light beams LD and LC passes.

Further, in the embodiment, the hologram element 123 and the anamorphic lens 124 (FIG. 28) are individually provided. However, as shown in FIG. 42, a hologram-integrated anamorphic lens 152 in which the functions of the hologram element 123 and the anamorphic lens 124 are integrated may be used.

In this case, reflected light beams can be diffracted in each of regions by forming a hologram 152S having a function same as that of the hologram element 123 on an emission surface of the reflected light beams.

Consequently, in the optical pickup 150, compared with the optical pickup 117, the number of components can be reduced and a reduction in manufacturing man-hour and adjustment man-hour can be realized.

In the first embodiment explained above, the hologram element 17 is provided between the condensing lens 16 and the photodetector 19.

However, the present invention is not limited to this. As in the sixth embodiment, the hologram element 17 may be provided between the polarization beam splitter 13 and the condensing lens 16 and between the polarization beam splitter 13 and the quarter-wave plate 15. In the latter case, it is conceivable to use the hologram element 17 as a polarization hologram element and cause the hologram element 17 to act on only the reflected light beam LR.

Alternatively, like the hologram-integrated anamorphic lens 152 of the optical pickup 150, a hologram having a function same as that of the hologram element 17 may be formed on the emission surface of the condensing lens 16.

In the sixth embodiment explained above, the anamorphic lens 124, the photodetector 125, and the like are set without particularly being sealed.

However, the present invention is not limited to this. At least a space from the photodetector 125 to the gap u7 calculated by Formula 8, for example, between the anamorphic lens 124 and the photodetector 125 may be sealed. Consequently, it is possible to prevent the interlayer stray light beam LN from being partially blocked by foreign matters or the like.

In the sixth embodiment explained above, the hologram element 123 diffracts the light beam LC having a wavelength of 780 nm. However, in the present invention, the reflected light beam LCAR to LCCR and LDAR to LDCR may be directly transmitted by imparting wavelength selectivity to the hologram element 123.

In the first embodiment explained above, as shown in FIGS. 4A and 4B, the boundary between the region 17A and the region 17E and the boundary between the region 17B and the region 17E in the hologram element 17 are formed in a curved shape.

Figure 43:
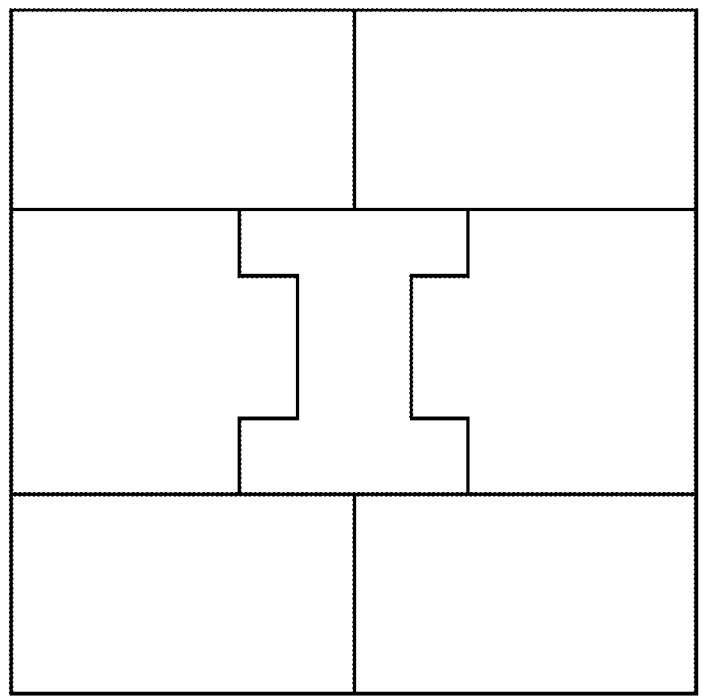
FIG. 43 is a schematic diagram of a configuration of a hologram element according to another embodiment.

However, the present invention is not limited to this. For example, as shown in FIG. 43 corresponding to FIGS. 4A and 4B, a hologram element in which the boundaries are formed in various shapes such as a hologram element 162 in which boundaries are formed in a polygonal line shape may be used. The same holds true for the second to seventh embodiments.

In the third to sixth embodiments explained above, the spherical-aberration correcting unit 64 is configured as a so-called Galileo-type beam expander by the convex fixed lens 64F and the concave movable lens 64M (FIGS. 12, 19, and 28).

Figure 44:
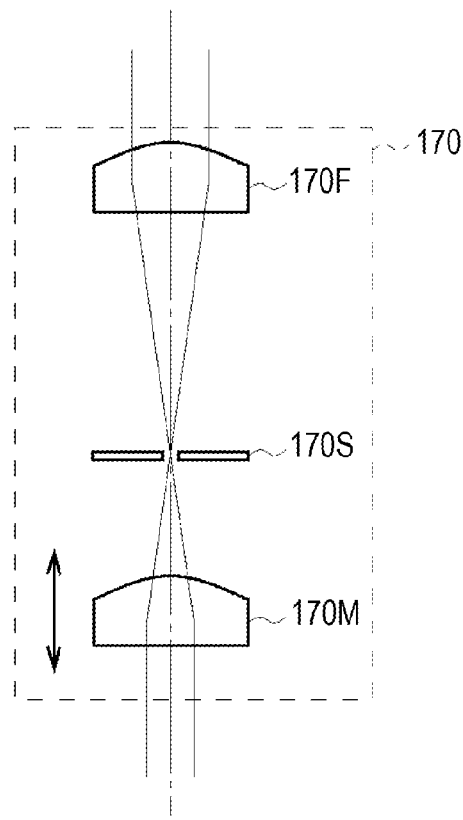
FIG. 44 is a schematic diagram of a configuration of a spherical-aberration correcting unit according to another embodiment.

However, the present invention is not limited to this. For example, as shown in FIG. 44, a spherical-aberration correcting unit 170 replacing the spherical-aberration correcting unit 64 may be configured as a so-called Kepler-type beam expander by a fixed lens 170F and a movable lens 170M formed by convex lenses.

In this case, by further providing a slit 170S near a focus of a light beam, it is possible to effectively block most of interlayer stray light beams and reduce the stray light patterns W formed on the photodetector 125.

Consequently, for example, it is possible to reduce the size of the photodetector 125 by reducing a gap from the light receiving unit D1 to the light receiving units D2, D3, and D4 on the photodetector 125. Concerning the hologram element 69, since a diffraction angle of the reflected light beam LBR can be reduced, a grating pitch can be set relatively large and design limitation can be eased.

In the first embodiment explained above, the reproduction RF signal SRF is calculated by amplifying the light reception signals S1A to S1D with the plural amplifier circuits in the head amplifier 22, respectively, and then adding up the light reception signals S1A to S1D according to Formula 4.

However, the present invention is not limited to this. For example, the reproduction RF signal SRF may be generated by adding up the light reception signals S1A to S1D according to Formula 4 and then amplifying the light reception signals S1A to S1D with the single amplifier circuit in the head amplifier 22. In this case, since the number of amplifier circuits in use can be reduce, it is possible to reduce amplifier noise that could be superimposed by the amplifier circuits.

Further, for example, concerning the addition and the like such as (S1A+S1C) and (S1B+S1D) in Formula 1, the light reception signals S1A to S1D may be amplified by the amplifier circuits after the addition. The same holds true for the second to seventh embodiments.

In the first embodiment explained above, the optical disk device 1 can apply both the information recording processing and the information reproduction processing to the optical disk 100.

However, the present invention is not limited to this. For example, the present invention may be applied to an optical disk device that can perform only the reproduction processing for the optical disk 100. The same holds true for the second to seventh embodiments. Further, in the sixth embodiment, only the reproduction processing may be applied to the optical disk 100D of the BD type and both the recording processing and the reproduction processing may be applied to the optical disk 100D of the DVD type and the optical disk 100C of the CD type.

In the seventh embodiment explained above, as shown in FIG. 34, the stray light receiving regions D52P and D52Q are provided to be adjacent to the light receiving regions D52A and D52B, respectively, along the vertical direction.

Figure 45:
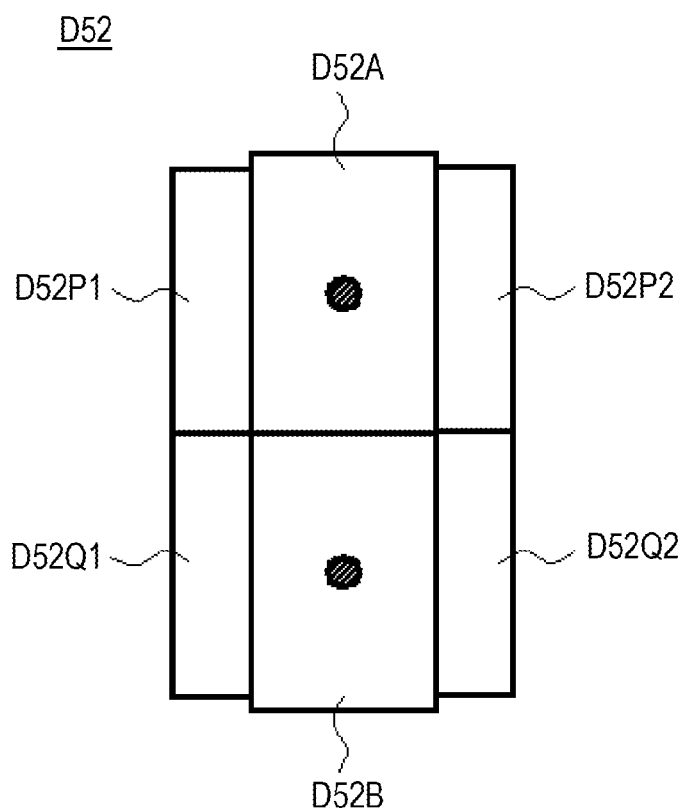
FIG. 45 is a schematic diagram of a configuration of a photodetector (1) according to another embodiment.

However, the present invention is not limited to this. For example, as shown in FIG. 45, stray light receiving regions D52P1 and D52P2 may be provided adjacent to the light receiving region D52A to hold the light receiving region D52A from the horizontal direction and stray light receiving regions D52Q1 and D52Q2 may provided adjacent to the light receiving region D52B to hold the light receiving region D52B from the horizontal direction. In this case, the coefficient "p" of Formula 12 only has to be appropriately set according to positions, shapes, areas, and the like of the stray light receiving regions.

In the seventh embodiment explained above, as shown in FIG. 34, the stray light receiving regions D53R1 and D53R2 are provided adjacent to the light receiving region D53C to hold the light receiving region D53C from the vertical direction and the stray light receiving regions D53S1 and D53S2 are provided adjacent to the light receiving region D53D to hold the light receiving region D53D from the vertical direction.

Figure 46A:
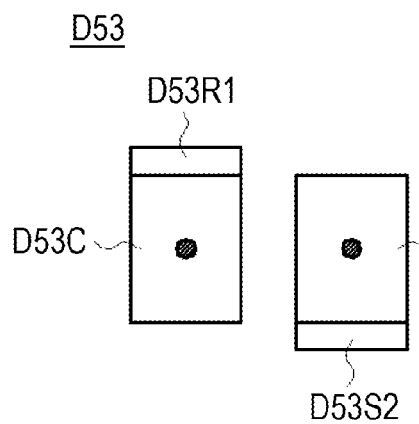
FIGS. 46A and 46B are schematic diagrams of a configuration of a photodetector (2) according to another embodiment.

However, the present invention is not limited to this. For example, as shown in FIG. 46A, one or both of the stray light receiving regions D53R1 and D53S2 may be omitted or one or both of the stray light receiving regions D53R2 and D53S1 may be omitted.

Figure 46B:
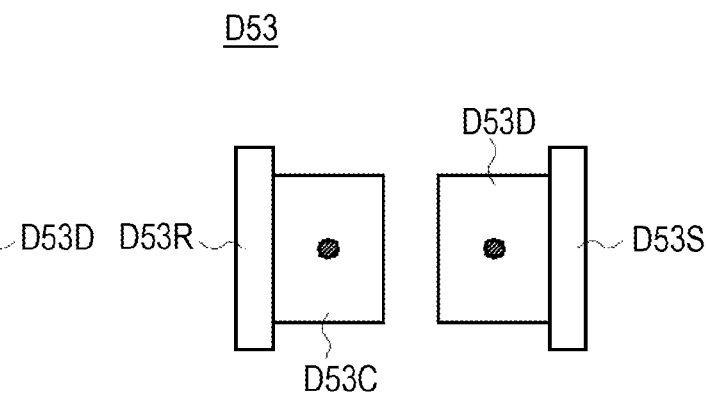

Further, for example, as shown in FIG. 46B, the stray light receiving region D53R may be provided adjacent to the light receiving region D53C along the horizontal direction and the stray light receiving region D53S may be provided adjacent to the light receiving region D53D along the horizontal direction. In this case, the coefficient "s" of Formula 12 only has to be appropriately set according to positions, shapes, regions, and the like of the stray light receiving regions.

In short, in the photodetector 197, the light receiving regions and the stray light receiving regions only have to be arranged such that the relation between the stray light layer gap dn and the stray light amount shown in FIG. 38A can be obtained.

In the seventh embodiment explained above, the tracking error signal calculating circuit 194T (FIG. 32) of the signal processing unit 194 calculates the tracking error signal STE3 by performing the arithmetic operation indicated by Formula 12.

However, the present invention is not limited to this. For example, the tracking error signal calculating circuit 194T may calculate the tracking error signal STE3 by performing an arithmetic operation indicated by the following Formula 13:

$$STE3=(S52A-S52B)-p(S52P-S52Q)-\alpha\{(S53C-S53D)-s(S53R-S53S)\} \quad \text{Formula 13:}$$

In Formula 13, in (S52A−S52B)−p(S52P−S52Q), a stray light component obtained by only the stray light receiving regions D52P and D52Q adjacent to the light receiving units D52A and D52B that detect the push-pull component (S52A−S52B) added with the stray light component is subtracted from the push-pull component.

In (S53C−S53D)−s(S53R−S53S), a stray light component obtained by only the stray light receiving regions D53R and D53S adjacent to the light receiving units D53C and D53D that detect the lens shift component (S53C−S53D) added with a stray light component is subtracted from the lens shift component.

Consequently, the stray light component included in the push-pull component is eliminated by using a value obtained by the stray light receiving regions adjacent to the light receiving units that detect the push-pull component. The stray light component included in the lens shift component is eliminated by using a value obtained by the stray light receiving regions adjacent to the light receiving units that detect the lens shift component.

In the seventh embodiment explained above, the coefficients "p" and "s" in Formula 12 are the predetermined fixed values, respectively.

However, the present invention is not limited to this. The coefficients "p" and "s" may be changed for each optical pickup 191 or each recording target layer YT.

Consequently, the optical pickup 191 can appropriately eliminate the stray light component from the push-pull component over the large stray light layer gap dn to the small stray light layer gap dn even if lens shift occurs.

In Formula 12, even when the stray light layer gap dn is in the stray light layer gap range dh2 shown in FIGS. 38A and 38B and a value of (S53R−S53S) is not 0, if the coefficient "s" is set to 0, a value of s(S53R−S53S) does not affect a calculation result. Therefore, when the stray light layer gap dn is large, the signal processing unit 194 can eliminate the stray light component from (S52A−S52B) using only a value of (S52P−S52Q).

In the seventh embodiment explained above, in the photodetector 199, the stray light receiving regions D52P and D52Q and the stray light receiving regions D53R and D53S are provided.

However, the present invention is not limited to this. In the photodetector 199, the stray light receiving regions D52P and D52Q may be omitted. Consequently, the optical pickup 191 can omit the term −p(S52P−S52Q) in Formula 12 and can eliminate the stray light component from the push-pull component with a simple arithmetic expression.

Alternatively, in the photodetector 199, the stray light receiving regions D53R and D53S may be omitted. Consequently, the optical pickup 191 can omit the term −s(S53R−S53S) in Formula 12 and can eliminate the stray light component from the push-pull component with a simple formula.

In the embodiments explained above, the optical pickup 7 includes the laser diode 11 as a light source, the object lens 8, the two-axis actuator 9 as a lens moving unit, the condensing lens 16, the hologram element 17, and the photodetector 19.

However, the present invention is not limited to this. Besides, an optical pickup may include a light source, an object lens, a lens moving unit, a condensing lens, a hologram element, and a photodetector that are formed by various circuit configurations.

In the embodiments explained above, the optical disk device 1 includes the laser diode 11 as a light source, the object lens 8, the two-axis actuator 9 as a lens moving unit, the condensing lens 16, the hologram element 17, the photodetector 19, the signal processing unit 4, and the servo control unit 3A.

However, the present invention is not limited to this. Besides, an optical disk device may include a light source, an object lens, a lens moving unit, a condensing lens, a hologram element, a photodetector, a signal processing unit, and a servo control unit that are formed by various circuit configurations.

The present invention can also be used in an optical disk device that records information such as videos, sound, and various data in an optical disk and reproduces the information from the optical disk.

The present application contains subject matter related to that disclosed in Japanese Priority Patent Application JP 2008-184061 and JP 2009-041055 filed in the Japan Patent Office on Jul. 15, 2008 and Feb. 24, 2009, respectively, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
   a light source that emits a light beam;
   an object lens that condenses the light beam on a target recording layer set as a target among a plurality of recording layers provided in an optical disk;
   a lens moving unit that moves the object lens in a tracking direction substantially orthogonal to track grooves spirally or concentrically formed in the target recording layer;
   a condensing lens that condenses a reflected light beam of the light beam reflected by the optical disk;
   a hologram element that, in diffracting the reflected light beam and separating the reflected light beam into a reflected zeroth-order light beam and a reflected first-order light beam, diffracts a first part of the reflected first-order light beam in a predetermined first direction with a first region, which corresponds to a portion including + first-order light diffracted by the track grooves in the reflected first-order light beam, and sets the first part of the reflected first-order light beam as a first beam, diffracts a second part of the reflected first-order light beam in the first direction with a second region, which corresponds to a portion including − first-order light diffracted by the track grooves in the reflected first-order light beam, and sets the second part of the reflected first-order light beam as a second beam, diffracts a third part of the reflected first-order light beam in a second direction different from the first direction with a third region, which corresponds to a portion not including the + first-order light and the − first-order light diffracted by the track grooves in the reflected first-order light beam and equivalent to an inner circumferential side of the optical disk, and sets the third part of the reflected first-order light beam as a third beam, and diffracts a fourth part of the reflected first-order light beam in the second direction with a fourth region, which corresponds to another portion not including the + first-order light and the − first-order light diffracted by the track grooves in the reflected first-order light beam and equivalent to an outer circumferential side of the optical disk, and sets the fourth part of the reflected first-order light beam as a fourth beam; and
   a photodetector that receives the first beam and the second beam and generates first light reception signals respectively with a first light receiving region and a second light receiving region provided on a first direction side in an irradiation position of the reflected zeroth-order light beam, receives the third beam and the fourth beam and generates second light reception signals respectively with a third light receiving region and a fourth light receiving region provided on a second direction side in the irradiation position of the reflected zeroth-order light beam, and receives interlayer stray light of a part of the light beam reflected by the other recording layers other than the target recording layer in the optical disk and generates a stray light reception signal with a stray light receiving region, wherein
   the optical pickup causes a predetermined signal processing unit to, based on the first and second light reception signals respectively generated by the first light receiving region, the second light receiving region, the third light receiving region, and the fourth light receiving region and the stray light reception signal generated by the stray light receiving region, generate a tracking error signal representing a shift amount between a focus of the light beam and a center line of the track grooves with respect to the tracking direction, and
   the optical pickup causes a predetermined servo control unit to move the object lens in the tracking direction via the lens moving unit based on the tracking error signal.

2. An optical pickup according to claim 1, wherein the stray light receiving region is provided near at least one or more of the first light receiving region, the second light receiving region, the third light receiving region, and the fourth light receiving region.

3. An optical pickup according to claim 2, wherein, in the photodetector, a first stray light receiving region provided near the first light receiving region is arranged to have a correlation with a stray light reception signal generated by the first stray light receiving region and with a first stray light component included in the first light reception signal, which is generated by the first light receiving region, and caused by the interlayer stray light, and a second stray light receiving region provided near the second light receiving region is arranged to have a correlation with a second stray light reception signal generated by the second stray light receiving region and with a stray light component included in the second light reception signal, which is generated by the second light receiving region, and caused by the interlayer stray light.

4. An optical pickup according to claim 3, wherein, in the photodetector, when the target recording layer and the other recording layers are separated, the first stray light receiving region and the second stray light receiving region are arranged to have a correlation with a stray light component included in a difference between the light reception signals generated by the first light receiving region and the second light receiving region and with a difference between the stray light reception signals generated by the first stray light receiving region and the second stray light receiving region, and, when the target recording layer and the other recording layers are close to each other, a third stray light receiving region provided near the third light receiving region and a fourth stray light receiving region provided near the fourth light receiving region are arranged to have a correlation with a stray light component included in a difference between the light reception signals generated by the first light receiving region and the second light receiving region and with a difference between stray light reception signals generated by the third stray light receiving region and the fourth stray light receiving region.

5. An optical pickup according to claim 2, wherein, in the photodetector, a third stray light receiving region provided near the third light receiving region and a fourth stray light receiving region provided near the fourth light receiving region are arranged to have a correlation with a stray light component included in a difference between the light reception signals, which is generated by the first light receiving region and the second light receiving region, and caused by the interlayer stray light and with a difference between stray light reception signals generated by the third stray light receiving region and the fourth stray light receiving region.

6. An optical pickup according to claim 5, wherein, in the photodetector, the third stray light receiving region is arranged in an irradiation range of stray light at the time when interlayer stray light of a part of the light beam reflected by another recording layer near the target recording layer is diffracted by a third region in the hologram element, and the fourth stray light receiving region is arranged in an irradiation range of stray light at the time when the interlayer stray light of a part of the light beam reflected by another recording layer near the target recording layer is diffracted by a fourth region in the hologram element.

7. An optical pickup according to claim 1, wherein
the hologram element causes, with a direction substantially parallel to a traveling direction in an image of the track grooves set as the first direction, the first beam and the second beam to travel in the first direction with diffraction angles in the first beam and the second beam set different from each other and causes, with a direction substantially orthogonal to the traveling direction set as the second direction, the third beam and the fourth beam to travel in the second direction with diffraction angles of the third beam and the fourth beam set different from each other, and
in the photodetector, the first light receiving region and the second light receiving region are provided on a first imaginary straight line extended in the first direction through the irradiation position of the reflected zeroth-order light beam, and the third light receiving region and the fourth light receiving region are provided on a second imaginary straight line extended in the second direction through the irradiation position of the reflected zeroth-order light beam.

8. An optical pickup according to claim 7, further comprising:
a half-wave plate that changes a polarization direction component of the reflected light beam; and
a second hologram element in which a polarization hologram that exercises a diffracting action on a predetermined polarization direction component of the light beam is formed, wherein
the hologram element includes a polarization hologram element that exercises the diffracting action on a first polarization direction component formed by a predetermined first polarization direction in the reflected light beam,
the second hologram element diffracts, in a third direction different from both the first direction and the second direction, a second polarization direction component formed by a second polarization direction substantially orthogonal to the first polarization direction and transmitted without being diffracted by the polarization hologram element in the light beam emitted from the hologram element and changes the second polarization direction component to a second polarized first-order light beam, and
the photodetector receives the second polarized first-order light beam and generates a light reception signal with a fifth light receiving region provided on the third direction side in the irradiation position of the reflected zeroth-order light beam and causes the signal processing unit to generate a reproduction RF signal representing information recorded in the track grooves based on the light reception signal generated by the fifth light receiving region.

9. An optical pickup according to claim 8, wherein, in the photodetector, the fifth light receiving region is arranged on an outside of an irradiation range of stray light formed by zeroth-order light at the time when interlayer stray light of a part of the light beam reflected by another recording layer most distant from the target recording layer in the optical disk is diffracted by the hologram element.

10. An optical pickup according to claim 8, wherein
the second hologram element separates the second polarization direction component in the light beam emitted from the hologram element into the second polarized zeroth-order light beam, a second polarized + first-order light beam diffracted in the third direction, and a second polarized − first-order light beam diffracted in a direction substantially opposite to a direction of the second polarized + first-order light, and
the photodetector receives the second polarized + first-order light beam with the fifth light receiving region, receives the second polarized − first-order light beam and generates a light reception signal with a sixth light receiving region provided in a position substantially symmetrical to the fifth light receiving region with the irradiation position of the reflected zeroth-order light set as a symmetry center and causes the signal processing unit to generate the reproduction RF signal based on the light reception signals generated by the fifth light receiving region and the sixth light receiving region.

11. An optical pickup according to claim 10, wherein, in the photodetector, the fifth light receiving region and the sixth light receiving region are arranged on an outside of an irradiation range of stray light formed by zeroth-order light at the time when interlayer stray light of a part of the light beam reflected by another recording layer most distant from the target recording layer in the optical disk is diffracted by the hologram element.

12. An optical pickup according to claim 7, wherein
the hologram element diffracts a fifth part of the reflected first-order light beam in a fourth direction different from both the first direction and the second direction and changes the fifth part of the reflected first-order light beam to a seventh beam with a seventh region formed by a center portion excluding the first region, the second region, the third region, and the fourth region, and
the photodetector receives the seventh beam and generates a light reception signal with a seventh light receiving region provided on the fourth direction side in the irradiation position of the zeroth-order light beam.

13. An optical pickup according to claim 1, wherein, in the photodetector, the first light receiving region, the second light receiving region, the third light receiving region, and the fourth light receiving region are arranged on an outside of an irradiation range of a zeroth-order light beam generated by diffracting, with the hologram element, an interlayer stray light beam of a part of the light beam reflected by another recording layer most distant from the target recording layer in the optical disk.

14. An optical pickup according to claim 1, further comprising an astigmatism lens that imparts astigmatism to the reflected zeroth-order light beam, wherein
the lens moving unit moves the object lens in a focus direction in which the object lens is brought close to or separated from the optical disk,
in the photodetector, a zeroth-light receiving unit divided into plural light receiving regions is provided in the irradiation position of the reflected zeroth-order light beam, and
the photodetector causes the signal processing unit to generate, based on light reception results of the light receiving regions in the zeroth-order light receiving unit, a focus error signal representing a shift amount between a focus of the light beam and the target recording layer and causes the servo control unit to move the object lens in the focus direction via the lens moving unit based on the focus error signal.

15. An optical pickup according to claim 14, wherein
the hologram element diffracts substantially the entire reflected light beam as the first beam and the second beam in the first region and the second region, and
the photodetector receives, with the zeroth-order light receiving unit, the reflected zeroth-order light beam not including portions corresponding to the first region and the second region.

16. An optical pickup according to claim 15, wherein, in the photodetector, the third light receiving region and the fourth light receiving region are arranged in positions where stray light formed by zeroth-order light at the time when interlayer stray light of a part of the light beam reflected by another recording layer most distant from the target recording layer in the optical disk is diffracted by the hologram element is not irradiated because of deletion of portions equivalent to the first region and the second region.

17. An optical pickup according to claim 14, wherein the hologram element imparts astigmatism having a characteristic opposite to the astigmatism imparted by the astigmatism lens to a portion of the reflected first-order light beam that passes the first region, the second region, the third region, and the fourth region.

18. An optical disk device comprising:
a light source that emits a light beam;
an object lens that condenses the light beam on a target recording layer set as a target among a plurality of recording layers provided in an optical disk;
a lens moving unit that moves the object lens in a tracking direction substantially orthogonal to track grooves spirally or concentrically formed in the target recording layer;
a condensing lens that condenses a reflected light beam of the light beam reflected by the optical disk;
a hologram element that, in diffracting the reflected light beam and separating the reflected light beam into a reflected zeroth-order light beam and a reflected first-order light beam, diffracts a first part of the reflected first-order light beam in a predetermined first direction with a first region, which corresponds to a portion including + first-order light diffracted by the track grooves in the reflected first-order light beam, and sets the first part of the reflected first-order light beam as a first beam, diffracts a second part of the reflected first-order light beam in the first direction with a second region, which corresponds to a portion including − first-order light diffracted by the track grooves in the reflected first-order light beam, and sets the second part of the reflected first-order light beam as a second beam, diffracts a third part of the reflected first-order light beam in a second direction different from the first direction with a third region, which corresponds to a portion not including the + first-order light and the − first-order light diffracted by the track grooves in the reflected first-order light beam and equivalent to an inner circumferential side of the optical disk, and sets the third part of the reflected first-order light beam as a third beam, and diffracts a fourth part of the reflected first-order light beam in the second direction with a fourth region, which corresponds to another portion not including the + first-order light and the − first-order light diffracted by the track grooves in the reflected first-order light beam and equivalent to an outer circumferential side of the optical disk, and sets the fourth part of the reflected first-order light beam as a fourth beam;
a photodetector that receives the first beam and the second beam and generates first light reception signals respectively with a first light receiving region and a second light receiving region provided on a first direction side in an irradiation position of the reflected zeroth-order light beam, receives the third beam and the fourth beam and generates second light reception signals respectively with a third light receiving region and a fourth light receiving region provided on a second direction side in an irradiation position of the reflected zeroth-order light beam, and receives interlayer stray light of a part of the light beam reflected by the other recording layers other than the target recording layer in the optical disk and generates a stray light reception signal with a stray light receiving region;
a signal processing unit that generates, based on the first and second light reception signals respectively generated by the first light receiving region, the second light receiving region, the third light receiving region, and the fourth light receiving region and the stray light reception signal generated by the stray light receiving region, a tracking error signal representing a shift amount between a focus of the light beam and a center line of the track grooves with respect to the tracking direction; and a servo control unit that moves the object lens in the tracking direction via the lens moving unit based on the tracking error signal.

19. An optical disk device according to claim 18, wherein the signal processing unit corrects, with a difference between stray light reception signals generated by a first stray light receiving region provided near the first light receiving region and a second stray light receiving region provided near the second light receiving region, a stray light component included in a difference between the light reception signals, which are generated by the first light receiving region and the second light receiving region, and caused by the interlayer stray light.

20. An optical disk device according to claim 18, wherein the signal processing unit corrects, with a difference between stray light reception signals generated by a third stray light receiving region provided near the third light receiving region and a fourth stray light receiving region provided near the fourth light receiving region, a stray light component included in a first generation signal by a difference between the light reception signals, which are generated by the first light receiving region and the second light receiving region, and caused by the interlayer stray light.

* * * * *